United States Patent
Johnson et al.

(10) Patent No.: US 10,754,165 B2
(45) Date of Patent: Aug. 25, 2020

(54) HIGH EFFICIENCY OPTICAL COMBINER FOR MULTIPLE NON-COHERENT LIGHT SOURCES

(71) Applicant: UVLrx Therapeutics, Inc., Santa Barbara, CA (US)

(72) Inventors: Scot L. Johnson, Lutz, FL (US); Michael Wayne Harter, Tampa, FL (US)

(73) Assignee: PhotonX TherapeutX, Inc., Oldsmar, FL (US)

( * ) Notice: Subject to any disclaimer, the term of this patent is extended or adjusted under 35 U.S.C. 154(b) by 0 days.

(21) Appl. No.: 14/935,261

(22) Filed: Nov. 6, 2015

(65) Prior Publication Data

US 2016/0170218 A1     Jun. 16, 2016

Related U.S. Application Data

(60) Provisional application No. 62/123,111, filed on Nov. 7, 2014.

(51) Int. Cl.
| | | |
|---|---|---|
| *G02B 27/14* | (2006.01) | |
| *G02B 6/38* | (2006.01) | |

(Continued)

(52) U.S. Cl.
CPC ......... *G02B 27/141* (2013.01); *G02B 6/2938* (2013.01); *G02B 6/29362* (2013.01); *G02B 6/32* (2013.01); *G02B 6/3857* (2013.01); *G02B 6/3863* (2013.01); *G02B 6/3897* (2013.01); *G02B 6/4204* (2013.01); *G02B 7/1824* (2013.01); *G02B 27/145* (2013.01); *G02B 7/006* (2013.01); *G02B 7/027* (2013.01)

(58) Field of Classification Search
None
See application file for complete search history.

(56) References Cited

U.S. PATENT DOCUMENTS

| | | | | |
|---|---|---|---|---|
| 3,035,179 A | * | 5/1962 | Parker .................... | H04N 5/257 250/226 |
| 4,810,092 A | * | 3/1989 | Auth ........................ | G01J 3/02 356/244 |

(Continued)

FOREIGN PATENT DOCUMENTS

WO    WO-2014120939 A1 * 8/2014 ............. G02B 7/003

*Primary Examiner* — Derek S. Chapel
(74) *Attorney, Agent, or Firm* — The Emanuelson Firm, P.C.; Kenneth T. Emanuelson

(57) ABSTRACT

An optical combiner that combines light from a plurality non-coherent light sources and directs it to a single output is described. The non-coherent light sources are arranged within a housing in a linear fashion, with light emitted from at least two of the non-coherent light sources directed towards a focusing lens by reflection from wavelength-selective mirrors, with the focus of the focusing lens directed to an input of an optical waveguide. Reflected light from at least one non-coherent light source passes through at least one wavelength-selective mirror that reflects light from a different non-coherent light source. A terminal non-coherent light source passes through all the wavelength-selective mirrors. Emitted light is transmitted or reflected along a plurality of optical axes that are parallel but offset to correct for refraction.

20 Claims, 36 Drawing Sheets

(51) Int. Cl.
*G02B 7/182* (2006.01)
*G02B 6/32* (2006.01)
*G02B 7/00* (2006.01)
*G02B 7/02* (2006.01)
*G02B 6/293* (2006.01)
*G02B 6/42* (2006.01)

(56) References Cited

U.S. PATENT DOCUMENTS

| | | | | |
|---|---|---|---|---|
| 5,153,675 | A * | 10/1992 | Beauchaine | G01J 3/453 250/339.08 |
| 5,272,309 | A | 12/1993 | Goruganthu et al. | |
| 5,490,011 | A * | 2/1996 | Pernick | E04C 3/005 211/189 |
| 5,543,670 | A * | 8/1996 | Luecke | H01L 41/12 310/26 |
| 5,715,270 | A | 2/1998 | Zediker et al. | |
| 5,768,026 | A * | 6/1998 | Kiyomoto | G02B 5/0833 359/586 |
| 6,172,748 | B1 * | 1/2001 | Sones | G01N 21/9054 356/237.1 |
| 6,219,186 | B1 | 4/2001 | Hebert | |
| 6,908,460 | B2 | 6/2005 | DiStefano | |
| 7,152,982 | B2 * | 12/2006 | Kitabayashi | G02B 27/1013 353/119 |
| 7,248,359 | B2 | 7/2007 | Boege | |
| RE40,173 | E | 3/2008 | Zediker et al. | |
| 7,428,110 | B2 * | 9/2008 | Tamada | G02B 7/003 353/101 |
| 7,898,665 | B2 * | 3/2011 | Brukilacchio | A61B 1/0653 356/417 |
| 8,351,122 | B2 * | 1/2013 | Teijido | G02B 6/0011 359/629 |
| 8,733,948 | B2 * | 5/2014 | Ogawa | F21V 9/00 353/94 |
| 9,689,809 | B2 * | 6/2017 | Buchwald | B65B 3/04 |
| 2005/0219468 | A1 | 10/2005 | Yoshii | |
| 2006/0138433 | A1 | 6/2006 | Joyner | |
| 2007/0098028 | A1 | 5/2007 | Alcock et al. | |
| 2007/0166965 | A1 | 7/2007 | Tanaka | |
| 2008/0063017 | A1 | 3/2008 | Schnitzler et al. | |
| 2008/0234670 | A1 | 9/2008 | Rogers | |
| 2009/0201577 | A1 * | 8/2009 | LaPlante | G01N 21/6458 359/355 |
| 2012/0307362 | A1 * | 12/2012 | Silverstein | G02B 27/1053 359/485.04 |
| 2013/0188388 | A1 * | 7/2013 | Jaffe | F21V 9/083 362/580 |
| 2013/0215923 | A1 * | 8/2013 | Cobb | G02B 27/0927 372/49.01 |
| 2014/0002801 | A1 * | 1/2014 | Miura | H04N 9/3152 353/31 |
| 2014/0015874 | A1 * | 1/2014 | Nagayoshi | G02B 27/104 345/698 |
| 2014/0355240 | A1 * | 12/2014 | Farchtchian | H04N 9/315 362/84 |
| 2015/0165550 | A1 * | 6/2015 | Fry | B23K 26/032 219/121.68 |
| 2016/0312975 | A1 * | 10/2016 | Miura | H04N 9/3152 |
| 2017/0175968 | A1 * | 6/2017 | Shimizu | F21S 41/24 |
| 2019/0310441 | A1 * | 10/2019 | Suchowski | G01M 11/04 |

* cited by examiner

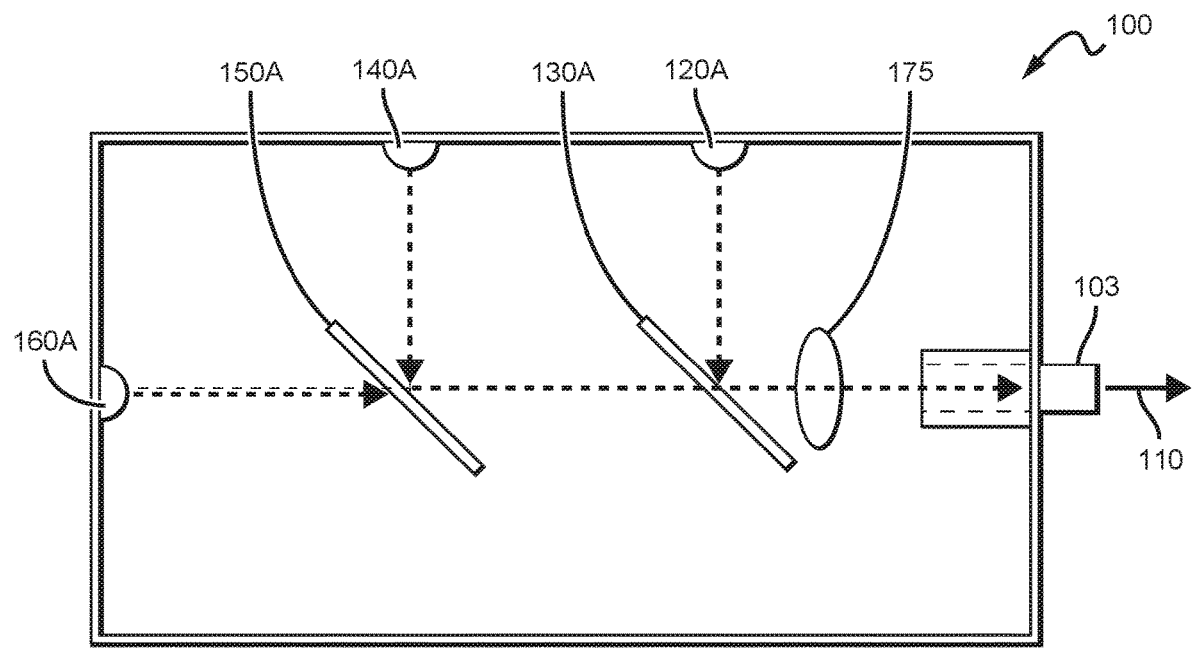
FIG. 1E
FIG. 1F
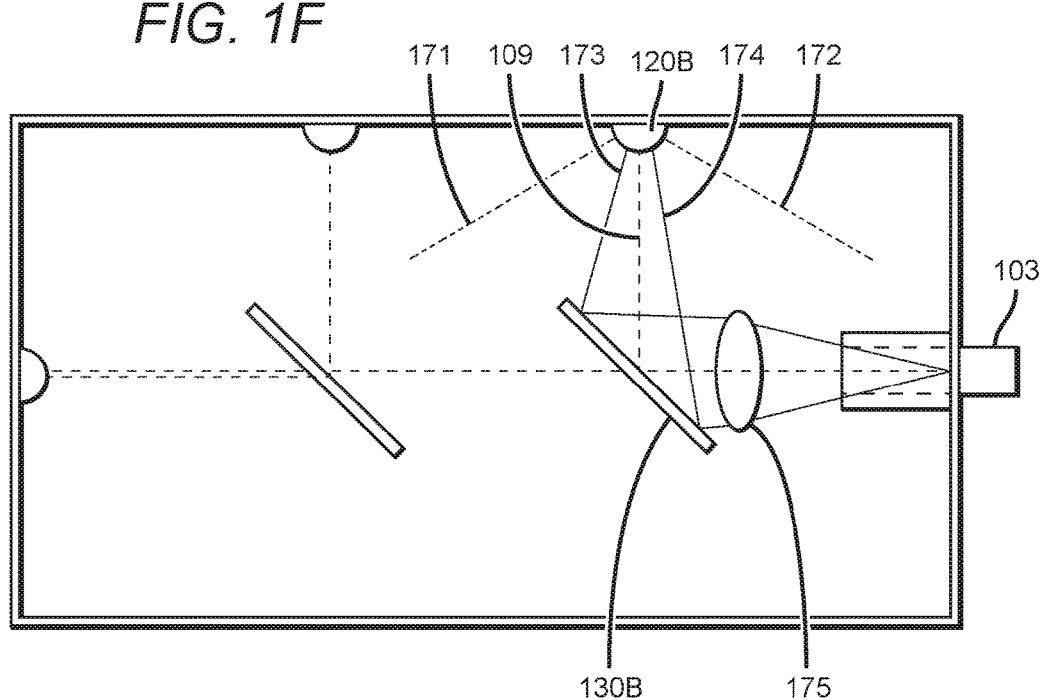

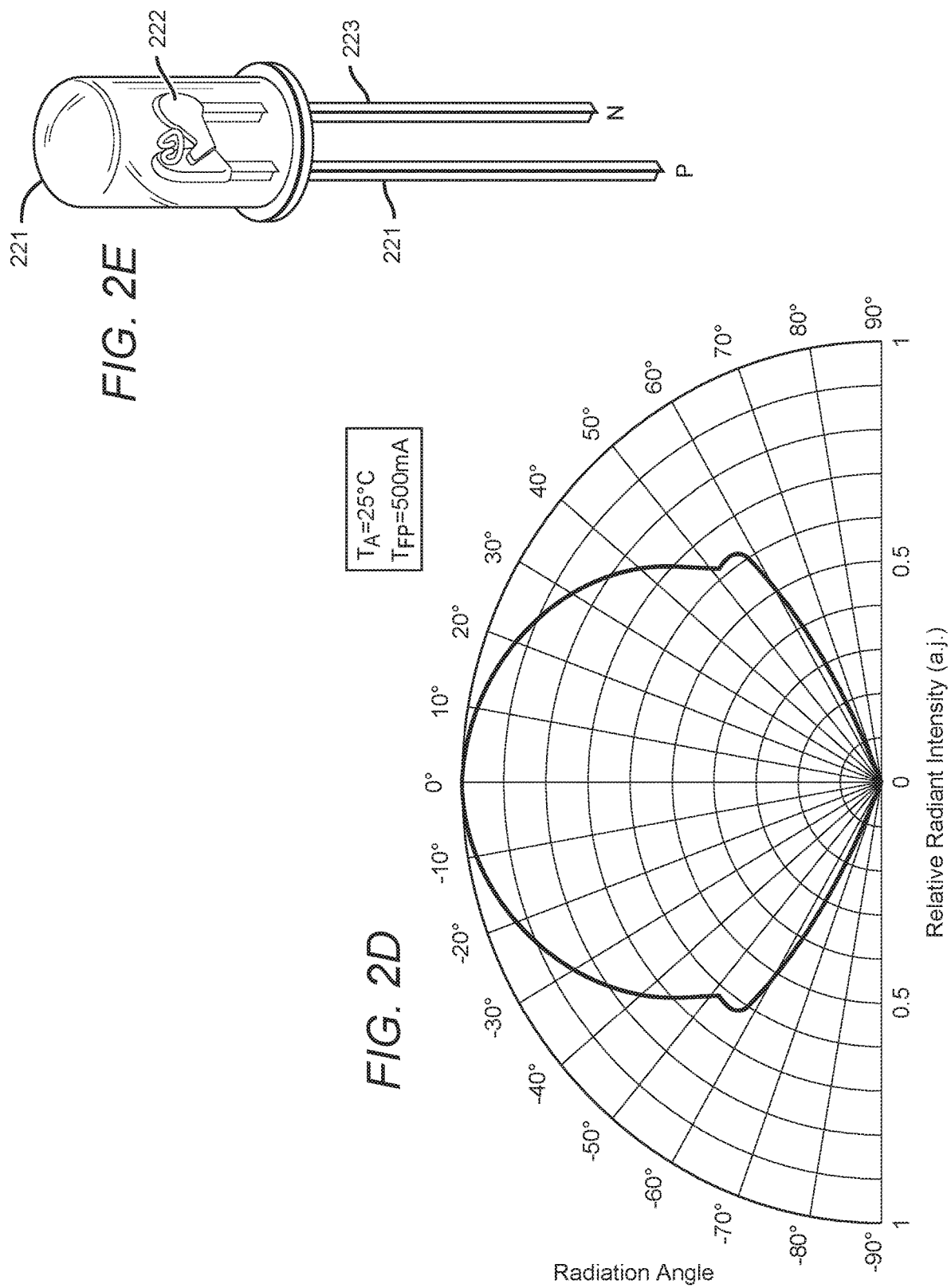

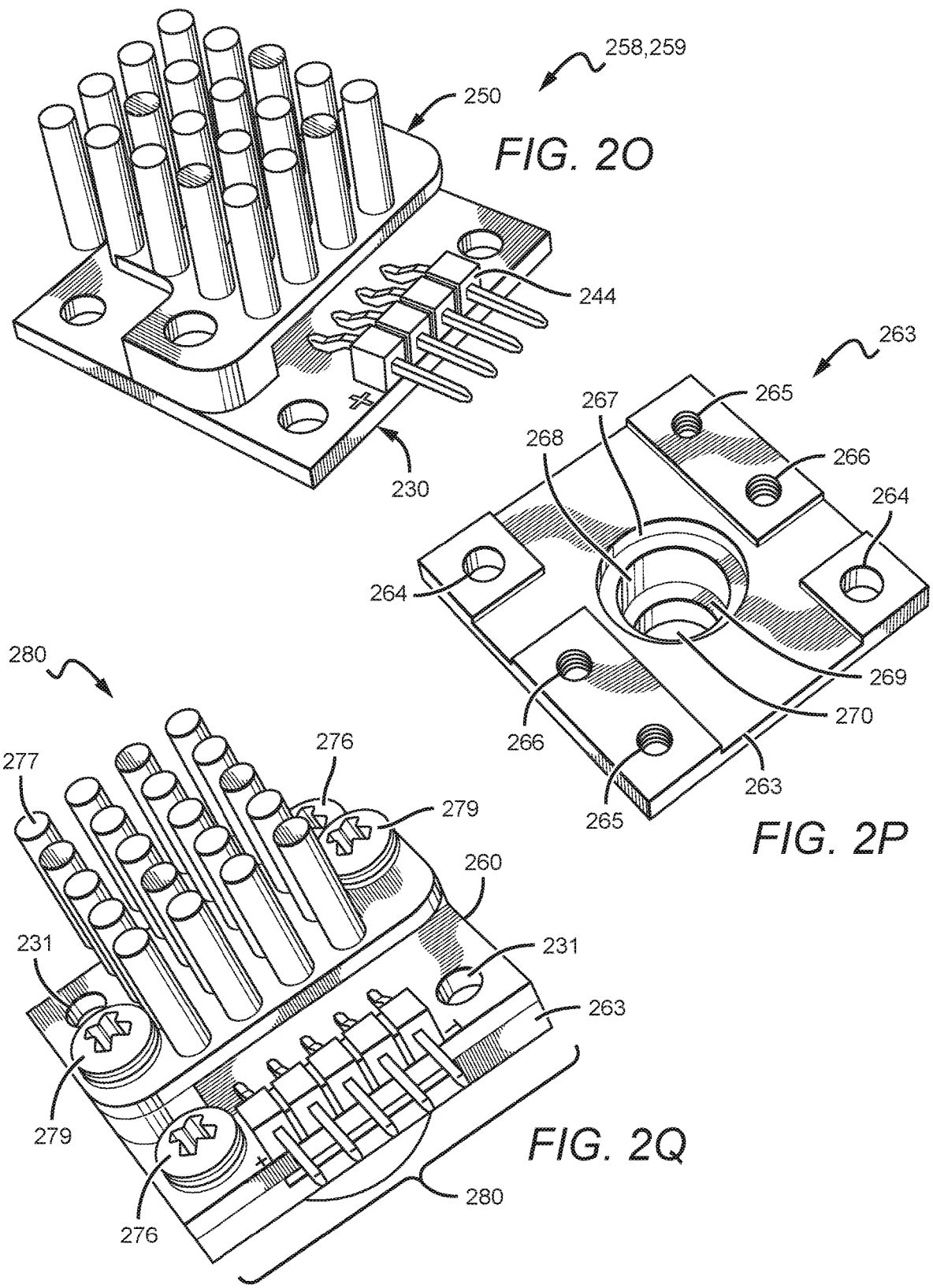

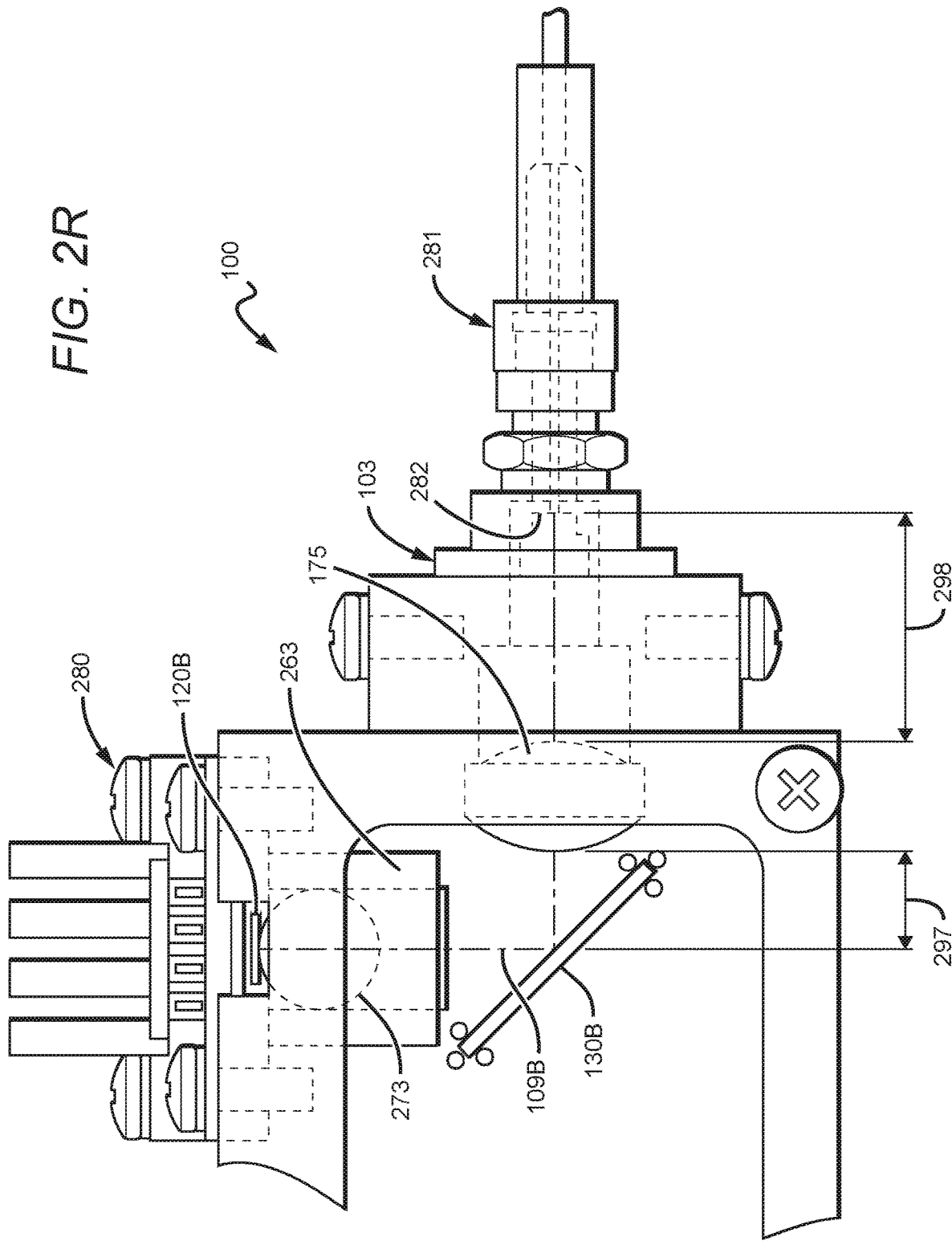

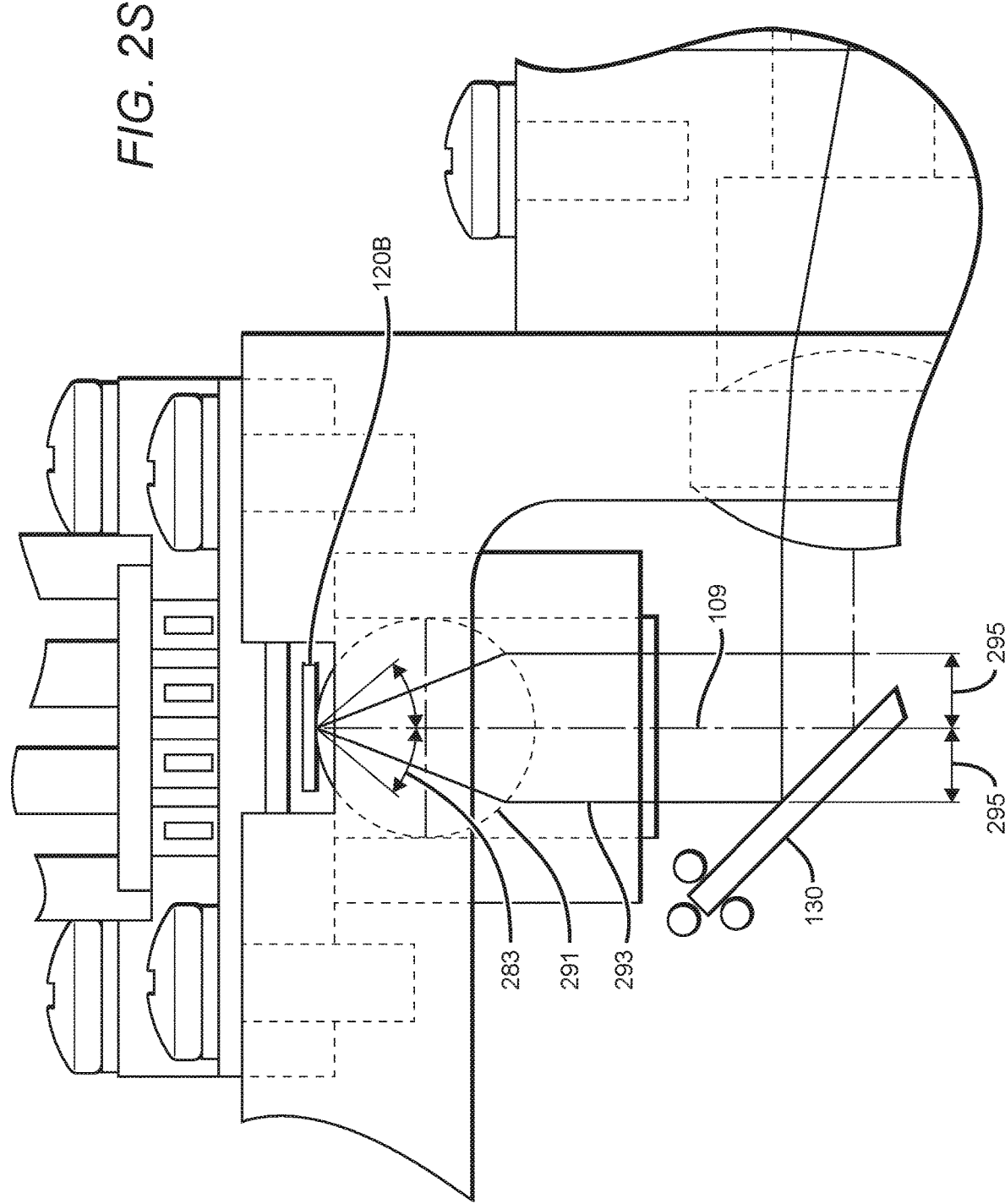

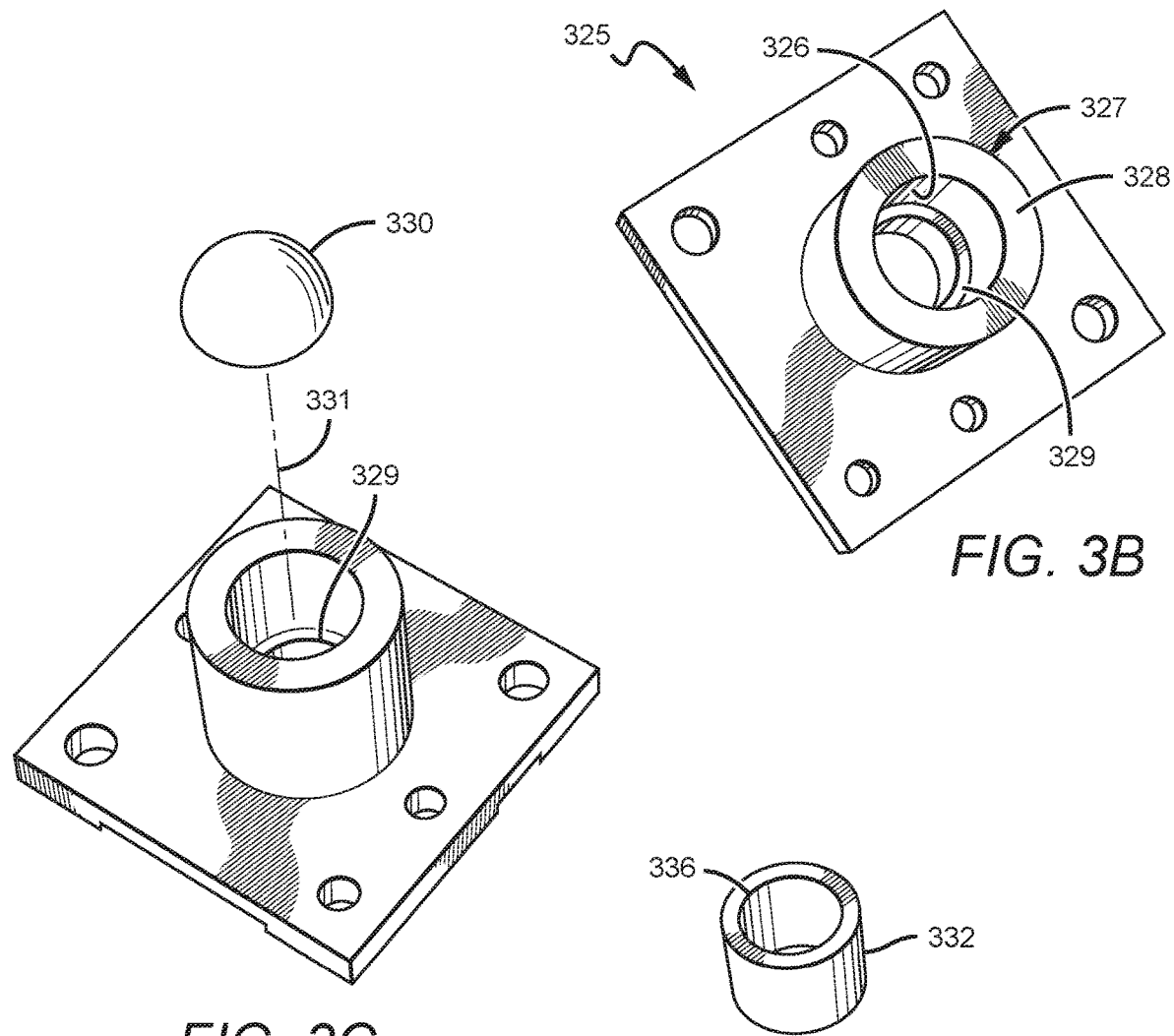
FIG. 3B
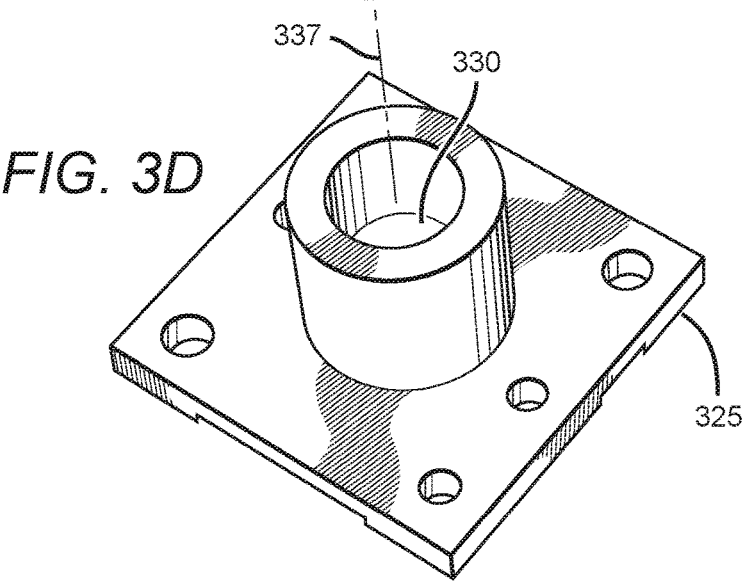
FIG. 3C
FIG. 3D

HIGH EFFICIENCY OPTICAL COMBINER FOR MULTIPLE NON-COHERENT LIGHT SOURCES

This application claims the benefit of U.S. Provisional Application No. 62/123,111 filed on Nov. 7, 2014. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is optical combiners, particularly optical combiners for use with non-coherent light sources.

BACKGROUND

The following description includes information that may be useful in understanding the present invention. It is not an admission that any of the information provided herein is prior art or relevant to the presently claimed invention, or that any publication specifically or implicitly referenced is prior art.

Broadband light sources, for example fluorescent tubes, emit polychromatic spectra. In some cases, these light sources find a use in research and commercial applications, where a plurality of spectral content is desirable and coherency is not a concern. However and especially in medical applications, it becomes more desirable to utilize monochromatic light sources, such as lasers, which target specific biochemical pathways. Early in the development of medical modalities, lasers are used due to their typically high optical power output, ease at directing a coherent beam of light towards a specific location, and their spectral specificity. However, lasers (depending on the emission wavelength) can be quite large, quite expensive, require various chemical compounds to be recharged, and require expensive optical configurations that typically require frequent calibration and maintenance. Further, due to high optical interface power, laser output tends to require optical attenuation to bring the light levels to a safe and non-destructive level for medical applications. Finally, due to their size and complexity, it may be unwieldy and impractical to combine several lasers into a single optical interface, when such a singular output containing multiple specific monochromatic wavelength peaks is desirable.

Lasers for use in medicine are eventually replaced by newer light source technologies as they become available. Light Emitting Diodes (LEDs) represent one such technology that has found widespread use in commercial application. LEDs are monochromatic with only slightly more spectral content, low power, low cost relative to lasers, require no maintenance, have long useful emission life, and are quite small and can be mounted directly to circuitry which drives them. LEDs do represent some obstacles depending on the application, including "droop" or the reduction in optical interface power over the life of the device (typically to about 50% of initial optical interface power), non-coherent light output requiring some lensing, and in some instances much lower optical interface power. As well, with both lasers and LEDs, thermal management is critical to ensure proper wavelength stability, optical interface power, and longevity of the devices.

In the case where a designer wishes to combine multiple monochromatic wavelengths into a single optical interface for therapeutic medical applications, the designer desires to achieve an additive or synergistic effect. In terms of pharmaceutical studies, researchers may examine the concomitant use of pharmaceuticals to achieve additional benefit for the patient. For example, when two pharmaceuticals are administered to a patient, they may partially or wholly cancel the effects of each other ("destructive"); they may neither negate nor improve upon the effects of each other ("non-additive"); they may combine in such a way as to be essentially merely additive, or they may combine in such a way as to work together to achieve higher levels of clinical efficacy than would be expected from merely additive activity (i.e. provide a synergistic effect).

In the case where a designer wishes to combine multiple monochromatic wavelengths into a single optical interface for therapeutic medical applications, it is common in the art to develop an optical "combiner". Off the shelf combiners are typically only available for lasers, generally utilizing a partially hollow cube shaped housing having two openings for laser input (often at right angles to one another). A wavelength selective dichroic mirror is oriented at 45 degrees relative to the laser inputs. Such dichroic mirror has an optical coating that allows one wavelength to pass through it, the "primary laser wavelength", while a second wavelength, the "secondary laser wavelength", is reflected in the direction of the primary laser wavelength's passing beam. The combined laser beam then strikes the face of an optical conduit, for example an optical fiber, whereby the combined laser beam may be directed as the designer sees fit. Optical combiners are typically only available for two lasers. The general principle allows for expansion using additional dichroic mirrors in a similar fashion as described above, however these typically are designed specifically for each application. The use of coherent laser light permits accurate aiming of each laser beam such that a maximum light transmission from laser output to optical fiber face is achieved, and the coherent nature of the light allows the face of the fiber optic to accept a great deal of light as the acceptance angle of the fiber optic is far wider than the divergence of the incoming laser beam over the distances used. Commercially, this setup requires a large amount of space, a high degree of skill on the part of the builder/assembler of the device, and (for reasons described above) may not be commercially viable. This is particularly true for devices where more than two wavelengths are to be combined into a single optical interface. For this reason this type of device is typically utilized only for research purposes. It is noteworthy that, while laser diodes have become exceedingly small for some wavelengths, many known therapeutic wavelengths outputs are available only from large format laser sources, with many of the aforementioned difficulties.

Due to the non-coherent nature of LEDs, combining multiple LED wavelengths using an optical combiner can be exceedingly challenging. Typical LEDs present with a field of view, an emission pattern, that is 120 degrees wide or more. When directing this light into a typical optical fiber which can accept light at an angle of 25.4 degrees or less, a great deal of light from the LED will be lost if the light from the LED isn't first collimated (light effectively bent by lensing such that the majority of light is parallel to a central axis of the LED die) and/or reduced. The concept of the emission pattern of LEDs covering a wide angular range is referred to as "angular content". It is commonly held in the art that a good transmission percentage, from the light output by the LED, to that which is successfully coupled to an optical fiber be 1%, which puts a great demand on the designer to produce as much light as possible from the LED. There are many additional considerations and challenges to the design of an LED-based optical combiner, especially one that requires more than two LED inputs, will be described further in the document. However, the low cost of LEDs, the long life of LEDs, the small size of LEDs, and the most recent advancements in LED technology warrant the examination of an LED optical combiner as a commercially viable technology.

Thus, there is still a need for a compact, efficient, and readily manufacturable device for combining light from multiple non-coherent light sources.

SUMMARY OF THE INVENTION

The inventive subject matter provides apparatus, systems and methods which permit efficient combining or mixing of non-coherent light from different light sources (for example, LEDs) and introduction of the resulting combined light to an optical waveguide. Non-coherent light sources are arranged in order of emission wavelength, with the light from each source directed towards a dichroic mirror that reflects the wavelength emitted by the associated non-coherent light source while allowing other wavelengths to pass through. The non-coherent light sources are arranged in a series according to their emission wavelength, such that the light reflected from a particular dichroic mirror associated with a particular light source passes through dichroic mirrors that lie between the particular dichroic mirror and the optical waveguide. The reflected light is directed along or parallel to a primary optical axis. The last light source in the series (i.e. the one with the longest wavelength) does not have an associated dichroic mirror, but rather is aligned along or parallel to the primary optical axis. In preferred embodiments, the dichroic mirrors and the last non-coherent light source lie along axes that are parallel to the primary optical axis but are offset from it to an extent that accounts for the refraction of emitted light as it passes through the dichroic mirror in order to align the combined light passing through the first dichroic mirror (i.e. the mirror associated with the non-coherent light source with the shortest wavelength) along the primary optical axis. In a preferred embodiment of the inventive concept a housing and associated mounting structures are provided which, along with the features noted above, provide a device that is both inexpensive and requires only minimally trained labor to assemble.

One embodiment of the inventive concept is a device for combining light from different light sources. Such light sources are preferably non-coherent light sources, such as LEDs. Such a device can include focusing lens that is aligned to provide a focal point along a primary optical axis, a first non-coherent light source that emits a first wavelength, a second non-coherent light source that emits a second wavelength, and a third non-coherent light source that emits a third wavelength. In some embodiments the first wavelength is an ultraviolet wavelength, the second wavelength is a visible (for example, green) wavelength, and the third wavelength is a red and/or infrared wavelength. In other embodiments the first wavelength is an red and/or infrared wavelength, the second wavelength is a visible (for example, green) wavelength, and the third wavelength is an ultraviolet wavelength. In some embodiments the focal point is positioned at or near an inlet facet or face of an optical waveguide, such as an optical fiber. In such a device a first dichroic mirror that reflects the first wavelength and transmits the second and third wavelengths is positioned relative to the first light source along a first axis and aligned along the primary optical axis. A second dichroic mirror that reflects the second wavelength and transmits the third wavelength is positioned relative to the second light source along a second axis and aligned along a secondary optical axis that is parallel to, but offset from, the primary optical axis. The third non-coherent light source is aligned along a tertiary optical axis that is parallel to, but offset from, the primary optical axis and/or the secondary optical axis. In such a device the emitted second wavelength passes through the first dichroic mirror and the third wavelength passes through both the second dichroic mirror and the first dichroic mirror. In some embodiments, the secondary optical axis is offset from the primary optical axis by a first offset distance, wherein the first offset distance is essentially equal to a first distance that the second wavelength is refracted upon passing through the first dichroic mirror. Similarly, in such a device the tertiary optical axis is offset from the primary optical axis by a second offset distance, wherein the second offset distance is essentially equal to a second distance that the third wavelength is refracted upon passing through both the second dichroic mirror and the first dichroic mirror.

In some embodiments the optical combining device also includes a first collimating lens positioned between the first non-coherent light source and the first dichroic mirror, a second collimating lens positioned between the second non-coherent light source and the second dichroic mirror, and/or a third collimating lens positioned between the third non-coherent light source and the second dichroic mirror. In some embodiments the first wavelength is an ultraviolet wavelength. In such an embodiment the first collimating lens is made from an ultraviolet transmissive material, such as sapphire.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIGS. 1B to 1E schematically depict cross sections of an optical combiner utilizing coherent, laser light sources, and illustrate paths taken by light emitted by these sources.

FIGS. 1F to 1H schematically depict cross sections of an optical combiner of the inventive concept utilizing non-coherent light sources, and illustrate paths taken by light emitted by these sources.

FIGS. 2A to 2D show features of an exemplary LED suitable for use in an optical combiner of the inventive concept. FIGS. 2A, 2B, and 2C show top, side, and bottom views of such an LED, respectively. FIG. 2D depicts a typical angular light distribution from such an LED.

FIG. 2E shows features of an alternative LED suitable for use in an optical combiner of the inventive concept.

FIGS. 2N and 2O show the orientation of a heat sink relative to a circuit board, and assembly of a heat sink with a circuit board, respectively, in an optical combiner of the inventive concept.

FIG. 2P depicts a base used in mounting a non-coherent light source in an optical combiner of the inventive concept.

FIG. 2Q depicts an LED circuit board assembly suitable for use in an optical combiner of the inventive concept.

FIG. 2R shows a cross section of a portion of an optical combiner of the inventive concept illustrating positioning of a circuit board assembly of a primary non-coherent light source relative to various optical components, including a ball lens.

FIG. 2S depicts the path taken by light emitted from a non-coherent light source of an optical combiner of the inventive concept.

FIGS. 3B and 3C show different views of a base suitable for supporting an LED assembly and a half ball (i.e., hemispherical lens) in an optical combiner of the inventive concept.

FIG. 3D depicts a base suitable for supporting an LED assembly and half ball lens, and a spacer utilized to assist in mounting the lens.

FIG. 3I depicts a light path of a non-coherent light source through a focusing lens in an optical combiner of the inventive concept.

DETAILED DESCRIPTION

Figure 1A:
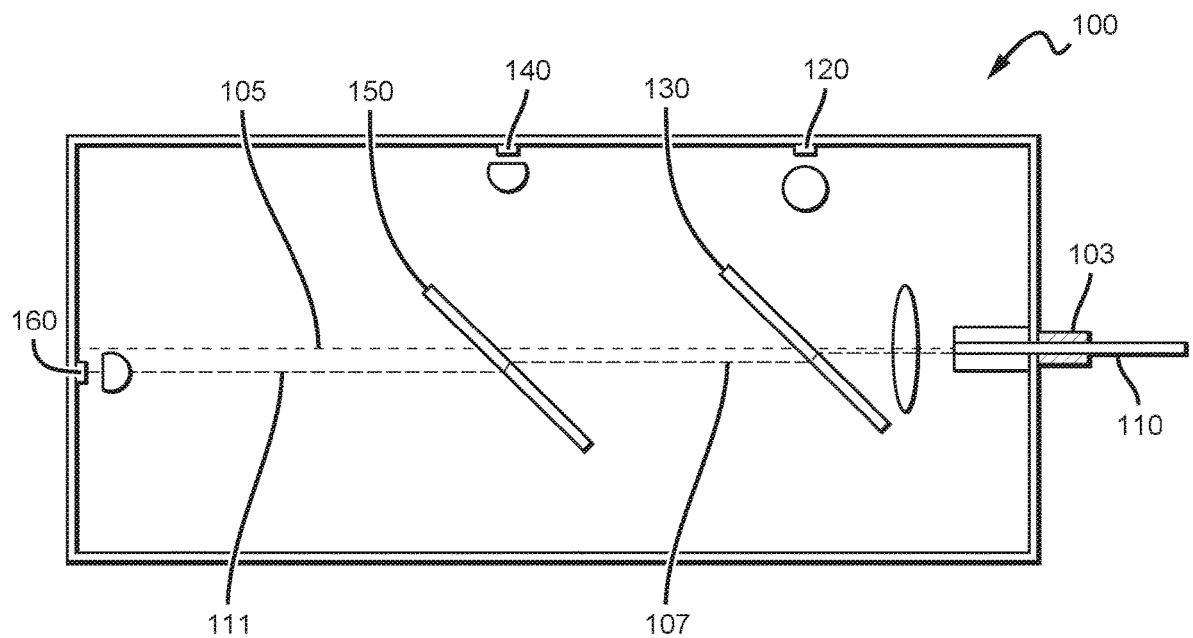
FIG. 1A schematically depicts a cross section of an optical combiner of the inventive concept.

The inventive subject matter provides apparatus, systems and methods which permit efficient combining or mixing of non-coherent light from different light sources (for example, LEDs) and introduction of the resulting combined light to an optical waveguide. Non-coherent light sources are arranged in order to emission wavelength, with the light from each source directed towards a dichroic mirror that reflects the wavelength emitted by the associated non-coherent light source while allowing other wavelengths to pass through. The non-coherent light sources are arranged in a series according to their emission wavelength, such that the light reflected from a particular dichroic mirror associated with a particular light source passes through dichroic mirrors that lie between the particular dichroic mirror and the optical waveguide. The reflected light is directed along or parallel to a primary optical axis that is aligned with the optical waveguide. The last light source in the series (i.e. the one with the longest wavelength) does not have an associated dichroic mirror, but rather is aligned along or parallel to the primary optical axis. In preferred embodiments, the dichroic mirrors and the last non-coherent light source lie along axes that are parallel to the primary optical axis but are offset from it to an extent that accounts for the refraction of emitted light as it passes through the dichroic mirror in order to align the combined light passing through the first dichroic mirror (i.e. the mirror associated with the non-coherent light source with the shortest wavelength) along the primary optical axis. Light from at least one of the light sources is reflected by its respective dichroic mirror and distributed as a conical frustum centered along a secondary optical axis that is parallel to but offset from the primary optical axis, the reflected light being re-centered to the primary axis by refraction on passage through a subsequent dichroic mirror that is transparent to the impinging wavelength. Light from at least one of the light sources is transmitted from the light source as a conical frustum centered about a third optical axis parallel to but offset from the primary optical axis, and is re-centered to the primary optical axis by refraction on passage through one or more dichroic mirror(s) that is(are) transparent to the impinging wavelength. In a preferred embodiment of the inventive concept, light from all of the light sources is centered about the primary optical axis prior to entering the optical waveguide. In some embodiments, a refractive or focusing lens is interposed between the exposed face of the optical waveguide and the closest dichroic mirror. In a preferred embodiment of the inventive concept a housing and associated mounting structures are provided which, along with the features noted above, provide a device that is both inexpensive and requires only minimally trained labor to assemble.

In some embodiments, the numbers expressing quantities of ingredients, properties such as concentration, reaction conditions, and so forth, used to describe and claim certain embodiments of the invention are to be understood as being modified in some instances by the term "about." The term "about" in this instance indicates that the value lies with ±10% of the stated value. Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be appreciated that light from non-coherent light sources attenuates rapidly with distance. As a result, most of the light emitted from such sources will be lost, either directed away from the optical waveguide or missing the associated mirror entirely. To mitigate this a collimating lens can be associated with each light source. However, it should also be appreciated that excessive collimation or focus of emitted light prior to reflection from the dichroic mirrors can place an excessive precision burden on an optical combiner, resulting in a device that requires extreme care in alignment during manufacture and that is inherently fragile. The inventors have realized that an optimal range exists that simultaneously supports highly efficient capture and transfer of light from non-coherent light sources using a rugged device that does not require precise alignment. In some embodiments of the inventive concept this is achieved by illuminating between 15% and 85% of the available reflective surface of an associated dichroic mirror with at least 50% of the light emitted by the respective non-coherent light source. In other embodiments of the inventive concept this is achieved by illuminating between 25% and 75% of the available reflective surface of an associated dichroic mirror with at least 50% of the light emitted by the respective non-coherent light source. In still other embodiments of the inventive concept this is achieved by illuminating between 30% and 60% of the available reflective surface of an associated dichroic mirror with at least 50% of the light emitted by the respective non-coherent light source. In doing so, devices of the inventive concept can effectively combine and transmit greater than 20%, 30%, 40%, 50%, 60%, 70%, 80%, or 90% of the total light emitted by the combined non-coherent light sources.

One should appreciate that the devices and methods disclosed herein provide highly efficient combining of light from a plurality of simple, robust and inexpensive light sources that consume relatively little power and generate relatively little heat, providing a mixed beam with defined spectral properties without the need for expensive and potentially dangerous laser light sources. In addition, the devices disclosed herein are highly suited to production using conventional tools and manufacturing processes, and can be assembled correctly by low to moderately skilled labor without the need for expensive and time-consuming calibration.

Numerous examples of embodiments of an optical combiner of the inventive concept are given below. While such embodiments cite specific examples of materials, electronic and optical components, and manufacturing and fabrication methods, such examples are not to be construed as being limiting to or limitations of the inventive concept.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

One embodiment of the inventive concept is a device for combining three or more wavelengths of light from non-coherent light sources into a single optical interface. In preferred embodiments, the non-coherent light sources are light emitting diodes (LEDs). It should be appreciated that, while examples may describe the use of three light sources that light from four or more sources can be combined through the use of additional light sources and other optical elements, as described below. The non-coherent light sources selected for combination can be, for example, chosen for the provision of therapeutic benefits associated with the emitted wavelengths of light. For example, in some embodiments of the inventive concept the non-coherent light sources are three individual LEDs that provide desired monochromatic peak wavelengths in the ranges of 350 nm to 390 nm (UVA), 500 nm to 550 nm (green and/or yellow), and 600 nm to 690 nm range (red and/or orange). In some embodiments it is desirable to design the optical combiner so as to minimize need for specialized assembly equipment and highly skilled labor while still providing a robust device with consistency between individual builds.

An optical combiner of the inventive concept includes a number of discrete components that are assembled to complete the device. One of these components is a housing, which serves to enclose and protect various optical and electronic components of the device. It should be appreciated that the housing can provide other functions, for example acting as a surface through which to discharge heat during operation of the device. A variety of materials are suitable for construction of the housing. The choice of material depends upon a number of considerations. In some embodiments optimal alignment of optics is provided by the incorporation of positioning "tooling" into the optical combiner housing, which in turn requires the housing itself to be precisely formed. In some embodiments of the inventive concept plastics, such as those shaped by injection molding, can be used to construct the housing. It should be appreciated, however, that such plastics require that draft be incorporated into any cavities to permit release from the mold. This draft may be as little as 1% and 3%, however for some embodiments of the optical combiner this may not allow for surface that are sufficiently perpendicular to support accurate alignment of rectangular components (for example, dichroic mirrors). Similarly, injection molded plastics may not provide sufficiently precise circular surfaces or cavities for proper alignment of circular components (for example, lenses). As such, while injection molded plastics may be suitable for the construction of some housings of the inventive concept, they may not be suitable for all embodiments.

In an alternative embodiment, a housing of the optical combiner can be constructed from plastics that are shaped using a method that does not require draft, for example machining, stereolithography, or silicone or epoxy molding. It should be appreciated, however, that while machined or silicone or epoxy molded plastics may be suitable for some applications of the inventive concept, they may not be suitable for all housings for use with optical combiners. For example, such molding processes do not provide the precision that other materials can. In addition, variation in the degree of plastic deformability can yield inconsistent parts from batch to batch.

In preferred embodiments of the inventive concept the housing is constructed, at least in part, from a metal. Suitable metals are lightweight and amenable to machining, and include aluminum, steel (for example, stainless steel), magnesium, and/or titanium. In preferred embodiments the housing of the optical combiner is constructed, in whole or in part, of aluminum. Aluminum has good machinability, light weight, and good heat conductivity, and in addition is low cost. In some embodiments Aluminum 6061-T6 grade aluminum is used for the housing for its light weight, rigidity, and widespread commercial availability. It is preferred that the surfaces of a housing of an optical combiner of the inventive concept have smooth, milled surfaces, which are advantageous for mating components and are simple to keep free of debris and oils.

A housing for the optical combiner can have any dimension suitable to support and align the optical and electronic components of the device. In typical embodiments the housing is between 1 and 15 cm in length, between 0.2 and 10 cm in depth, and between 0.2 and 10 cm in height. In a preferred embodiment of the inventive concept the housing is about 7.6 cm in length, about 3.8 cm in depth, and about 3.8 cm in height.

A cross section through a typical optical combiner of the inventive concept is shown in FIG. 1A. As shown, the optical combiner housing 100 is a rectangular shaped enclosure, although other geometries are suitable. The enclosure can include an optical interface 103 that supports an optical waveguide 110, for example an SMA-905 adapter to allow for connection to a standard SMA-905 terminated optical fiber waveguide, however any optical waveguide adapter may be used. The enclosure can support two or more dichroic mirrors, which reflect select wavelengths and allow others to pass through. Such a dichroic mirror can be selected to reflect light emitted by an associated non-coherent light source, such as primary light source 120. As shown, a primary dichroic mirror 130 is depicted oriented at a 45 degree angle to a lengthwise primary optical axis 105, and centered at on its frontal face relative to the primary optical axis 105. It should be appreciated, however, that embodiments of the inventive concept can tolerate deviation from this 45° angle of up to ±0.5°, ±1°, ±2°, ±3°, ±5° or more without excessively (i.e. >−10%) impacting the efficiency of light delivery from the associated light source. The primary dichroic mirror 130 is selected to reflect primary light source wavelengths (for example, UV wavelengths) on one face (i.e. the face directed towards the optical interface port 103) and to pass wavelengths outside of the primary light source wavelength range (for example, greater than 500 nm) incoming from the opposite face (i.e. the face directed away from the optical interface port 103). In some embodiments of the inventive concept, the primary light source 120 provides light in the UV range (e.g. less than 500 nm) and the primary dichroic mirror reflects such UV light and allows other wavelengths (e.g. greater than 500 nm) to pass through. In other embodiments the primary light source 120 provides light in the red and/or infrared range, and the primary dichroic mirror reflects such red and/or infrared light while permitting shorter wavelengths (e.g. ultraviolet, blue, green, etc.) to pass through. FIG. 1A additionally shows collimating lenses (e.g. spherical/ball or hemispherical/half ball lenses) that are utilized in some embodiments of the inventive concept, positioned immediately adjacent to their respective light sources.

It should be appreciated that in some embodiments the components of the optical combiner are arranged such that the primary light source is a short wavelength light source (e.g. an ultraviolet light source) that is located proximal to the optical output of an optical combiner of the inventive concept, with the secondary light source being a midrange light source (e.g. a visible light or green light source) located distal relative to the optical output such that the short wavelength light source is located between the midrange light source and the optical output, and with the tertiary light being a long wavelength (e.g. red or infrared light source) located most distally from the optical output with both the midrange and short wavelength light sources located between the long wavelength light source and the optical output. In such a configuration the primary dichroic mirror is selected to reflect short wavelength light and transmit longer wavelength (e.g. visible, green, red, and/or infrared) light. Similarly, the secondary dichroic mirror in such a configuration would be selected to reflect midrange (e.g. visible or green) wavelengths while transmitting long wavelengths (e.g. red or infrared). This configuration of the optical combiner is designated configuration I.

Alternatively, in some embodiments the components of the optical combiner are arranged such that the primary light source is a long wavelength (e.g. red or infrared light source) that is located proximal to the optical output of an optical combiner of the inventive concept, with the secondary light source being a midrange light source (e.g. a visible light or green light source) located distal relative to the optical output such that the long wavelength light source is located between the midrange light source and the optical output, and with the tertiary light being a short wavelength light source (e.g. an ultraviolet light source) located most distally from the optical output with both the midrange and long wavelength light sources located between the short wavelength light source and the optical output. In such a configuration the primary dichroic mirror is selected to reflect long wavelength light and transmit short and midrange wavelength (e.g. UV, visible, and/or green) light. Similarly, the secondary dichroic mirror in such a configuration would be selected to reflect midrange (e.g. visible or green) wavelengths while transmitting short wavelengths (e.g. ultraviolet). This configuration of the optical combiner is designated configuration II. While some examples below reflect configuration I implementations, embodiments of the inventive concept that incorporate configuration II are also contemplated.

In some embodiments of the inventive concept the primary light source 120 utilized in a desired therapeutic medical application is a UVA LED. Typical peak wavelengths produced by such LEDs fall in the range of 350 nm to 390 nm. In a preferred embodiment such a UVA LED is a NICHIA® NCSU033B single chip 365 nm LED, which has a very high output power. In addition the use of such a single chip LED (as opposed to available multi-chip LED configurations) provides a smaller LED die size, which reduces the width of the emission cone and thus simplifies collimation of its output onto the face of the single optical interface 103. The UVA LED can be utilized as a primary light source 120, with its central emission axis oriented directly over the center of a UV dichroic mirror. In other embodiments the primary light source 120 can be a red or infrared LED, for example the CREE® XLamp XP-E2 series LED, which has a peak wavelength of approximately 630 nm, very high optical power output, low cost, compact size, and a relatively narrow angular content of 40 degrees. This relatively narrow angular content simplifies collimation of the emitted light.

The distance of the primary light source 120 from the primary dichroic mirror 130 and other components of the optical combiner can be selected based on the dimensions of the device, the intensity profile of the emitted cone of light, and other factors, and can range from 0.1 cm to 9.9 cm. For example, the central emission axis of a primary light source 120 can be located approximately 2.5 cm from the single optical emission port 103 side of the housing 100. In some embodiments a primary light source illuminates between 15% and 85% of the available reflective surface of an associated dichroic mirror with at least 50% of the light emitted by the primary light source. In other embodiments of the inventive concept the primary light source illuminates between 25% and 75% of the available reflective surface of an associated dichroic mirror with at least 50% of the light emitted by the primary light source. In still other embodiments of the inventive concept this is achieved by illuminating between 30% and 60% of the available reflective surface of an associated dichroic mirror with at least 50% of the light emitted by the primary light source.

Dichroic mirrors utilized in an optical combiner of the inventive concept, such as the primary dichroic mirror 130, can be made of a variety of materials, depending on the needs serviced by the optical combiner and the wavelengths of the associated non-coherent light sources. For optimal transmission of wavelengths ranging from deep UV to higher visible wavelengths fused silica can be used. For example, CORNING® 7980 Fused Silica, grade 0-C or better, with a scratch and dig rating of 60/40 or better and surface finish of 2 waves accuracy or better can be used. The coating on the front face of a UV dichroic mirror is designed for a peak reflection of wavelengths between 350 and 400 nm, with an average reflection in this region of 95% or better at an incident angle of 45 degrees. This provides optimal reflection of a desired UVA LED wavelength. The opposite face of a UV dichroic mirror can be coated with an anti-reflective coating that transmits 95% or better of light provided by remaining light sources of the optical combiner (for example, ranging from 480 nm to 700 nm). Such a transmitted wavelength range can be selected to encompass the specific wavelength ranges of the remaining non-coherent light sources (140 and 160).

An optical combiner of the inventive concept can include a secondary dichroic mirror 150, which is oriented behind (or distal relative to the optical interface) the primary dichroic mirror 130. This secondary dichroic mirror is mounted at a similar 45 degree angle relative to a secondary optical axis 107 that is identical or parallel to the primary optical axis 105, such that reflected light is directed towards the primary dichroic mirror 130, with similar tolerances. A non-coherent secondary light source 140 with a wavelength range different from that of the primary light source 120 is associated with a secondary dichroic mirror 150. In some embodiments such a secondary light source 140 is oriented similarly to the primary light source 120, with the central output axis of the secondary light source 140 oriented directly over the middle of the front face of the secondary dichroic mirror 150. Such a secondary light source can provide light within the visible spectral range (for example one or more wavelengths perceived as blue, green, yellow, orange, and/or red). One suitable secondary light source 140 is the CREE® XLamp XP-E2 series LED, which has a peak wavelength of approximately 527 nm, very high optical power output, low cost, small size, and a narrow angular content of 40 degrees. This narrow angular content simplifies optical collimation. In some embodiments such a green LED illuminates between 15% and 85% of the available reflective surface of an associated dichroic mirror with at least 50% of the light emitted by the green LED. In other embodiments of the inventive concept such a green LED illuminates between 25% and 75% of the available reflective surface of an associated dichroic mirror with at least 50% of the light emitted by the green LED. In still other embodiments of the inventive concept this is achieved by illuminating between 30% and 60% of the available reflective surface of an associated dichroic mirror with at least 50% of the light emitted by such a green LED.

In a preferred embodiment the secondary dichroic mirror 150 is oriented along lengthwise secondary optical axis 107, which is parallel to but offset from primary optical axis 105. Such an offset corrects for refraction of light emitted by the secondary light source 140 and subsequently reflected from the front face of secondary dichroic mirror 150 as it passes through the primary dichroic mirror 130. The offset permits alignment of the refracted light originating from the secondary light source 140 with the primary optical axis 105 following transmission through the primary dichroic mirror 130. The distance of the secondary light source 140 from the secondary dichroic mirror 150 and other components of the optical combiner can be selected based on the dimensions of the device, the intensity profile of the emitted cone of light, and other factors, and can range from 0.1 cm to 9.9 cm. For example, the central emission axis of the secondary light source 140 can be located approximately 2.5 cm from the single optical emission port 103 side of the housing 100.

The secondary dichroic mirror 150 can also be made of fused silica as described for the primary dichroic mirror above. The coating on the front face of the secondary dichroic mirror is designed for a peak reflection of wavelengths emitted by the secondary light source (for example, between 460 and 570 nm), with an average reflection in this region of 95% or better at an incident angle of 45 degrees. This permits optimal reflection of the wavelength emitted by the secondary light source 140 wavelength reflection. The opposite face of the visible dichroic mirror 150 can be optimized for such an embodiment by coating with an anti-reflective coating that transmits 95% of light or better in ranges outside that of the secondary light source (for example, 600 nm to 700 nm or UVA wavelengths), which encompasses wavelength range of the remaining non-coherent tertiary light source 160.

The remaining non-coherent tertiary light source 160 (for example a UVA LED or a red LED) can be oriented along the face of the optical combiner housing 100 that opposes the face that includes the single optical emission port 103, with its emitted light directed towards the surface of the secondary dichroic mirror 150 that opposes the surface from which light from the secondary light source 140 is reflected. Such a tertiary light source 160 can be positioned so that the emitted light is along a lengthwise tertiary optical axis 111, which is parallel to but offset from both the primary optical axis 105 and the secondary optical axis 107. This second offset can be selected to correct for refraction of light originating from the tertiary light source 160 as it passes through the secondary dichroic mirror 150 and the primary dichroic mirror 130, aligning it first with the secondary optical axis 107 and then with the primary optical axis 105 prior to entering the waveguide. For example, light emitted by the tertiary light source 160 along a tertiary optical axis 111 can be aligned with secondary optical axis 107 by refraction on transmission through the secondary dichroic mirror 150 associated with the secondary light source 140, and then aligned with the primary optical axis 105 on passage through the primary dichroic mirror 130.

One suitable tertiary light source 160 is a red LED, for example the CREE® XLamp XP-E2 series LED, which has a peak wavelength of approximately 630 nm, very high optical power output, low cost, compact size, and a relatively narrow angular content of 40 degrees. This relatively narrow angular content simplifies collimation of the emitted light. In other embodiments of the inventive concept the tertiary light source 160 can be a UVA LED. Typical peak wavelengths produced by such UVA LEDs fall in the range of 350 nm to 390 nm. In a preferred embodiment such a UVA LED is a NICHIA® NCSU033B single chip 365 nm LED, which has a very high output power. In addition the use of such a single chip LED (as opposed to available multi-chip LED configurations) provides a smaller LED die size, which reduces the width of the emission cone and thus simplifies collimation of its output onto the face of the single optical interface 103. The optical emission from the tertiary light source 160 is not reflected, but rather passes through two (or more) dichroic mirrors 150, 130 before entering the waveguide. As noted above, in some embodiments the tertiary light source 160 is positioned to accommodate for refraction as it passes through these mirrors.

As noted above, an optical combiner of the inventive concept can be arranged such that the arrangement of light sources described above places a short wavelength light source (such as a UVA LED) proximal to the single optical interface 103 (i.e., with the primary light source 120 being a short wavelength light source). Alternatively, an optical combiner of the inventive concept can be arranged such that the arrangement of light sources described above places a long wavelength light source (such as a red LED) proximal to the single optical interface 103 (i.e. with the primary light source 120 being a red LED). It should be appreciated that, in selecting an arrangement of light sources, the coatings of the dichroic mirrors would be adjusted accordingly. For example, if a long wavelength light source is placed proximally to the single optical interface 103 of the optical combiner, the secondary dichroic mirror and the primary dichroic mirror would be selected to permit the passage of short wavelength light. Such an arrangement can benefit from having a relatively higher output short wavelength light source positioned at greater distance from the exiting waveguide.

Figure 1B:
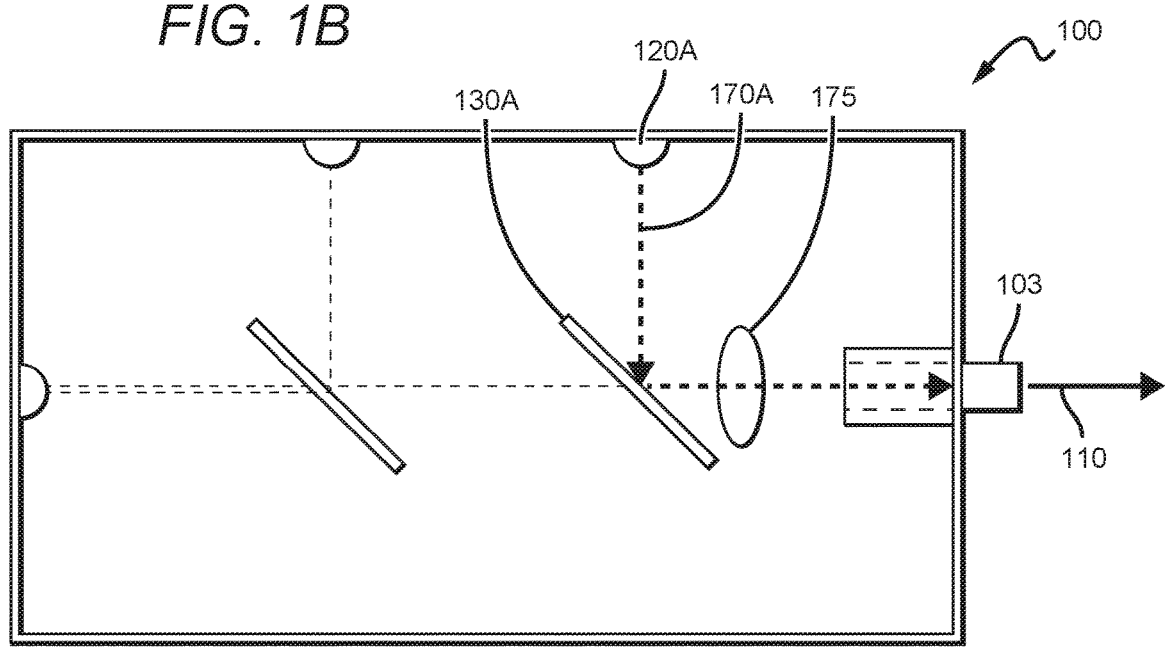

It should be appreciated that the light sources of the inventive concept are non-coherent light sources. The light emitted from such sources diverges quickly, and therefore provides significant technical challenges to those wishing to efficiently combine light from such sources. Typically, high efficiency in light combination is seen with coherent light sources (i.e. lasers, laser diodes, etc.), where the lack of beam divergence provides opportunity for alignment of the emitted light from multiple sources at high intensity. Surprisingly, however, the inventors have found that the divergent property of non-coherent light, properly controlled, is advantageous when combining light from such sources as in devices of the inventive concept. Consider the use of lasers or laser diodes in a device of the inventive concept (in place of the non-coherent light sources for which the device was invented) as depicted schematically in FIG. 1B. As shown, the lasers emit coherent light in a tightly focused beam with very little divergence (indicated by a heavy dashed line). In FIG. 1B, a UVA laser 120A is shown emitting a coherent, non-diverging beam of light 170A (heavy dashed line) to strike the reflective face of the UV dichroic mirror 130A. This reflected light is redirected through a focusing lens 175 and directly into a single optical interface 103, and from there out through an optical waveguide 110. If the UV dichroic mirror 130A is aligned precisely, the UVA laser 120A is aligned precisely, and the single optical interface 103 is aligned precisely, a high degree of light transfer can be accomplished. It should be appreciated, however, that this high efficiency is entirely dependent upon several independent alignment events being carried out with a high degree of precision. The error introduced by a single slight misalignment cascades through the system, and can easily result in no light transferred to the optical waveguide 110. Such precision requires expensive and complex assembly tooling and highly skilled labor. In addition, such a device is highly susceptible to misalignment caused by jarring during transport and use. When non-coherent light sources such as LEDs are used, however, due to the relatively wide angular content, slight misalignments can still result in substantial light throughput. Surprisingly, this advantage is found even when the divergence of such non-coherent sources is reduced through the use of collimating lenses.

Figure 1C:
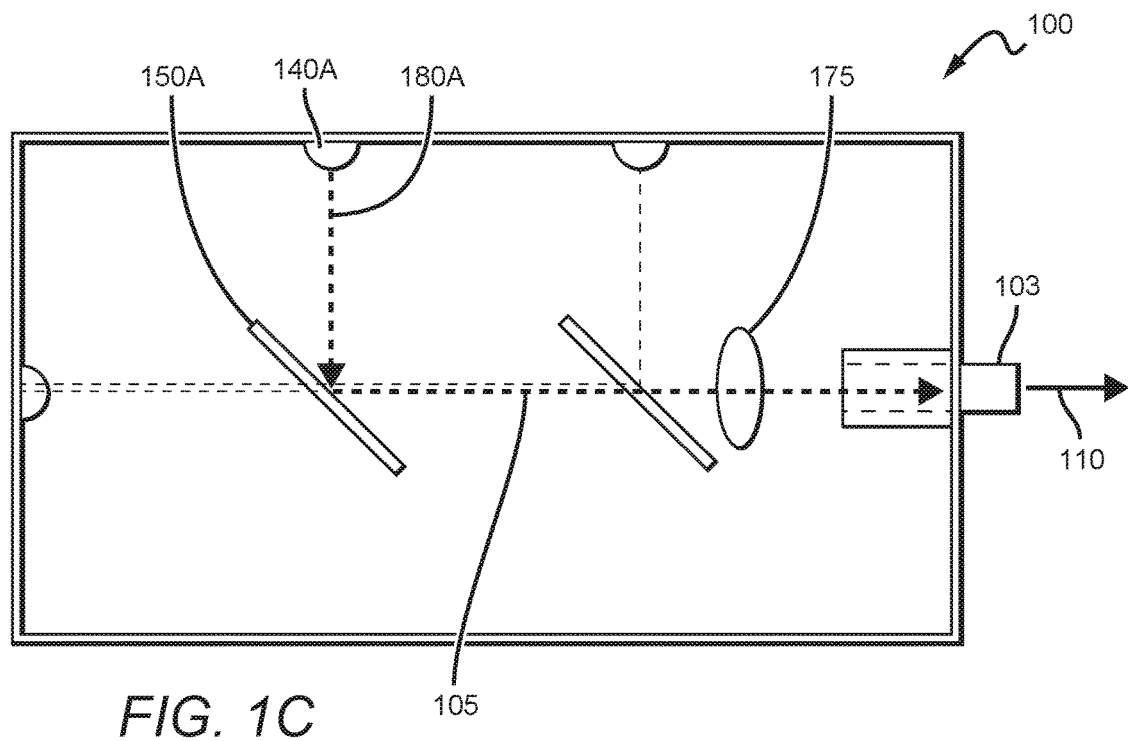

The problems associated with the need for highly precise alignment when coherent light sources are used are exacerbated as the number of coherent light sources and other optical elements is increased. Consider the use of lasers or laser diodes as depicted in FIG. 1C. In this instance, the lasers emit coherent light in a focused beam with very little divergence. As shown, a green laser 140A emits a beam of light 180A (depicted as a heavy dashed line) to strike the reflective face of a visible dichroic mirror 150A, redirecting the light through a UV dichroic mirror 130A (the beam shifting slightly as it passes through 130), and through the focusing lens 175 and into the optical interface 103 and subsequently into an optical waveguide 110. Both the visible dichroic mirror 150 and UV dichroic mirror 130A must be precisely aligned; precise alignment is also necessary for the green laser 140A and the optical interface 103 if a high degree of light transfer is to be accomplished. Mixing of light emitted by a UV laser requires additional precise alignment of this component. In this instance, efficient transfer of light to the optical waveguide and mixing of the light from different sources depends heavily on a number of independent alignment events being precise, further complicating device manufacture and making device failure more probable.

Figure 1D:
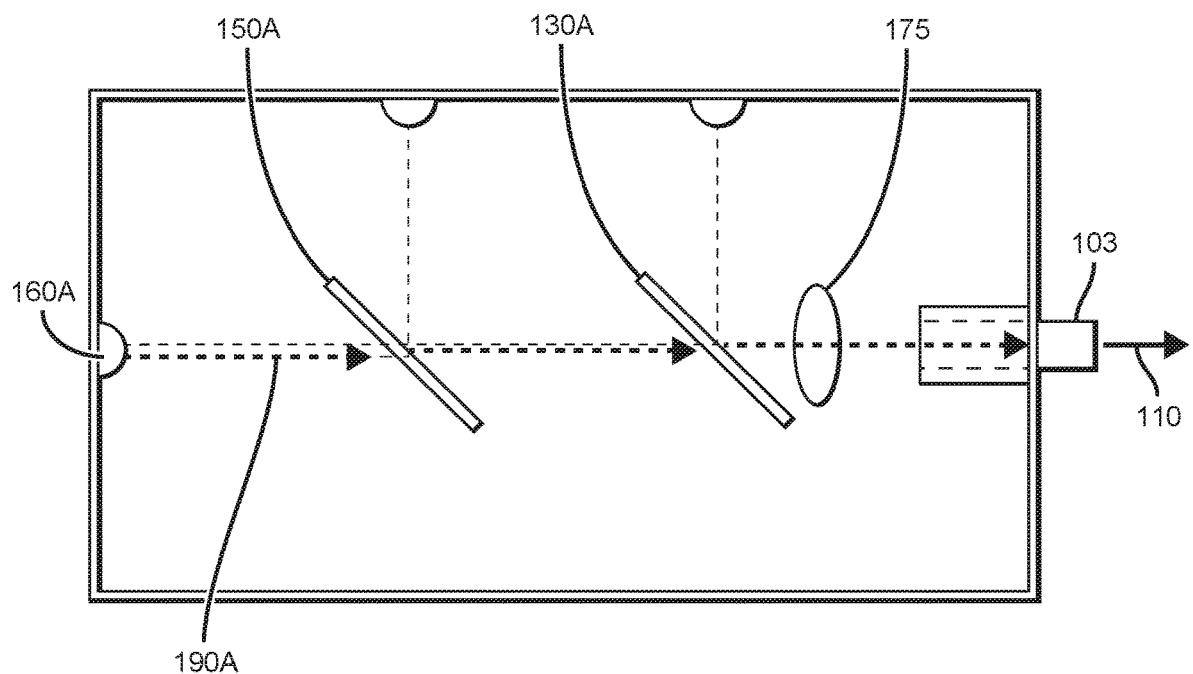

As shown in FIG. 1D, this problem is further compounded when a third laser or laser diode light source is added to the device. As noted above, such lasers emit coherent light in a focused beam with very little divergence. In the device shown in FIG. 1D a red laser 160A emits a beam of light 190A (depicted as a heavy dashed line) essentially along the primary optical axis, passing through both a visible dichroic mirror 150A and a UV dichroic mirror 130A (the beam shifting slightly upward as it passes through both 150A and 130A), through focusing lens 175, and into optical interface 103 to an optical waveguide 110. In order to achieve effective transfer of light energy from the red laser to the optical waveguide the red laser source, the visible dichroic mirror 150A, the UV dichroic mirror 130A, and the optical interface 103 must all be aligned to a high degree of precision. Due to the lack of dispersion inherent in such light sources, even slight misalignment (e.g. less than 10%) results in a significant (e.g. greater than 10%) loss of light transfer to the waveguide 110. This requires expensive and complex assembly tooling and highly skilled assemblers. If it is desired to mix light emitted by a red laser with light emitted by, for example, the green laser and UV laser sources described above, similarly precise alignments must be performed for these light sources.

An example of a device utilizing three different coherent light sources (for example lasers and/or diode lasers) is depicted in FIG. 1E. In this example, a UV laser 120A, green laser 140A, and red laser 160A as described in FIGS. 1B through 1D are emitting light simultaneously. In order to effectively combine these emissions and transfer the combined beam to an optical waveguide 110, highly precise alignments must be made between each of the UV laser 120A, the UV dichroic mirror 130A, the green laser 140A, the green dichroic mirror 150A, the red laser 160A, the focusing lens 175, and the optical interface 103. Only if all of these individual optical elements are precisely aligned with each other will the three coherent and monochromatic wavelength emissions be effectively combined and delivered to the optical waveguide 110. Producing such a coherent light source version of the optical combiner would require the use of highly specialized equipment and highly trained personnel, and would result in a device that would be susceptible to loss of function due to misalignment following the shocks during shipping and the inevitable impacts associated with daily use.

The necessity for highly precise alignment for each optical element when coherent light sources are used limits the utility for optical combiners of the inventive concept when used with such coherent light sources, as each additional light source added for combination results in increasingly tighter tolerances required for production of the device. Such tight tolerances complicate manufacturing and, unless even further precautions are taken, result in fragile devices that are intolerant of conventional shipping conditions and regular use. The inventors have found, surprisingly, that the use of non-coherent lights sources (for example, LEDs) dramatically reduces the impact of slight misalignments and provides substantial light throughput from a highly manufacturable and robust device. In some embodiments of the inventive concept, collimating lenses are associated with the non-coherent light sources in order to reduce dispersion and permit more accurate direction and efficient combination of the emitted non-coherent light, however such collimated outputs are selected to retain a degree of angular dispersion that provides tolerance for slight misalignments.

An example of the use of a non-coherent LED light source in a device of the inventive concept is shown in FIG. 1F. A UVA LED 120B is shown mounting in the optical combiner housing 100, along with a UV dichroic mirror 130B, focusing lens 175, and optical interface 103. The dashed lines 171 and 172 depict the dispersion of optical emissions from the UVA LED 120B at the limits of its angular content. In this example the angular content is approximately 120°, or approximately 60° on either side of the central emission axis 109 of the UVA LED 120. It should be appreciated that other angular contents, for example angular contents ranging from about 10° to about 90° can be considered acceptable. As noted above, in some embodiments of the inventive concept a collimating lens can be used in association with a non-coherent light source. Such a collimating lens can act to reduce (but not eliminate) dispersion. Without initial collimation through a collimating lens located at the output of the UVA LED 120, only the light from within a relatively narrow segment of the UVA LED 120 emission pattern is directed to a UV dichroic mirror 130, as indicated by the solid lines 173 and 174. The portion of emitted light defined by solid lines 173 and 174 is reflected by the UV dichroic mirror 130, directed through focusing lens 175, and subsequently focused to a small area at an input portion of the optical interface 103. It should be appreciated that the reflective coating of the dichroic lens can be selected to permit some of the light emitted by the associated non-coherent light source to pass through, narrowing the range of frequencies emitted by the non-coherent light sources that are directed towards the optical interface. In the example shown, in the absence of collimation the light reaching the optical interface 103 (defined by that in the range of 173 and 174) is approximately 20% of the total light emitted by the UVA LED 120. This degree of transfer efficiency can be sufficient for some applications; as such, use of collimating lenses is not necessary in all embodiments of the inventive concept.

Figure 1G:
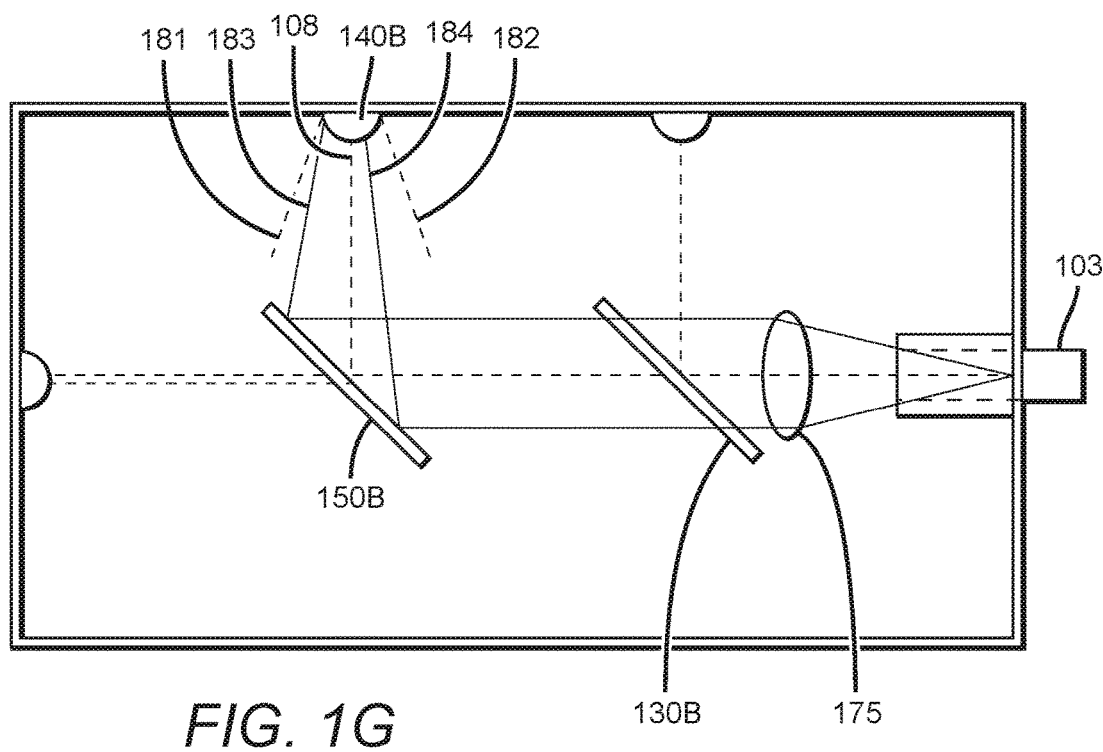

It should be appreciated that different non-coherent light sources can have different degrees of dispersion, as represented by their angular content. FIG. 1G depicts an example of optical combiner of the inventive concept that includes a green LED 140B, which is shown mounted in a housing along with an associated visible dichroic mirror 150B, a UV dichroic mirror 130B, a focusing lens 175, and an optical interface 103. The dashed lines 181 and 182 represent the optical emissions generated by the green LED 140B at the outermost edge of its angular content. In this example, the green LED has an angular content of about 40°, or 20° on either side of the central emission axis 108 of the green LED 140B. In the absence of collimation, only emissions lying within a narrow segment of the green LED 140B emission pattern are directed to the visible dichroic mirror 150B, as indicated by the solid lines 183 and 184. Only light within the segment defined by solid lines 183 and 184 is reflected by the visible dichroic mirror 150B to pass through the UV dichroic mirror 130B and through the focusing lens 175 to be focused to a small area at the input portion of the optical interface 103. A fraction of the non-collimated, non-coherent light output from the green LED 140B (i.e. the light defined by that in the range of 183 and 184) reaches optical interface 103 in such an embodiment, in this instance approximately 40% of the total light emitted by the green LED 140B. This degree of transfer efficiency can be sufficient for some applications; as such, use of collimating lenses is not necessary in all embodiments of the inventive concept.

Figure 1H:
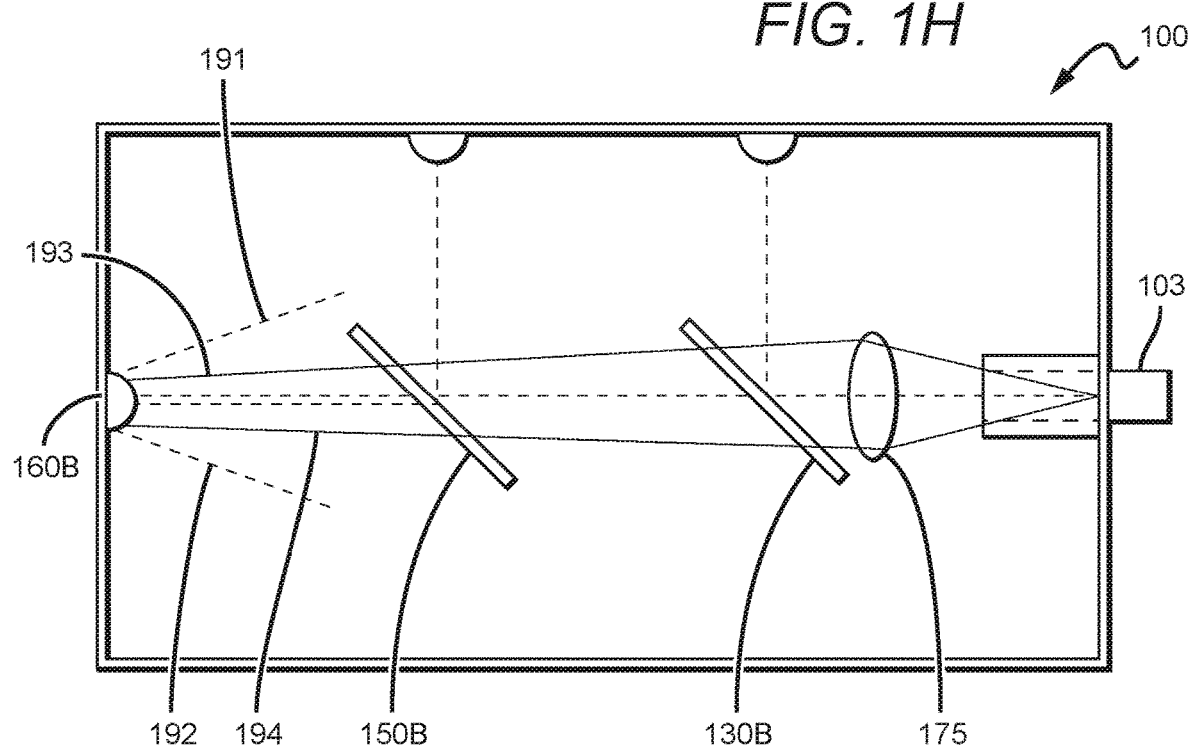

As noted above, not all of the non-coherent light sources of the optical combiner rely on dichroic mirrors to direct their output to the optical interface. An example of this is shown in FIG. 1H. In this example, a red LED 160 is shown mounted on a wall of the housing 100 that opposes the wall carrying the optical interface. Also shown are a visible dichroic mirror 150, a UV dichroic mirror 130, focusing lens 175, and an optical interface 103. The dashed lines 191 and 192 represent the further most optical emissions from the red LED 160 at the outermost edge of its angular content. In this example the angular content of the red LED is approximately 40°, or approximately 20° on either side of the central emission axis 106 of the red LED 160. In the absence of collimation, only light that lies within a narrow segment of the red LED 160 emission pattern is directed to the visible dichroic mirror 150, as indicated by the solid lines 193 and 194. This narrow segment of light defined by solid lines 193 and 194 passes through the visible dichroic mirror 150, through UV dichroic mirror 130, and through focusing lens 175 to focused on a small area at the input of the optical interface 103. In the absence of collimation only a fraction of the non-coherent light emitted by the red LED 160 (i.e. the light that lies within the segment defined by lines 193 and 194) is directed to the optical interface 103. In this example approximately 10% of the total light emitted by the red LED 160 is so directed. This degree of transfer efficiency can be sufficient for some applications; as such, use of collimating lenses is not necessary in all embodiments of the inventive concept.

As noted above, good mixing and transfer efficiency can be achieved without the use of collimation. In some embodiments, however, it can be desirable to incorporate collimating lenses associated with one or more of the non-coherent light sources. The use of such collimating lenses reduces angular dispersion, directing a higher percentage of the light emitted by the non-coherent source towards the optical interface. It should be appreciated, however, that for the same reasons indicated for avoiding the use of coherent light sources, collimation should be selected to provide a degree of dispersion that supports tolerance of minor misalignments. In some embodiments collimating can be used to reduce dispersion to an angular content of less than 40°. In other embodiments collimating can be used to reduce dispersion to an angular content of less than 30°. In still other embodiments collimating can be used to reduce dispersion to an angular content of less than 20°. In still other embodiments collimating can be used to reduce dispersion to an angular content of less than 10°. In still other embodiments collimating can be used to reduce dispersion to an angular content of less than 5°. In still other embodiments collimating can be used to reduce dispersion to an angular content of less than 2°. In preferred embodiments, collimation can be used to adjust effective angular content to between about 0.5° and about 1.5°.

Collimation can be performed using any suitable method or device. In preferred embodiments, collimation is performed using one or more collimating lenses that are associated with a given non-coherent light source. This permits different collimating lens arrangements to be utilized with each source, advantageously supporting a wide range of non-coherent light sources with different light dispersing characteristics. Alternatively, a collimating mirror can be used to direct light from a non-coherent light source towards its associated dichroic mirror or, in the instance where the output from the non-coherent light source is not reflected from a dichroic mirror, towards the optical interface. Other collimating devices, for example fiber collimators, are also considered. Suitable collimating lenses include ball lenses, hemispherical lenses, aspheric lenses, plano-convex lenses, and double-convex lenses.

The mixed light output from the optical combiner can be directed into an optical waveguide, for example an optical fiber. In some embodiments of the inventive concept this can be accomplished by directing the mixed light output to an optical interface that is in optical communication with an input surface of an optical waveguide. In a preferred embodiment of the inventive concept the optical interface 103 is an SMA-905 adapter. In such an embodiment a suitable optical waveguide can include an SMA-905 interface (for example, an SMA-905 terminated fiber optic cable that incorporates an optical fiber). Such an optical waveguide is preferably capable of high (i.e. approximately 90% or greater) transmission levels for wavelengths in the range of 300 nm to 700 nm. In one embodiment, the optical waveguide has a fiber optic core with a diameter of approximately 400 µm. In another embodiment, the optical waveguide has a fiber optic core with a diameter of approximately 600 µm. In yet another embodiment, the optical waveguide has a fiber optic core with a diameter of approximately 800 µm. Regardless, the diameter can be small. As a result, in some embodiments of the inventive concept focusing lenses directing mixed light to the optical interface at the angle as defined within the range of 173 and 174 (see FIG. 1F) should be configured and/or arranged to make this suitably narrow. It should be appreciated that the input surface of an optical waveguide can be polished or otherwise treated to optimize the transmission of the mixed light to the optical waveguide. For example, the face of an SMA-905 terminated optical fiber can be given a suitable polish (for example, a 0.3 um polish, 20/10 scratch and dig or better) in order to accept light at a maximum angle (for example, approximately 25 degrees on either side of the fiber's central axis). Examples of suitable waveguides include fiber optic cables such as POLYMICRO High-OH® FVP400440480 fiber (400 μm core), FVP600660710 (600 μm core), and/or FVP8008801100 (800 μm core), which are designed to transmit a spectrum light wavelengths ranging from low UV through visible wavelengths.

As described above, optical combiners of the inventive concept rely on dichroic mirrors to reflect selected wavelengths of at least some of the non-coherent light sources used, while transmitting others. The size and placement of the dichroic mirror(s) used in such an optical depend on several variables. One important set of variables is the width, shape, and/or dispersion of the collimated "beam" of light originating from non-coherent light source that is associated (i.e. acts as a primary source of light wavelengths reflected from) with the dichroic mirror. This is at least partially dependent on the wavelength or range of wavelengths generated by the non-coherent light source, as different wavelengths have different indexes of refraction in various materials (for example, air, fused silica, plastics, etc.). Regardless of the lens or lenses used to collimate a non-coherent light source, the materials utilized in its construction will at least partially determine the resultant beam width, shape, and/or dispersion. Typically, different lens materials can be selected to provide the desired beam characteristics for different wavelengths. The configuration of the collimating lens is another factor in the width, shape, and dispersion of the collimated beam. Suitable lens configurations include plano-convex, plano-concave, half-ball, ball, and combinations thereof. It should also be appreciated that some non-coherent light sources, for example LEDs, are produced with integrated lens structures. Some LEDs come with a flat "window" that provides essentially no lens function, while others are provided covered with a dome that functions as a lens and serves to reduce the angular content of the optical interface of the LED. Finally, another factor to be taken into consideration for dichroic mirror placement is the distance from the dichroic mirror and the associated non-coherent light source, which in combination with the effect of the collimating lens determine the resultant size of the "spot" of light originating from the associated non-coherent light source on the dichroic mirror's reflective surface.

Figure 1I:
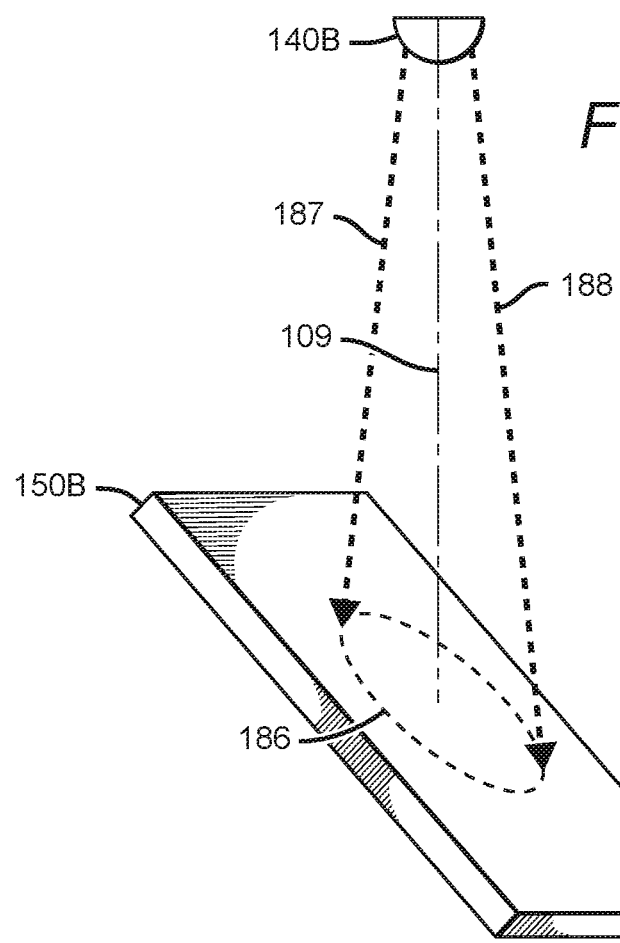
FIG. 1I depicts a distribution of light emitted by a non-coherent light source onto a dichroic mirror associated with the non-coherent light source in an optical combiner of the inventive concept.

Examples of the placement of dichroic mirrors in an optical combiner of the inventive concept are shown in FIG. 1I. A visible dichroic mirror 150B is shown oriented at a 45-degree angle relative to primary optical axis 105. The green LED 140B (i.e. the associated non-coherent light source) is shown oriented in the optical combiner with its central emission axis 109 oriented directly over the center of the visible dichroic mirror 150B, such that the emitted light strikes the reflective coating. Dashed lines 187 and 188 represent the outer range of the distribution of light emitted from a green LED 140B where the output has been collimated. In one embodiment of the optical combiner, the diameter of the cone of light 186 defined by the indicated boundaries 187 and 188, is approximately 0.4 cm at the point at which it strikes the visible dichroic mirror. In another embodiment the diameter of the cone of light 186 defined by the indicated boundaries 187 and 188, is approximately 0.8 cm at the point at which it strikes the visible dichroic mirror. In yet another embodiment the diameter of the cone of light 186 defined by the indicated boundaries 187 and 188, is approximately 1 cm at the point at which it strikes the visible dichroic mirror 150B.

The width of a dichroic mirror in an optical combiner of the inventive concept is a function of the diameter of the cone of collimated light generated by the associated non-coherent light source as it strikes the reflective surface of the mirror. For example, based on the diameters noted above (i.e. ranging from 0.4 cm to 1 cm) an optimal width for the visible dichroic mirror is approximately 1.3 cm. A similar width for the UVA dichroic mirror would be appropriate for UVA light from a non-coherent light source collimated in a similar fashion. The thickness of the dichroic mirrors should be as thin as is practical in order to reduce the loss of light passing through them. This should be balanced against the need for resistance to breakage and ease of handling, as these are compromised as the thickness of the mirror is reduced. An additional practical consideration is the use of relatively inexpensive off-the-shelf materials as opposed to custom materials produced exclusively for this purpose. It should be appreciated that fused silica of the grade and specifications discussed above is commercially available in sheets with a standard thicknesses of 0.5 mm, 1 mm, 3 mm, and thicker (in similar increments). It should also be appreciated that such sheets based on standard thickness are commercially available with surfaces that have been polished to meet or exceed the standards noted above. Use of such standard materials for production of the dichroic mirrors of an optical combiner of the inventive concept permits production by cutting to the desired width and application of the necessary reflective and anti-reflective coatings. Dichroic mirrors of the inventive concept can, of course, be produced to custom thicknesses if necessary, however the need to mill down at least one face and polish it to a high degree in addition to cutting and application of the reflective and anti-reflective coatings would add considerably to the expense of this component. In a preferred embodiment of the inventive concept, the thickness of the dichroic mirror is about 1 mm (0.039 inches).

Figure 1J:
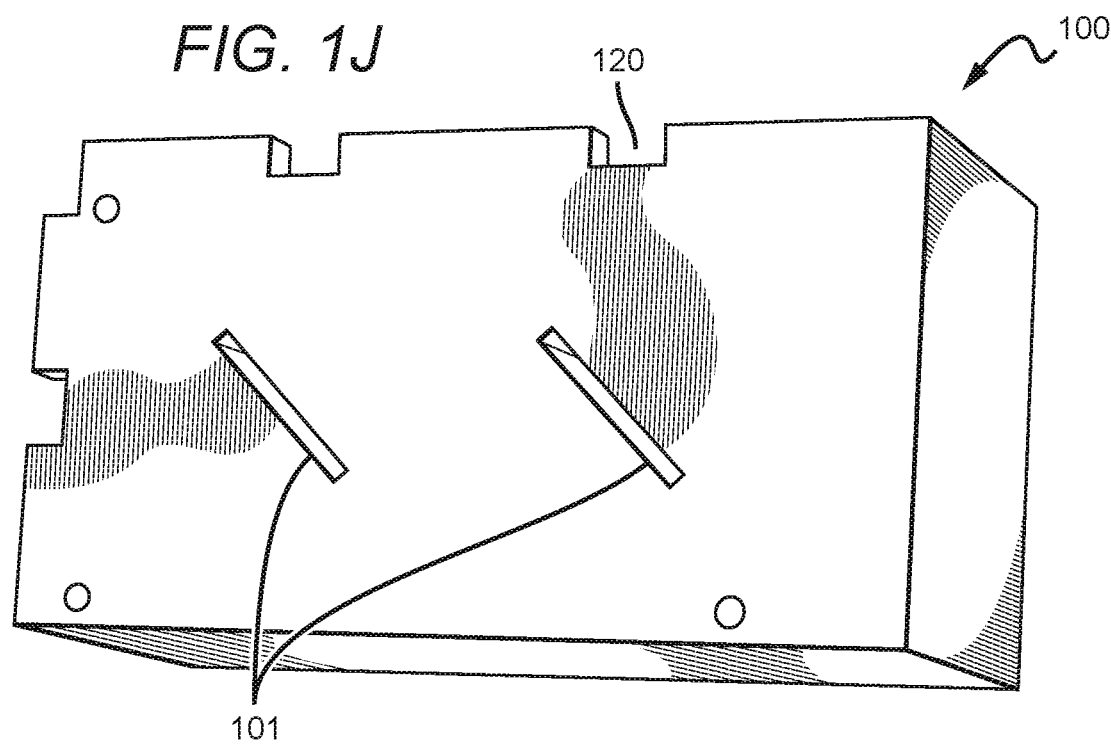
FIG. 1J illustrates features of a housing of an optical combiner of the inventive concept.

Simple, robust, and adequately precise mounting of the dichroic mirrors of the optical combiner presents a number of challenges, even with the relatively high tolerance for misalignment permitted by the inventor's use of non-coherent light sources. As noted above, suitable materials for the housing of the optical combiner can be modified by milling. For example, FIG. 1J depicts an embodiment of the inventive concept in which the housing 100 material is a grade of aluminum selected for its machinability and light weight (for example Aluminum 6061-T6). Traditionally, in order to mount dichroic mirrors within such a housing, slots 101 can be milled into the side of the housing 100, into which the dichroic mirrors may be inserted. This approach, however, can present several issues. Milling a slot with a 1 mm width requires the use of an end-mill of that size, which in machining terms is exceedingly small. The relative fragility of a 1 mm end-mill would require great care in order to avoid breakage of the tool during the milling process. In addition, it is desirable to use a relatively deep slot in order to stably secure a dichroic mirror. Unfortunately, the deepest that commercially available end-mill bits can intrude into the working material is slightly less than 2.5 mm. Given that a machinist could approach from either side of the optical combiner housing and a slot of only 5 mm depth could be achieved. As noted above, embodiments of the inventive concept can utilize a dichroic mirror with a width of approximately 1.3 mm. A slot of 5 mm width would require the use of a very small collimated LED beam width, which can result in the need for relatively tight tolerances and negatively impact overall light throughput to the waveguide. While this approach can be suitable for some embodiments, other approaches for mounting the dichroic mirrors are considered.

As noted above, the use of non-coherent light sources results in a reduced need for high precision in the alignments between various optical components of optical combiners of the inventive concept. One result of this is that relatively simple and readily machinable arrangements can be used to place, secure, and or align dichroic mirrors utilized in these devices. An example of a preferred, practical approach to securing the dichroic mirrors 130 and 150, while maintaining precision alignment of the mirrors, is shown in FIGS. 1K through 1P.

Figure 1K:
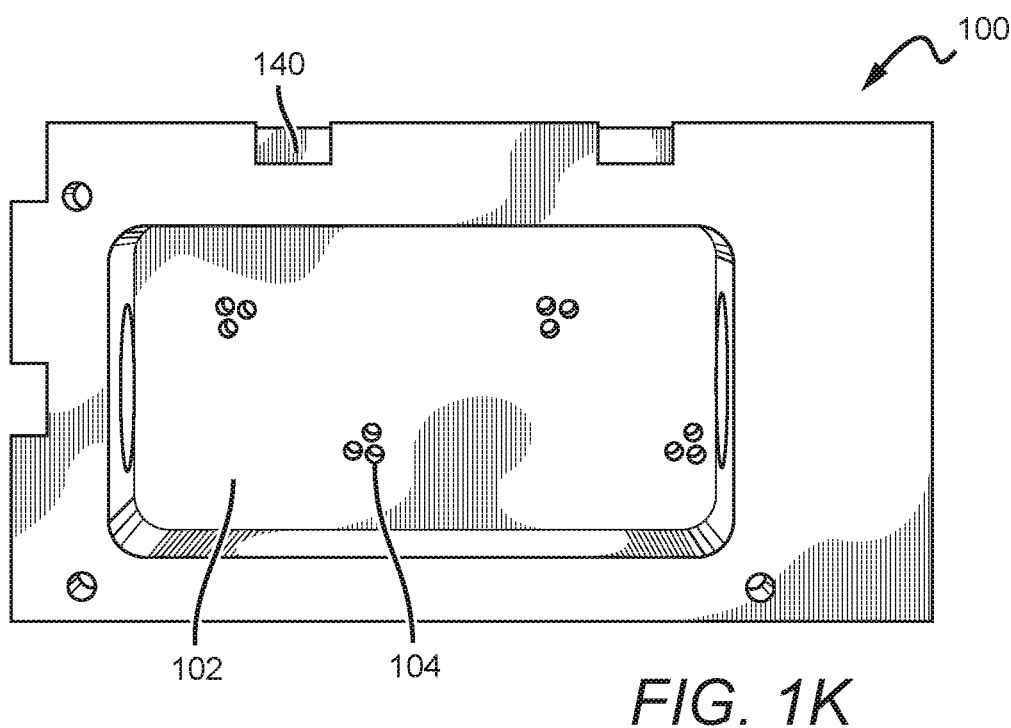
FIGS. 1K to 1P illustrate features of a housing of an optical combiner of the inventive concept utilized in mounting and alignment of the dichroic mirrors.

As depicted in FIG. 1K an optical combiner housing 100 is shown with a relatively large cavity 102 milled to a depth of approximately 2.3 cm. This is readily accomplished using a conventional and durable 0.64 cm to 0.95 cm end mill. In this example twelve small holes 104 are drilled into the face of cavity 102, which lie around the perimeter of the portions of the edges of the dichroic mirrors (such as 130 and 150 of FIG. 1A) positioned as described within the optical combiner housing 100.

Figure 1L:
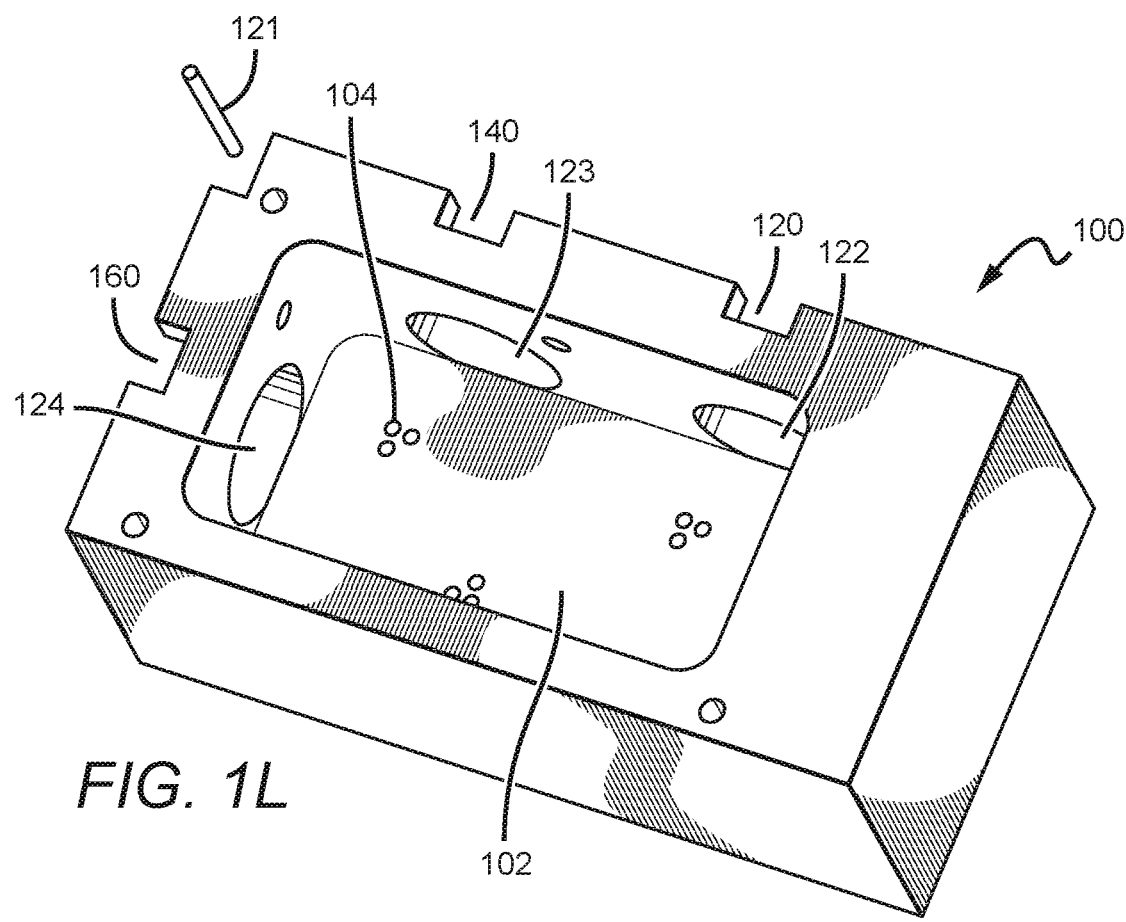

As shown in FIG. 1L, in order to secure a dichroic mirror the twelve small holes 104 are used to secure and position twelve dowel pins 121 (for example, stainless steel dowel pins) within the cavity 102. A dowel pin can be secured within such a hole by any suitable means, including friction or press fitting, welding, soldering, brazing, and/or gluing. In a preferred embodiment of the inventive concept dowel pins are secured into their corresponding small holes by press-fitting. An example of a suitable dowel pin 121 is represented by SUBURBAN INDUSTRIES® part #09984M at the time of this writing. Such a dowel pin 121 can be about 1.2 mm in diameter, and about 1.9 cm long. In a preferred embodiment of the inventive concept, the small holes 104 must be precision drilled to a depth of 0.635 cm, and to a diameter of 1.2 mm with a tolerance of plus or minus 13 µm. This can, for example, be accomplished using a CNC machine. FIG. 1L also depicts circular holes 122, 123 and 124. These are not directly involved in support and orientation of dichroic mirrors, but rather provide a clear path between the light emitted from the non-coherent light sources (such as 120, 140, and 160 of FIG. 1A) and the dichroic mirrors (such as 130 and 150 of FIG. 1A), and eventually to the optical interface.

Figure 1M:
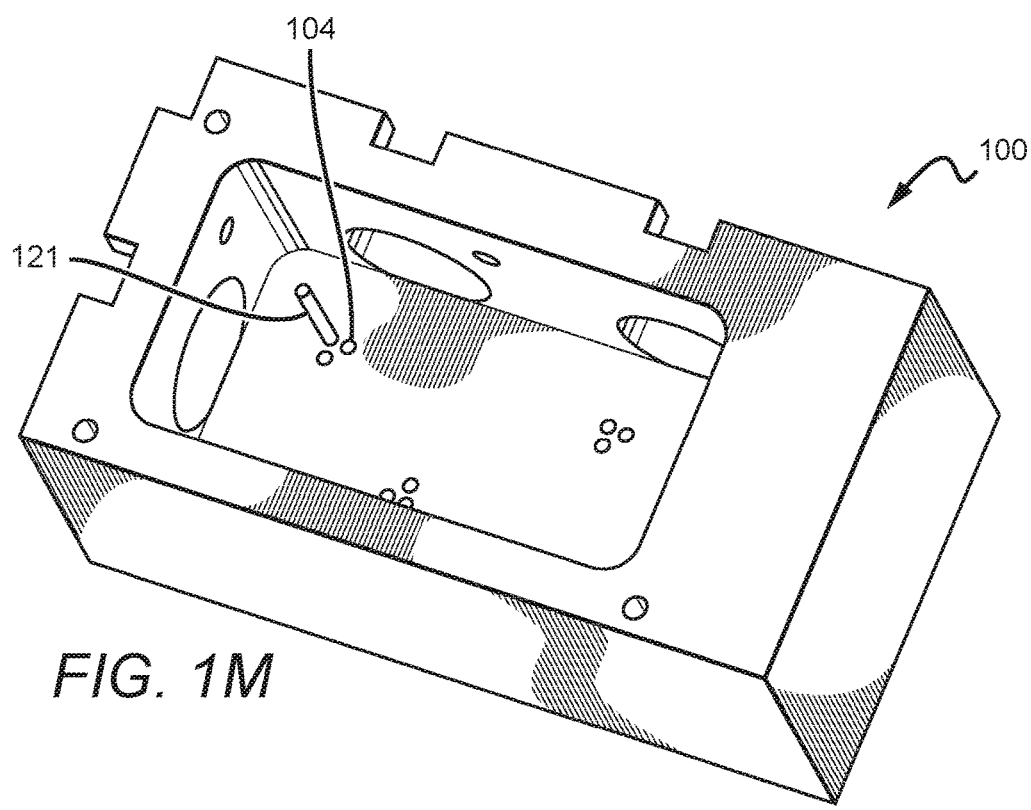

FIG. 1M depicts a dowel pin 121 that is fully inserted into one of the small holes 104. Using the exemplary measurements described above, the depth of the small hole 104 (0.635 cm) leaves 1.27 cm of a 1.9 cm dowel pin 121 exposed. It should be appreciated that the width of the dichroic mirrors in some embodiments of the present invention is approximately 1.27 cm.

In order to accommodate a variety of collimating lens configurations, and in order to accommodate a 1.3 cm width that is compatible with a variety of collimated light "spot" sizes, it is contemplated that a minimum effective length of a dichroic mirror is approximately 1.3 cm. It should be appreciated, however, that additional length can be necessary to secure dichroic mirrors within the optical combiner housing 100. For example, when mounted in the dowel pin arrangement described above a dichroic mirror length of 1.8 cm is suitable to secure the mirror while presenting an effective 1.3 cm width for optical purposes.

Figure 1N:
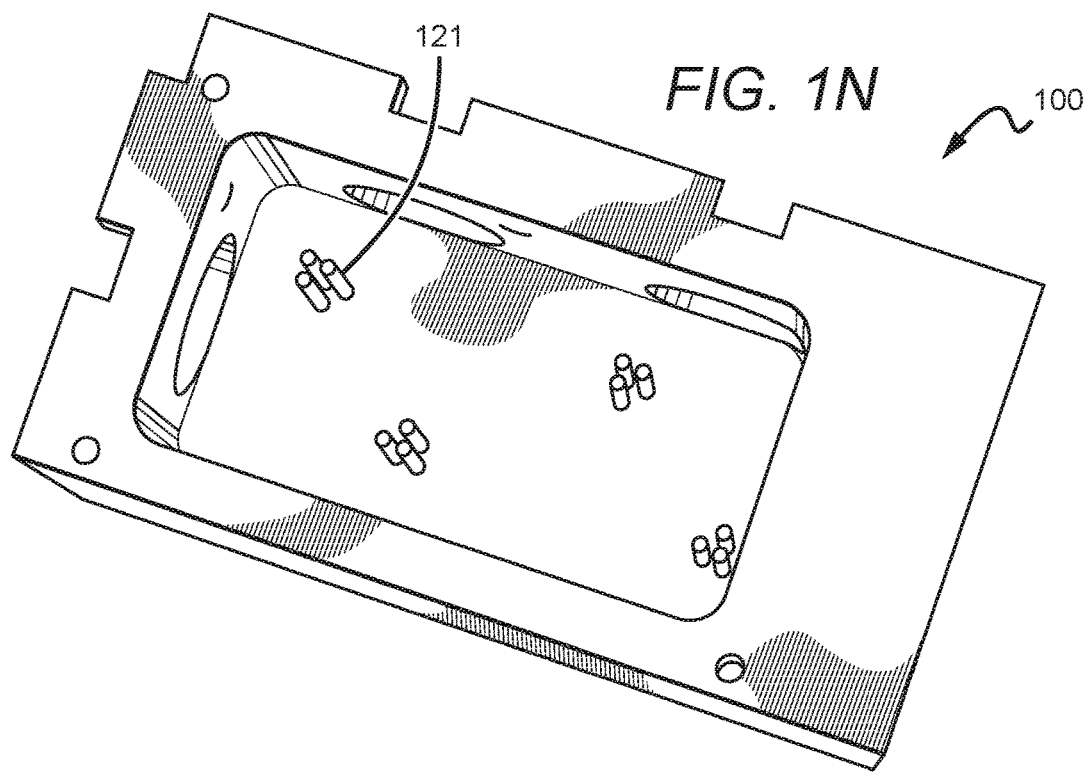
Figure 1O:
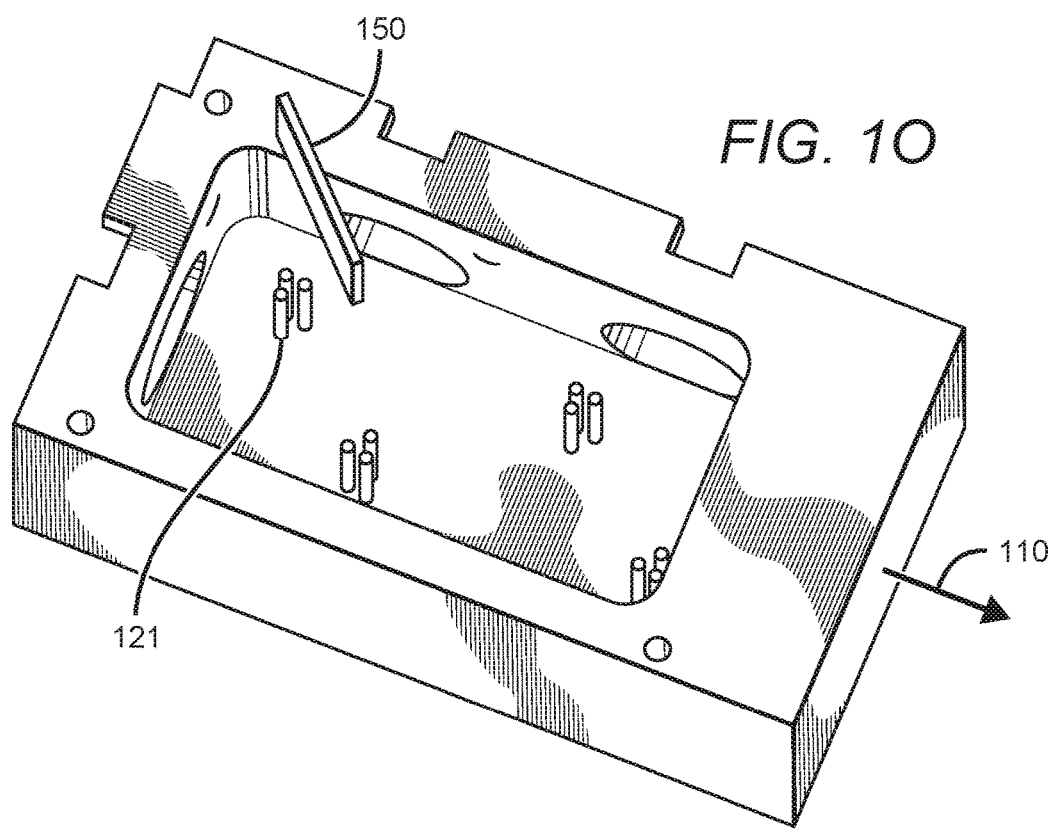

FIG. 1N depicts an optical combiner housing 100 in which twelve dowel pins 121 are fully seated into their respective small holes. Together these twelve inserted dowel pins form a set of projections that extend about 1.3 cm from the wall of the housing and that outline of the termini of two dichroic mirrors (such as 130 and 150 of FIG. 1A) of corresponding size. It should be appreciated that these outlines reflect the orientation of such mirrors within the assembled device. For example, FIG. 1O depicts a dichroic mirror 150 oriented above six of the inserted dowel pins 121, which delineate a suitable orientation for the mirror as described above. It should be appreciated that in this orientation the face of the dichroic mirror 150 that includes the reflective coating is oriented towards an optical waveguide (such as 110 of FIG. 1A).

Figure 1P:
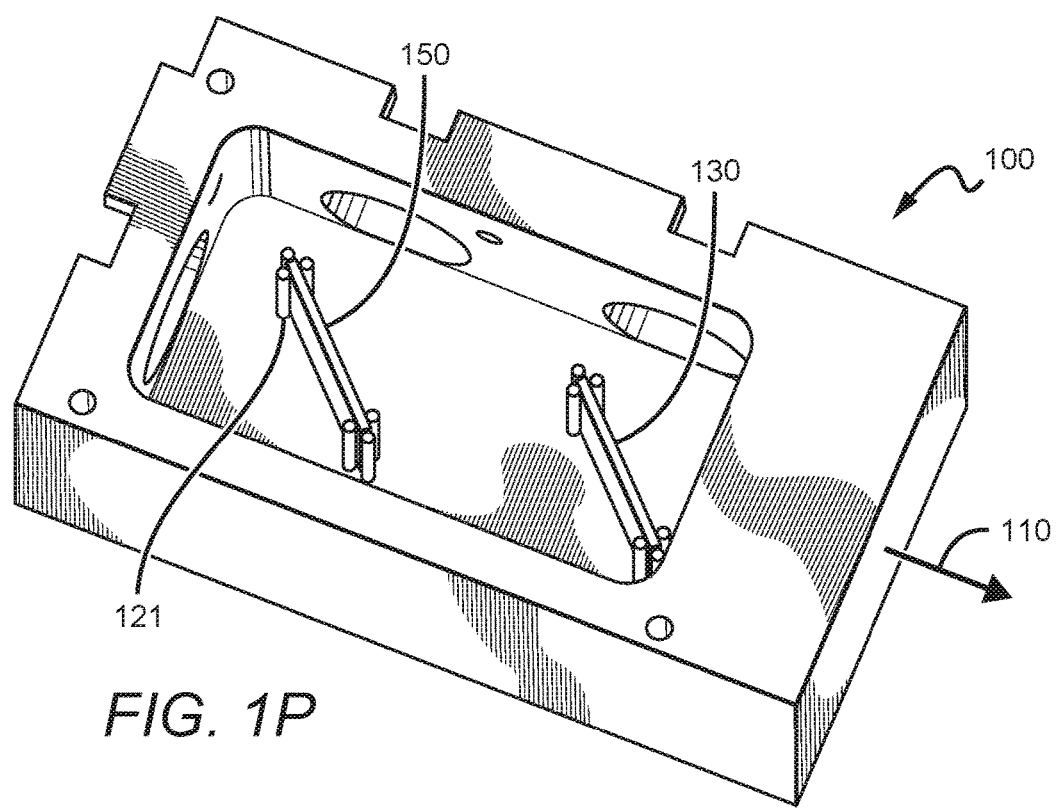

When such dowel pin mounts are utilized, dichroic mirrors can be secured and properly oriented within the optical combiner housing by simple placement within the outline described by the inserted dowel pins, as shown in FIG. 1P. As depicted, a primary dichroic mirror and a secondary dichroic mirror (130, 150) are inserted into the spaces between the dowel pins 121 so as to direct reflected light towards a waveguide 110. In some embodiments of the inventive concept the space that remains above the dowel pins 121 and dichroic mirrors (150, 130) to the wall of the optical combiner housing 100 is about 1 cm. It should be appreciated that the use of such dowel pin arrangements for mounting (i.e. securing and orienting) the dichroic mirrors not only greatly simplifies manufacturing of the component parts of the optical combiner, by providing the capacity to properly mount the dichroic mirrors using simple placement within the outline defined by the pins does not require the use of highly skilled labor, and can also support the use of automated or robotic assembly systems.

As noted above, in preferred embodiments of the inventive concept the non-coherent light sources are light emitting diodes (LEDs). LEDs typically emit light in an essentially radial pattern that extends outward as an emission cone. The angle described by the outer limits of the emission cone relative to its central axis is referred to as the LED's angular content. This angular content is a function of the design of the light emitting portion of the LED and, if present, lensing has been incorporated into the LED as supplied by the manufacturer. In addition, angular content can be modified using additional or secondary lenses (for example, collimating lenses) that are incorporated into the optical combiner. The majority of modern high power LEDs are produced using surface mount technology, such that they can be soldered directly to a printed circuit board without the need for through-holes and pins. As such, precise placement of a given LED can be problematic. If one assumes that LEDs produced by surface mount technology have been placed precisely on their associated printed circuit board, it should be appreciated that the printed circuit board itself must be placed with a precision that is suitable to align the optical emission as required. The inventor has found that deviations by as little as 250 µm can reduce the final combined optical emission. It should be appreciated, however, that such a degree of deviation virtually eliminates the final combined optical emission 110 when coherent light sources such as lasers are utilized.

Similarly, the optical interface 103 must be positioned in alignment with the LED outputs as they are redirected by the dichroic mirrors (as shown in FIGS. 1F, 1G, and 1H). In the case of the use of LEDs that are reflected from a dichroic mirror surface (for example, UVA and green LEDs), collimated and combined LEDs' light beam must be focused onto the optical interface and hence to the input surface of an optical waveguide. In preferred embodiments this requires directing the combined beam to the relatively small face of a mating SMA-905 terminated fiber optic cable. This can be accomplished at least in part by focusing the collimated and combined LED beams using at least one focusing lens 175, which can be mated with the optical interface 103. In some embodiments of the inventive concept such a focusing lens 175 can be mated with the optical interface prior to mounting within the housing 100 of the optical combiner.

Figure 1Q:
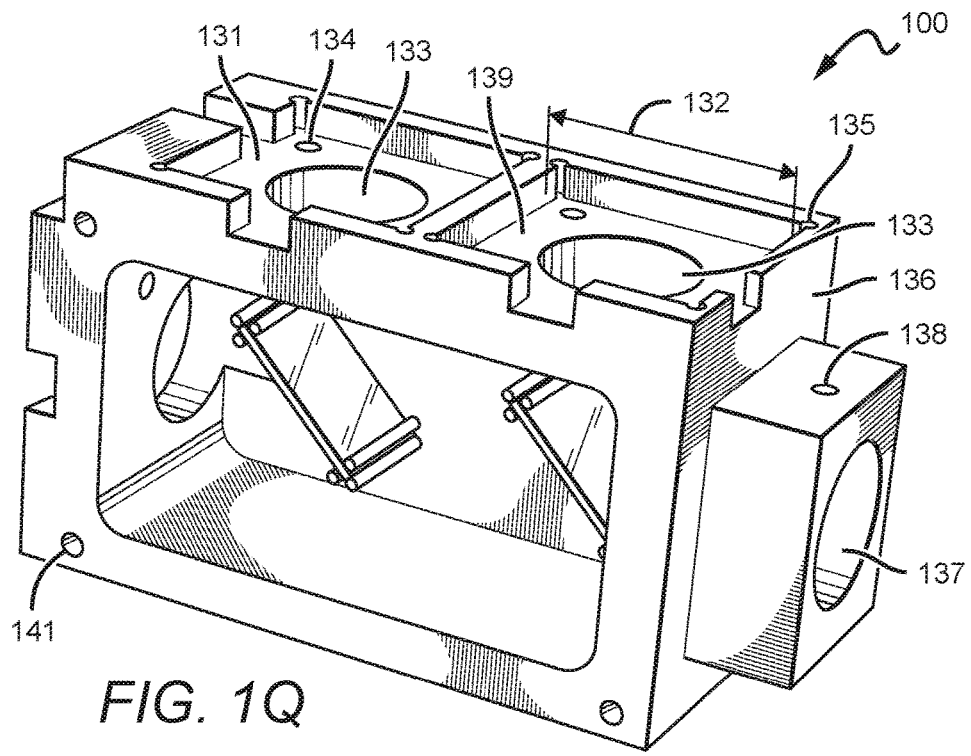
FIGS. 1Q and 1R illustrate features of a housing of an optical combiner of the inventive concept utilized in mounting and alignment of non-coherent light sources.

As shown in FIG. 1Q, an optical combiner housing can be machined with a variety of recesses and cutouts that act as tooling for consistent and accurate placement of optical and other components without the need for highly skilled labor. Other milled areas of the housing can serve other purposes, for example a region such as square area 136 can be milled down to reduce the weight of the optical combiner. In such embodiments recesses, such as recess 139, can be utilized to provide a simple and effective mount for an LED module. In the example depicted in FIG. 1Q a recess 139 is shown centered about the region where it is desirable to mount a light source, such as a UVA LED or a red LED. As noted above, such LEDs are typically supplied as part of a printed circuit board. In such embodiments a recess associated with an LED light source can be slightly (i.e. about 0.1%) wider than the width of the associated circuit board, and have a depth that is compatible with proper placement of the LED light source relative to a collimating lens and/or dichroic mirror. For example, such a printed circuit board can be 2.54 cm wide by 2.54 cm long by 1.57 mm thick. In such an example an associated recess 139 is milled to a depth of 0.330 cm, and measures 2.555 cm on both sides 132, with a tolerance of ±25 μm. For example, when placing the printed circuit board containing a UVA LED into the recess, there exists a nominal spacing of about 76 μm between the sides of the recess 132 and the edges of the printed circuit board. With consistent machining, such narrow spacing permits easy insertion and mounting of the LED while providing consistent alignment of the UVA LED directly over the center of an associated UVA dichroic mirror. FIG. 1Q also depicts a recess 131 that aligns the printed circuit board containing a second noncoherent light source (such as a green LED) over the center of the associated dichroic mirror. It should be noted that holes 135 can drilled into the corners of a recess 139 utilized for mounting LEDs on circuit boards. This accommodates the mismatch between the squared, angular edges of the circuit board and the fact that a typical end-mill used to mill the recess 139 is round. As such, a typical end-mill would leave round corners in the recession 139. The provision of the drilled holes 135 permits the recess to accommodate the angled corners of the circuit boards by extension into the holes 135 without interfering with alignment, providing a simple and secure mount. Two tapped holes 134 (for example, tapped for standard 4-40 threaded screws) are provided in both recesses 131 and 139, which allow printed circuit boards containing primary and secondary light sources to be secured firmly to the optical combiner housing 100.

As shown in the example depicted in FIG. 1Q circular cutouts 133 can be centered in both recesses 139 and 131, which permits optical emissions from the noncoherent light sources to pass through to the corresponding dichroic mirrors, and additionally provide placement for one or more collimating lenses associated with the light sources. An additional circular recess 137 is shown and acts as an entry or mounting point for an assembly containing a focusing lens and/or an optical interface. A circular recess used to provide an entry or mounting point for a lens/optical interface assembly can have a radius that permits placement of the assembly while having tolerances that support the necessary alignment precision. For example, in some embodiments the circular recess 137 measures 1.59 cm and has a tolerance of plus 25 μm. Such a diameter can accommodate a circular housing that measures 1.59 cm (0.625 inches) with a tolerance of minus 25 μm. (0.001 inches), such a housing containing a focusing lens and/or an optical interface. In some embodiments a tapped hole 138 (for example, tapped for 4-40 threaded standard screws) is provided above circular recess 137, with another below (not shown). Such tapped holes permit threaded screws (for example, 4-40 threaded standard screws) to be used to secure an inserted focusing lens/optical interface assembly to the optical combiner housing 100. Additional tapped holes 141 (shown in three places) allow for a cover to contain the components within the housing.

Figure 1R:
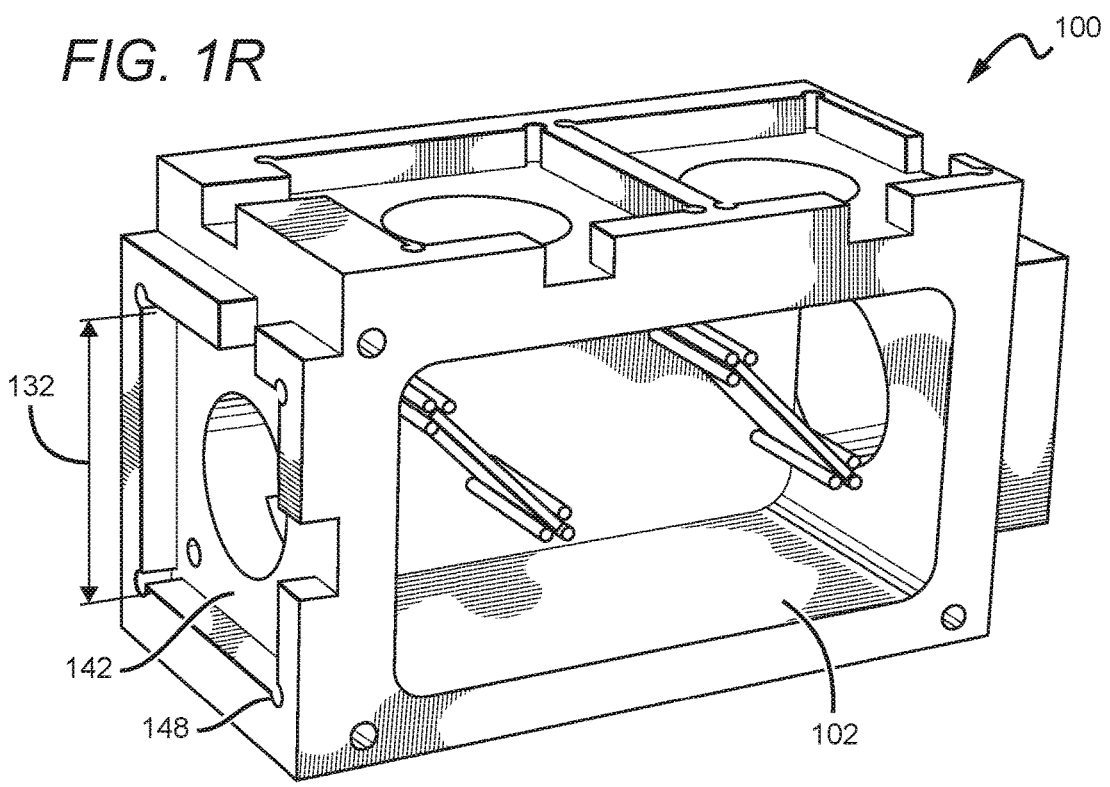

A rear-facing view of an exemplary milled optical combiner housing is shown in FIG. 1R. In this view a recess 142 is shown centered about the region where a non-coherent light source that is not reflected from a dichroic mirror (for example a red LED) is located. In embodiments where this light source is an LED surface mounted on a printed circuit board, the printed circuit board dimensions can be about 2.54 cm in width with a thickness of about 1.57 mm. A corresponding recess 142 is milled to a depth of about 0.330 cm, and has a width of about 2.555 cm on each side 132, with a tolerance of ±25 μm. In such an embodiment, on placing a printed circuit board containing a red LED or other noncoherent light source into the corresponding recess there exists a nominal spacing of about 76 μm between the sides of the recess 142 and the printed circuit board perimeter. With consistent precision machining, this narrow spacing provides alignment of a noncoherent light source (such as a red LED) that permits its output to be in alignment with an optical interface. It should be appreciated that, in some embodiments, such an alignment can include adjustment to correct for refraction of the output of the LED as it passes through one or more dichroic mirrors. As noted above for mounting of other printed circuit boards bearing LEDs, holes 148 are provided in the corners of the recess 142 to accommodate the square, angled corners and edges of a printed circuit board upon insertion into the round corners of recess 142 that can be generated as an artifact of the end-mill used to mill the recession. One or more tapped holes (similar to 134 of FIG. 1Q), which can be tapped for standard 4-40 threaded screws, are provided with recess 142. Such tapped holes allow a printed circuit board (for example, a printed circuit board carrying a red LED) to be secured to the optical combiner housing 100. A circular cutout can be centered over recess 142 to allow for the optical emissions from the associated non-coherent light source to pass through to the inner cavity 102 and to support one or more associated collimating lenses.

It should be appreciated that the incorporated tooling and/or features described above could be embodied as a separate fixture that fits over the optical combiner housing 100 in some embodiments. Alternatively, the incorporated tooling and/or features of the milled housing described above could be embodied as precision fixturing utilizing X/Y/Z axis motorized devices that ensure a precision fit and alignment.

Figure 1S:
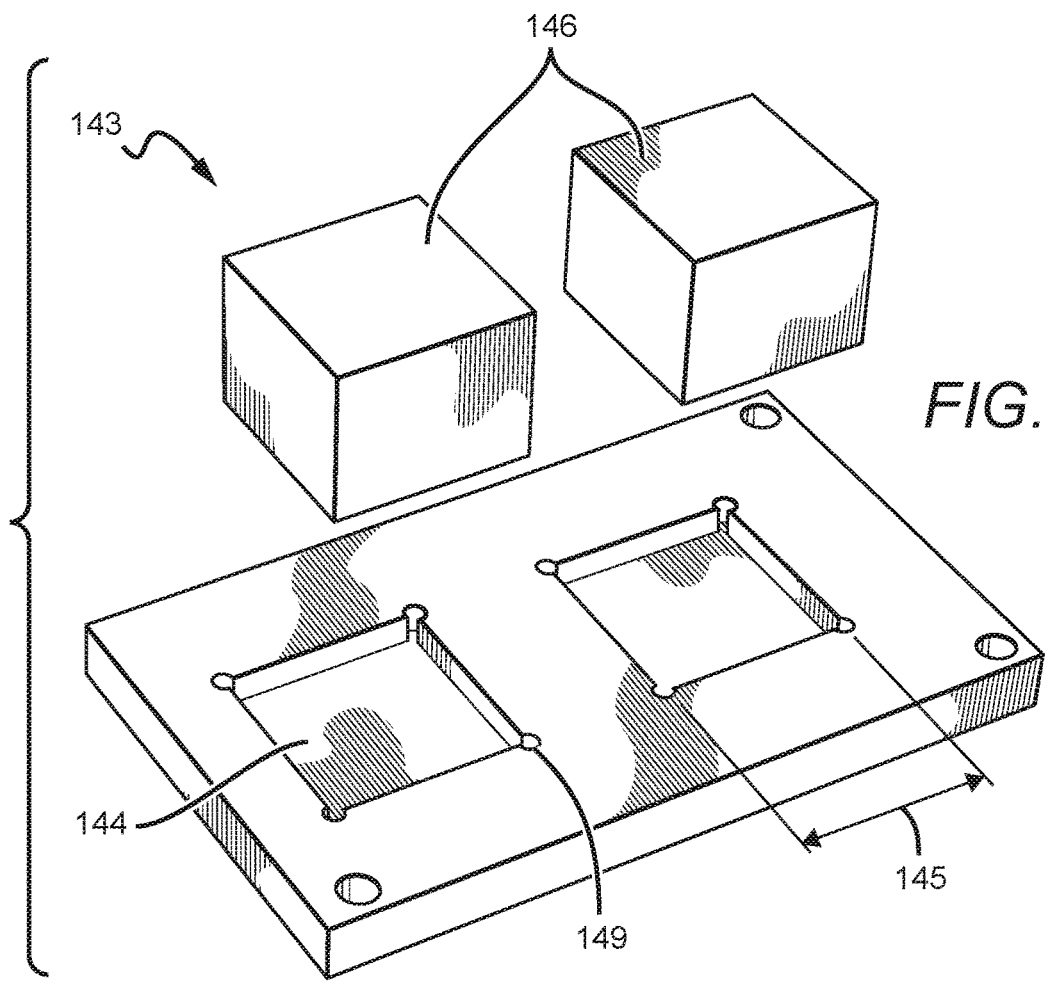
FIG. 1S depicts a cover used in combination with a housing in an optical combiner of the inventive concept.
Figure 1T:
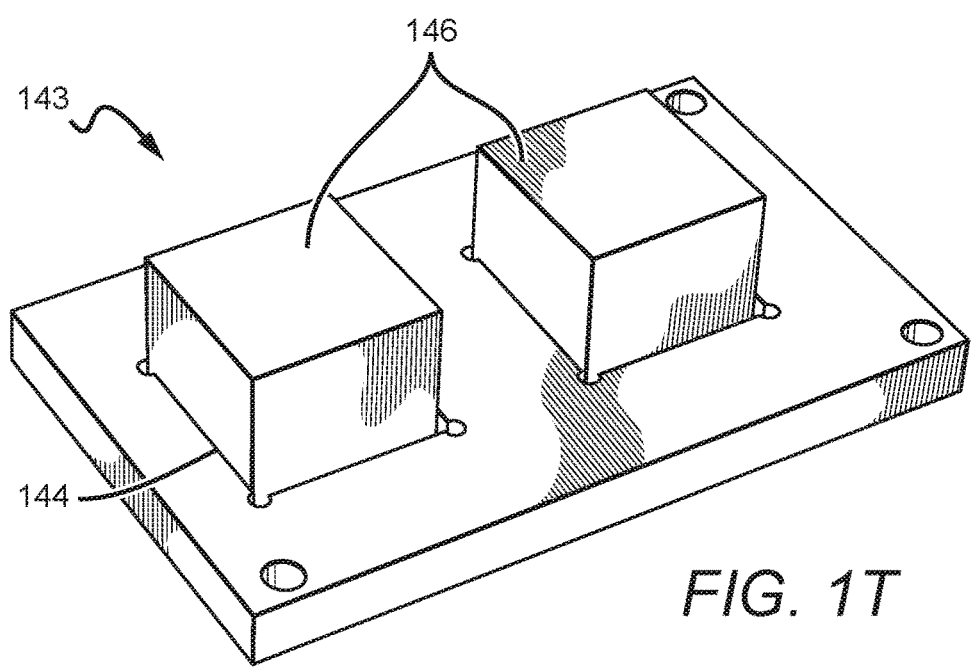
FIG. 1T depicts a cover as shown in FIG. 1S, with foam blocks installed.

An optical combiner of the inventive concept can include a cover that is mated with a milled housing as described above. Such a cover serves to protect working components within the optical combiner housing for both routine use and during shipping. The dimensions of the cover are selected to permit the cover to mate with the body of the respective optical combiner. In an example depicted in FIG. 1S, the optical combiner cover 143 is about 6.4 cm long by about 3.8 cm tall by about 0.5 cm thick, and is at least partially constructed of the same material as the respective optical combiner housing. Such a size can accommodate the open side face of an optical combiner housing after the front region has been milled down (for example, to reduce weight). One face of the optical combiner cover 143 (i.e. the side that faces the open cavity 102 of the optical combiner housing once assembled) can include two essentially square recesses 144 measuring about 1.689 cm on each side, with a tolerance of ±130 μm. Such square recesses 144 can be about 2.5 mm deep. In some embodiments, holes 149 are drilled into the corners of the square recesses 144. Such holes serve a similar function to that of the holes 148 described above (i.e. accommodation of square or angled edges within a milled recess). Two adhesive pliant or foam blocks 146 are also shown, with the adhesive side facing the face of the optical combiner cover 143, placed over the square recesses 144. In preferred embodiments of the inventive concept such blocks are made of open or closed cell foam and include a skin on the surface. In one embodiment of the present invention, a suitable commercially available foam is WEATHER-RESISTANT NEOPRENE/EPDM/SBR FOAM MCMASTER-CARR® part #8694K145, a closed-cell foam that is 1.27 cm thick by 1.588 cm wide and includes a rubber-type adhesive backing. This material could be prepared for use by cutting into 1.588 cm squares. When such foam blocks 146 are inserted into the square recesses 144, there remains 1 cm of foam block 146 above the face of the optical combiner cover 143 (see FIG. 1T). This 1 cm of protruding foam matches a corresponding space remaining above the dowel pins used in such a device and dichroic mirrors in a corresponding optical combiner housing. A cover for an optical combiner of the inventive concept can also include through holes dimensioned to accommodate screws or other fixating devices used for assembly of the cover with the housing. For example three through holes 147 are shown, each with a diameter of 3.454 mm, which can serve as loose-fit through holes for 4-40 screws. Such through holes 147 correspond, when the optical combiner cover 143 with foam blocks 146 is mated to the corresponding optical combiner housing, to 4-40 threaded holes, which permits the optical combiner cover 143 to be secured to the optical combiner housing 100 using standard 4-40 screws.

Figure 1U:
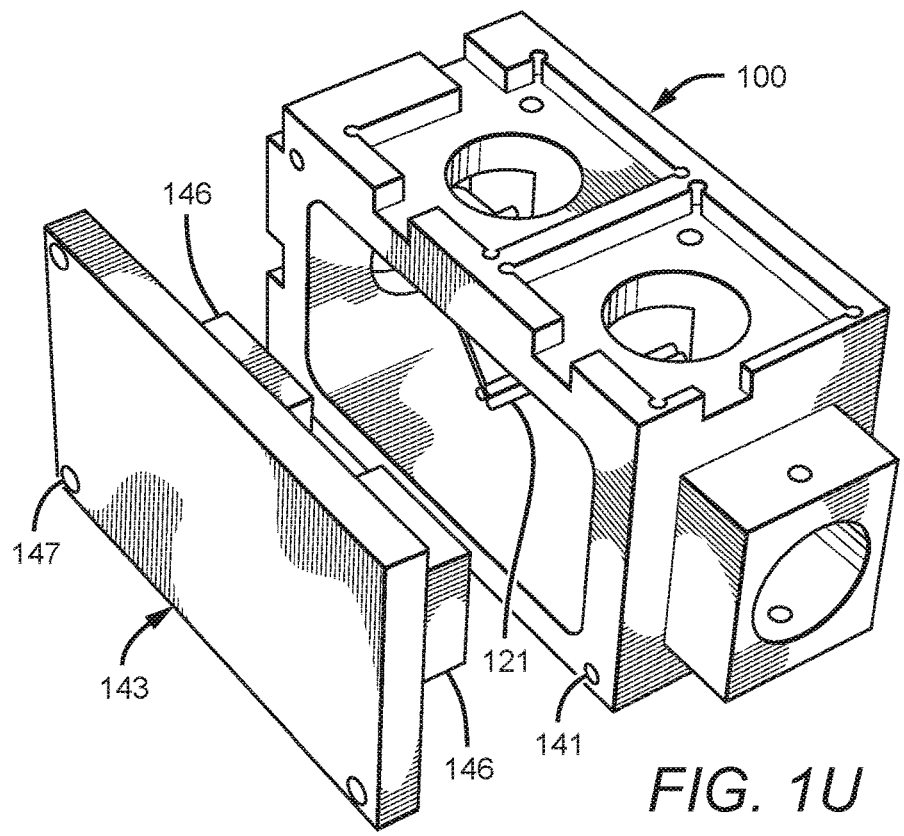
FIGS. 1U and 1V depict assembly of a cover with a housing of an optical combiner of the inventive concept.

FIG. 1U depicts an optical combiner cover 143 assembly oriented relative to an optical combiner housing 100 as it could be assembled in production. Through holes 147 are aligned with 4-40 threaded holes 141. Foam blocks 146 are aligned with dowel pins 121 that support a dichroic mirror. It should be appreciated that additional dichroic mirrors similarly mounted using dowel pins are not visible in this view. The location of the square recesses 144 in the optical combiner cover 143, along with the small spaces left between the perimeter of the square recesses (not visible) and foam blocks 146 provides for a device that low-skilled assemblers, unskilled assemblers, and/or robotic systems can assemble consistently and with the necessary precision.

Figure 1V:
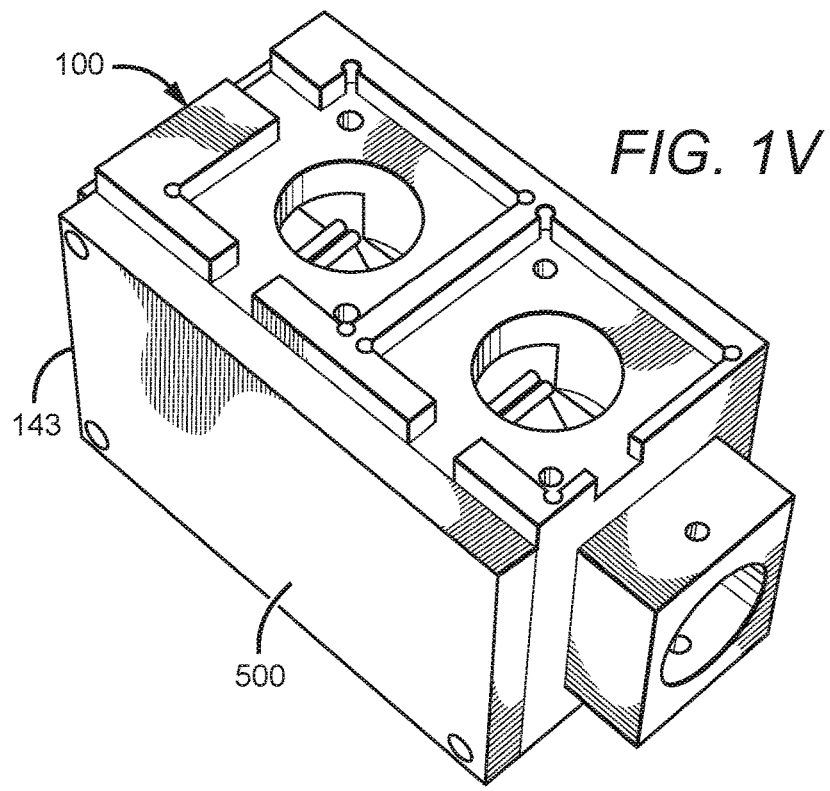

When the optical combiner cover 143 is secured to the housing 100 the foam blocks 146 can act as a barrier that maintains the position of the dowel pins 121 and associated dichroic mirrors. The pliancy of such foam blocks can further provide a vibration-dampening function that serves to buffer shock and vibration which may damage the dichroic mirrors during shipping and routine use. FIG. 1V depicts an optical combiner cover 143 mated with a corresponding optical combiner housing 100 to form an optical combiner base 500.

As noted above, in preferred embodiments of the inventive concept the non-coherent light sources used in the optical combiner are LEDs. In selecting such LEDs the power or intensity of light output appropriate for the intended use is taken into consideration. For example, an optical combiner of the inventive concept can be utilized by or be a component of an intravenous light therapy device. When equipped with an optical combiner of the inventive concept an intravenous light therapy device could deliver light efficiently from a plurality of light sources to a patient's blood stream in vivo.

In an example of such an in vivo intravenous light therapy device, a medical provider would insert a standard catheter (for example, via venipuncture) into a major peripheral vein. An example of a suitable catheter is a BRAUN INTROCAN SAFETY IV CATHETER®, a straight-type FEP lumen material, 20 gauge by 2.54 cm, part #4252543-02. After insertion of the catheter, a standard T-connector with self-healing stop-cock is attached to the catheter and a source of saline solution is connected to one of the fluid inlet ports of the T-connector. Suitable T-connectors include QOSINA® part number 80204. Light can be delivered through the inserted catheter through a fiber optic waveguide. To accomplish this, a fiber optic filament (having a core, cladding, and jacket) with an outer diameter suitable to fit within the inner diameter of the catheter and leave a residual space that permits saline to flow about the fiber optic filament and into the patient. Such a fiber filament can be coupled at one terminus to an adapter or similar device that permits optical communication with an optical interface. For example, such an optical fiber filament can be fitted with a crimp collet designed to mate with a standard SMA-905 terminated fiber optic cable. The remaining terminus of the optical fiber filament can be threaded through a self-healing stop-cock of the T-connector, through the body of the T-connector and the catheter lumen, and into the peripheral vein.

If the optical fiber filament is thus equipped, an SMA-905 terminated fiber optic cable can be connected to the crimp collet thereby mating the two fiber optic faces for optical transmission. The remaining end of the fiber optic cable could be connected to a light source, preferably a polychromatic light source. Historically the light sources used for this purpose have been lasers, which generally provided a wavelength in the 600 nm to 650 nm region. The laser would in turn be controlled by an apparatus that varied the optical power output.

It should be appreciated that such an approach includes a number of optical interfaces (for example, between the laser and the fiber optic cable and between the fiber optic cable and the fiber optic filament), each of which inevitably represents a loss of light energy. In order to accurately and consistently deliver the necessary intensity of light one approach is to begin with the optical power level that it is desirable to provide to the blood stream, then increase the optical power level provided to compensate for the transmission loss that occurs along the transmission path to derive the necessary optical power output of the laser.

Alternatively, if the desired light levels to be delivered to the blood are not known, it may be necessary for the researcher to gradually increase the light intensity delivered by the light source until the desired effect is achieved. In either approach, laser light sources provide a great deal of optical power, and light levels delivered to the peripheral vein would typically be in the range of 10 µW to 100 mW.

As light sources LEDs have a number of advantages over lasers in terms of simplicity, expense, power consumption, heat generation, and choice of available output wavelengths. In considering the use of LEDs in such procedures, however, it should be appreciated that the optical power output of an LED is typically far less than that of a laser. In addition, due to dispersion of non-oriented, non-coherent light from a source LED (which is typically distributed over a $2\pi$ steradian volume), the portion of total light output provided by an LED that successfully transferred to an optical fiber by conventional arrangements is typically approximately 1%. It is therefore necessary to produce and effectively direct as much light as possible from a source LED. As has been discussed, in one embodiment of the present invention, the desired monochromatic peak wavelengths include wavelengths in the range of 350 nm to 390 nm (i.e. UVA), 500 nm to 550 nm (i.e. green and/or yellow), and 600 nm to 690 nm (red and/or orange).

In an optical combiner of the inventive concept, one of the LEDs that has utility in therapeutic medical applications is a UVA LED. In such an LED the desired peak wavelength is between 350 nm to 390 nm. A suitable commercial UVA LED is the NICHIA® NCSU033B, single chip 365 nm LED. Such a UVA LED has a relatively high output power. It should be appreciated that LEDs are available in both single chip and multi-chip configurations, either of which are suitable. However, single chip designs advantageously provide a smaller LED die size than multi-chip designs. This in turn provides a narrow emission cone relative to multi-chip designs and reduces the burden of precision in collimating its output onto the input face of an optical interface. A UVA LED may be available in a variety of "radiant flux" (i.e. optical interface power at a specified drive current) grades or ranks. For example, the NICHIA® NCSU033B LED is available in P32d21 or P32d22 ranks, where an LED of the P32d22 rank produces about 23% greater radiant flux than a corresponding LED at the P32d21 when provided with the same drive current. Generally, it is desirable to obtain the highest radiant flux rank possible.

As noted above, LEDs can be provided with transparent covers that serve to protect the LED and, at least in some instances, act as a lens. Many LEDs are provided with a cover that is essentially a flat "window" with no lens function. An example of such an LED is the NICHIA® NCSU033B LED noted above, which is fitted with a simple flat window that provides no lensing function. For this LED the emission pattern, also referred to as the relative radiant intensity or angular content, is 60° on either side of the LED's midline (i.e. 120° total). Such a wide distribution can be reduced through the use of a collimating lens associated with such an LED in order to direct the majority of light into an optical interface. It should be appreciated that such collimating lenses should be selected to account for both the relative radiant intensity of the associated LED and also the wavelength that is emitted. For example, many plastics would be unsuitable for use with an LED that emits in UVA wavelengths due to a lack of transparency at the emitted wavelengths, and UV transparent materials (such as sapphire) should be utilized.

Although LEDs consume relatively little power relative to laser light sources and utilize the power that they do consume efficiently, LEDs (which have an optimal temperature range) can produce an undesirable amount of heat during operation. As a result, it is desirable to select an LED light source that includes a heat sink or other means (for example, a heat conductive pad or a heat pipe) for conducting heat generated during use away from the LED. For example, the NICHIA® NCSU033B LED includes three "pads", or contacts that are soldered to the printed circuit board. The central pad is utilized to conduct heat away from the LED die. Such a heat sink or other heat transfer device is desirable because in order to obtain the maximum life of an LED it is necessary to operate the LED within drive specifications relative to ambient temperature. For example, for a NICHIA® NCSU033B LED operated at 300 mA, the optimal maximum ambient temperate should be 25° C. (77° F.). As ambient temperature increases beyond this the intensity of the light emission decreases.

Figure 2A:
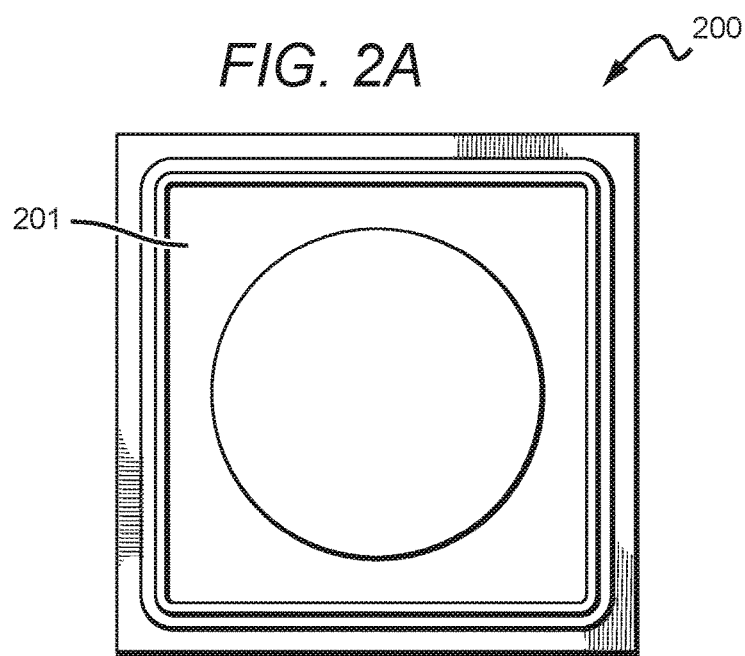
Figure 2B:
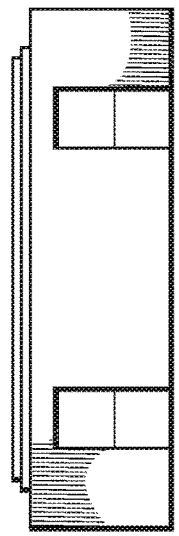
Figure 2C:
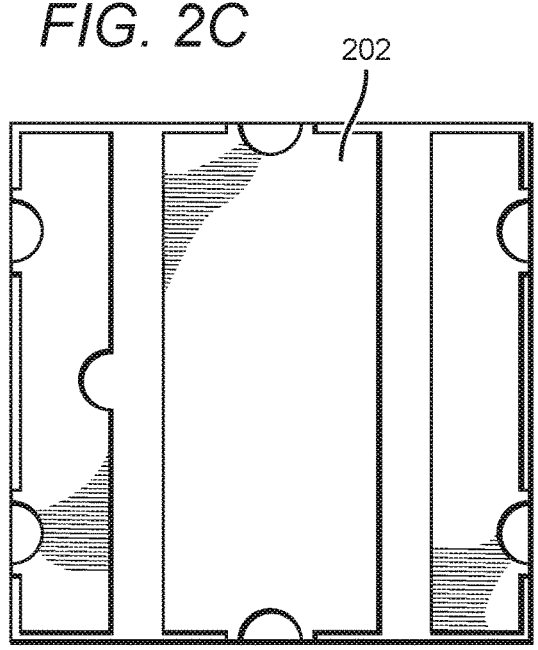

Features of a suitable LED utilized in an optical combiner of the inventive concept, including features that support the transfer of unwanted heat from the LED, are shown in FIGS. 2A to 2D, which show features of a suitable LED as represented by a NICHIA® NCSU033B LED. FIG. 2A shows the top of a NICHIA® UVA LED 200, with an optical window 201. FIG. 2B shows a side view, which demonstrates that the LED has a relatively low profile. It should be appreciated that a low profile for such a device is advantageous, in that collimating lenses can be placed between the LED 200 and the associated dichroic mirror in some embodiments. Since non-coherent light attenuates significantly over distance, the use of low profile light sources minimizes the loss of light in this process. FIG. 2C shows the bottom of the UVA LED 200, with the central pad 202 acting as the LED die heat sink. FIG. 2D is a representation of the relative radiant flux of the LED, which is an example of a flat LED that is provided with a flat window that does not provide significant lensing.

Figure 2F:
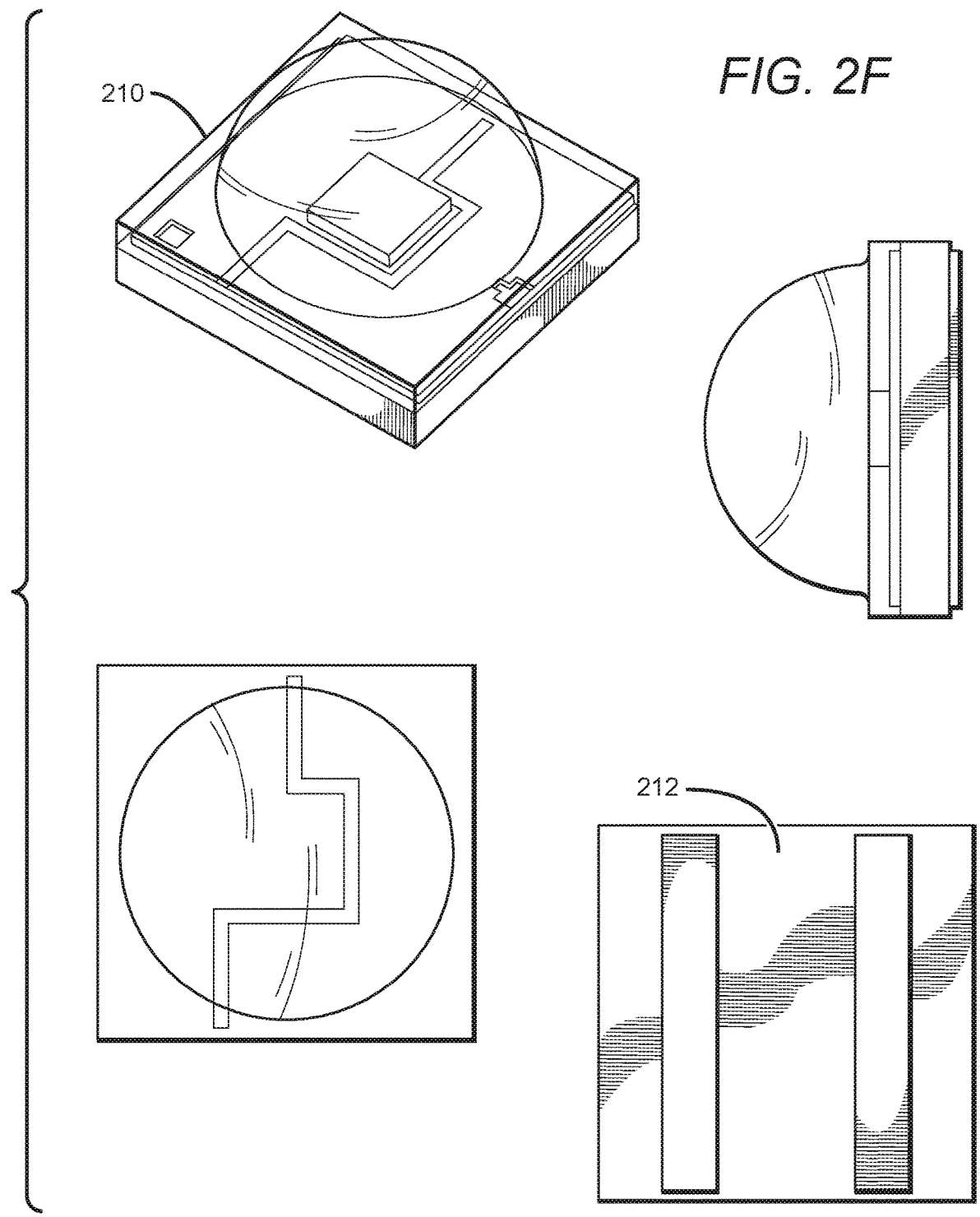
FIG. 2F shows features of an alternative LED suitable for use in an optical combiner of the inventive concept, including an integrated heat sink.

Suitable options for other noncoherent light sources (for example, a green LED and/or a red LED) in an optical combiner of the inventive concept are found in the CREE XLamp XP-E2® series LEDs. Within this series are LEDs having peak wavelengths of approximately 527 nm (i.e. green) and 630 nm (i.e. red) and that have relatively high optical power output. In addition, such LEDs area available with optical domes that provide a narrow angular content of 40 degrees. This simplifies optical collimation. As shown in FIG. 2F, which shows various views of an LED of the CREE XLamp XP-E2® series, such an LED 210 includes an integrated heat sink 212.

Electronics can be mounted on a variety of suitable substrates. Alternatively, in some embodiments electronics are not mounted on a substrate. It should be appreciated that a "bulb" style LED, as shown in FIG. 2E, can be integrated into the system by various methods. The LED die can be connected to leads 223 and 224 and encapsulated in a transparent bulb 221 of a plastic material, which provides protection, electrical isolation, and lensing. The lead 223 represents the cathode, and lead 224 represents the anode. In one embodiment of the present invention, an LED 221 can be positioned by press-fitting the LED 221 into a precision hole drilled into the optical housing substrate, and associated wires can be attached to the leads 223 and 224 outside of the optical housing to drive the LED. In further embodiments, wherein heat sinking is desired, LEDs can be incorporated into surface mount packages in addition to or as an alternative to soldering or connecting and securing wires to the LEDs, which can be tedious and present service problems after routine shipping and use. In another exemplary embodiment, electronics are mounted using a flex circuit, a flexible membrane with printed circuit traces and vias to which electronics can be soldered.

It is further contemplated that electronics can be mounted to a conventional printed circuit board substrate. Typical printed circuit boards are composed of a fiberglass, plastic, or metal core material. Suitable thicknesses for the printed circuit boards include standard thicknesses, for example: 0.79 mm (0.031 inch), 1.6 mm (0.062 inch), and 2.4 mm (0.093 inch). Such a circuit board can be sized and dimensioned to couple with the optical combiner housing, for example via the square recessions (as detailed above). Suitable thicknesses can range from 0.79 mm (0.031 inch) to 2.4 mm (0.093 inch). Preferred embodiments have a thickness of about 1.6 mm (0.062 inch). For example, in some embodiments of the inventive concept the material selected for the electronics substrate is FR4, 1.6 mm (0.062 inch) thick, non-metal-core printed circuit board.

In typical metal-core printed circuit boards a metal slab is sandwiched between two fiber-glass layers. For example, a 1.6 mm (0.062 inch) thick aluminum core printed circuit board can be used. Such metal-core circuit boards can advantageously provide an internal heat sink function that effectively spreads or dissipates heat. Additionally, in such embodiments additional heat dissipation can be provided by forced air convention over the circuit board. More preferably, fan-sinks (a combination of a heat sink and fan) can be employed to provide even more heat dissipation.

Minimizing the number of components on a printed circuit board of the optical combiner advantageously decreases the footprint of the printed circuit board, decreases the overall size of the optical combiner, and simplifies integration into the final product. It should also be appreciated that making the optical combiner more compact reduces the length of the optical paths of the LED emissions within the optical combiner, reducing losses. The integrated electronic components can include: an LED, a connector to mate a printed circuit board to a controlling apparatus, and a temperature sensing device such as a thermistor or thermocouple which can be used to regulate the temperature of circuit components (for example, the LED). LED are generally connected via a cathode and anode that connect with the circuit. Similarly, thermistors (or thermocouples) also generally require two connections each. As such, in preferred embodiments a compact four position connector can be utilized in circuits that include both an LED and a thermistor. Such a four position connector can be mounted using surface mount technology.

LEDs can optionally have pins. In other embodiments the LEDs utilized are connected to the printed circuit boards using surface mount technology. Such printed circuit boards are dimensioned to mate with the flat surfaces of square recessions (such as those detailed above) such that the LED faces the interior of the housing. For example, a square recession can provide a mating surface for a printed circuit board about the perimeter of a circular cutout that provides access to the interior of the housing. In one embodiment, the LED is centered on the side of the printed circuit board mating with such a square recession face.

As noted above, in some embodiments of the inventive concept the central emission axes of the primary noncoherent light source and the secondary noncoherent light source are aligned with the center of their associated dichroic mirrors. Additionally, the central emission axis of the tertiary noncoherent light source can be aligned with a primary optical axis centered on a focusing lens, or alternatively on a secondary optical axis or a tertiary optical axis that is parallel to but offset from the primary optical axis. This configuration can be achieved by fitting the printed circuit boards associated with such light sources into recessions in the housing of the optical combiner such that each side of a printed circuit board having a light source (such as an LED) lays flat and parallel with the surface of a square recession (as shown in FIG. 1Q).

In contemplated embodiments, a thermistor is placed on the side of the printed circuit board opposing LED. To provide data related to the LED temperature through the printed circuit board, the thermistor can be positioned in close proximity to the LED. It should be appreciated that positioning the thermistor and LED on opposing sides of the printed circuit board, while counterintuitive, advantageously keeps the face of the printed circuit board flat on the LED side.

To aid in centering the LEDs used in the optical combiner on their respective printed circuit boards, crosshairs can be printed on the LED sides of the printed circuit boards. Such crosshairs can aid in both manual and automated placement of the LED. Such crosshairs can be produced or printed by any suitable method. For example silkscreen printing can be used to print the crosshairs on a printed circuit board, where it adds approximately 0.03 mm (0.001 inches), or less to the thickness. It should also be appreciated that such silkscreen printing can aid in identification of the printed circuit board and components.

As noted above, in some embodiments of the inventive concept it is desirable to mount at least some electronic components using surface mounting. This can, for example, be accomplished by initially laying a solder paste stencil over the printed circuit board. Next, an assembler rolls a roller coated with solder paste over the stencil to apply solder paste selectively to the designated solder pads of the printed circuit board. After the stencil is removed, the components are installed onto the solder paste. The assembly circuit is then placed in an oven, which heats and melts the solder paste to form a solid electrical connection between the component's electrical contacts and the printed circuit board pads. It should be appreciated that the thickness of the solder paste (determined by the thickness of the solder paste stencil) should be thin enough so that as the solder paste melts, sliding of the LEDs off center is limited or eliminated.

In still further embodiments of the inventive subject matter, LEDs can be placed onto printed circuit boards using an automated process. For example, the automated arm of a pick and place device can precisely place LEDs onto the printed circuit boards. Because the LEDs emit non-coherent light, the LEDs are preferably positioned to maximize the intensity of the light emitted through the optical interface. Advantageously, embodiments of the inventive concept are tolerant of offset or misalignment of the LEDs with respect to the optics and thus makes them particularly well suited for automated assembly. In comparison, a laser having a slight offset may eliminate emission of light through the single optical interface. Suitable pick and place devices do not scratch or obscure the surface of the window or lens of the LED to a greater extent than manual placement of the LEDs. Similarly, other features such as connectors and thermistors can be placed manually, via pick and place device, or other suitable methods.

Figure 2G:
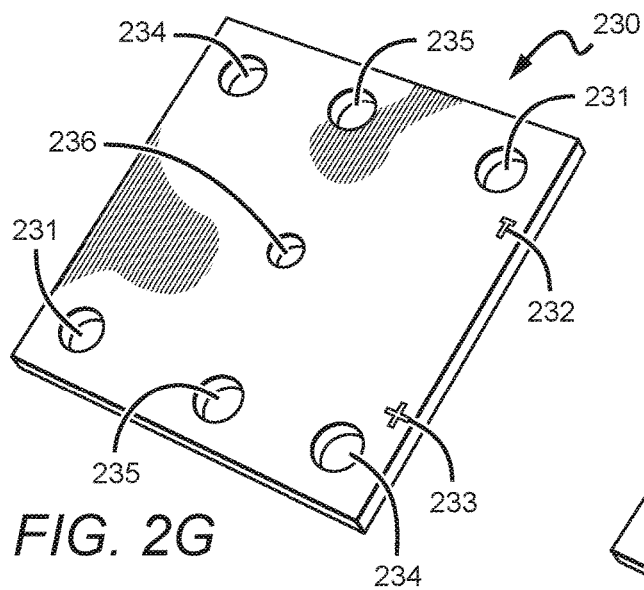
FIG. 2G to 2I depict features of printed circuit boards suitable for use in conjunction with an LED in an optical combiner of the inventive concept.

FIG. 2G shows an example of a printed circuit board 230. In some embodiments, through holes 231, 234, 235 are sized and dimensioned to receive 4-40 machine screws, which can be mated with 4-40 threaded tapped holes in a collimating lens assembly. In contemplated embodiments, printed circuit board 230 is 1.6 mm (0.062 inch) thick, made of FR4, and measures 2.54 cm (1.0 inch) on both sides. FIG. 2G illustrates the top of, for example, a green LED printed circuit board. Symbols can be placed to illustrate connections to a connector, such as for a thermistor (indicated by the "T" 232). Similarly, the LED side of a connector can be indicated by a "+" sign 233. Through holes (e.g. through hole 234) are preferably sized and dimensioned to permit mounting a collimating lens assembly, for example using 4-40 machine screws. Through holes 235, positioned for mounting a pin sink to the printed circuit board 230 and mating the collimating lens assembly, are also preferably sized and dimensioned to couple with 4-40 machine screws. Through hole 236, having a diameter of approximately 2.0 mm (0.080 inches) can be substantially centered over the heat sink pad of an LED to facilitate thermal communication between a pin sink and the LED. In some embodiments a small pin on the underside of the heat sink pad contacts the aforementioned LED to permit conduction of heat.

Figure 2H:
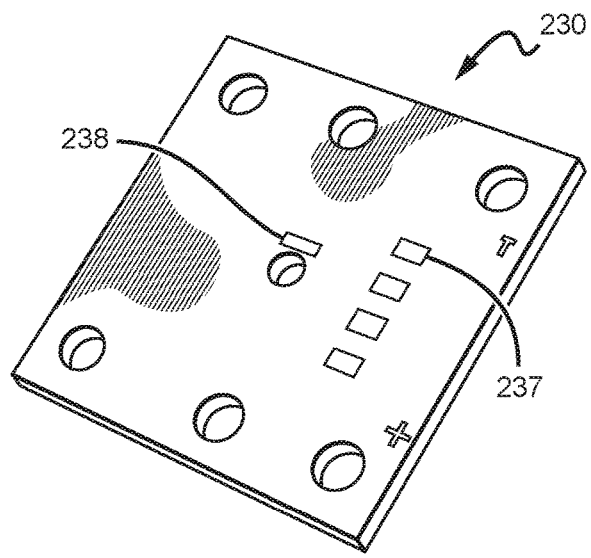

FIG. 2H shows an alternative top and side view of a printed circuit board 230. One possible configuration of solder pads 237 for soldering a 4-position surface mount connector is shown. To facilitate measurement of the temperature proximate to the LED, solder pad 238 (which can be utilized for soldering a thermistor to the printed circuit board 230) is positioned on the opposite side of the printed circuit board from where the LED will be soldered. In FIG. 2K, thermistor 245 is shown soldered to solder pad (not visible) and a set of connectors 244 (for example, a 4-position, right angle, surface mounted connector) is shown soldered to the solder pads 237. Suitable connectors for this purpose include the SAMTEC TSM-104-01-X-SH connector. This connector provides a very low profile, and is appropriate for an industry standard receptacle connector such as an MTE style connector to mate with. It should be noted that for additional shock proofing (for example; to address shipping/vibration/shock concerns) the mating connector can be secured with an electronics-safe room temperature vulcanization or hot glue adhesive.

Figure 2I:
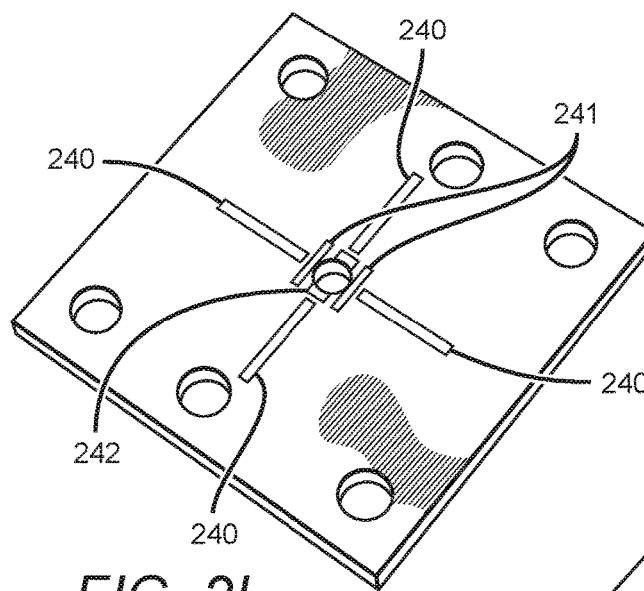
Figure 2J:
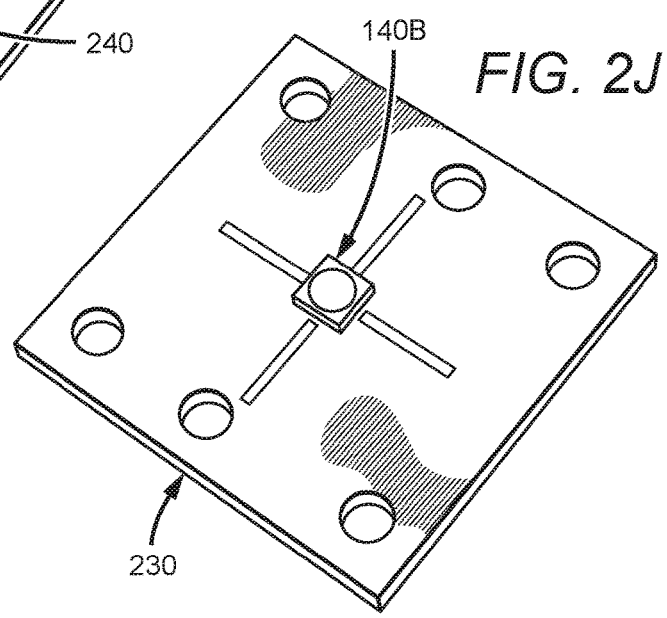
FIG. 2J shows an LED mounted on a circuit board suitable for use in an optical combiner of the inventive concept.
Figure 2K:
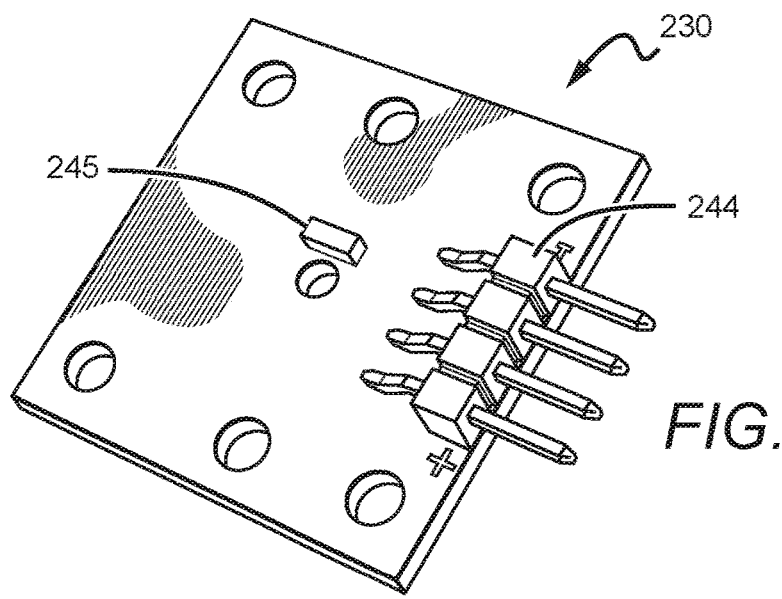
FIG. 2K shows a thermistor and a set of connectors mounted on a circuit board suitable for use in an optical combiner of the inventive concept.

The under side of an exemplary printed circuit board 230 is shown in FIG. 2I. Silk screened cross-hairs 240 aid can be used to aid visual or automated alignment of a surface mount LED substantially in the center of the board prior to soldering. As shown, solder pads 241 transmit power to the LED cathode and anode. In the embodiment shown, solder pad 242 for the heat dissipating heat sink pad of the LED is positioned over through hole 236. In FIG. 2J, a green LED 140B is shown soldered to the solder pads of a circuit board 230, centered in the silk screened cross-hairs 240.

Assemblers may not be able to distinguish which board is to be coupled with each wavelength emitting LED. Board types can be identified, for example, using a silkscreened print or through the use of differently colored circuit boards. For example, FR4 material circuit boards are readily available in a variety of colors. In preferred embodiments, a green LED printed circuit board is green, a red LED printed circuit board is red, and a UVA LED 120 printed circuit board is black. Advantageously, such black coloring provides resistance to UV damage.

Thermal management of the LEDs can increase LED optical emission and extend the functional life of an LED at a given drive current, providing for a higher performance and more robust device. For example, the Nichia NCSU033B has a rated life of 1000 hours at a drive current and ambient temperature of 700 mA and 25° C., however if the ambient temperature is increased to 85° C. the drive current must be reduced to 350 mA (with a concomitant reduction in light output) to achieve the same lifetime. In preferred embodiments, an LED lifetime of at least 1000 hours is provided at the operating drive current and ambient temperature. For example, drive currents of about 350, 400, 450, 500, 550, 600, 650, and 700 mA are suitable, with thermal control (for example utilizing heat sinks or similar devices) supporting higher drive currents.

Ambient temperatures in contemplated environments can be less than about 25° C., or can range from about 25° C. to about 85° C. For example, an intravenous light therapy system utilizing the optical combiner can be used in medical environments, which can be cooler than 25° C. (77° F.). At temperatures below 25° C. the heat burden on LEDs is reduced. For example, the lifetime of Nichia NCSU033B LEDs can be expected to exceed 1000 hours under such conditions. In extreme environments (such as: jungle, desert, or military operations), the ambient temperature can be 37.7° C. (100° F.) or higher. Under such conditions, 1000 hours of LED lifetime can be expected when such an LED is operated at or below 500 mA (in this instance specifications for drive current vs temperature reveal that at 500 mA the 1000 hour lifetime can be maintained at ambient temperatures of up to about 57° C. (135° F.)). Therefore, it is further contemplated that the intravenous light therapy system utilizing an optical combiner of the inventive concept can be used at ambient temperatures approaching 57° C. (135° F.), i.e., at or above temperatures expected in both medical and extreme environments.

It is also desirable to maintain the life of the red and green LEDs. As in the case of the Nichia NCSU033B LEDs, the maximum drive current used during operation of the intravenous light therapy system should preserve the lifetime of the LEDs at expected ambient temperatures. For example, CREE XLamp LEDs also have a rated life of 1000 hours at drive current/ambient temperature levels of 700 mA/25° C. and 350 mA/85° C. In one embodiment of the present invention, a maximum drive current of 350 mA is set for both a red LED and a green LED. Specifications of exemplary LEDs show that at 350 mA, the 1000 hour lifetime can be maintained at a maximum ambient temperature of 57° C. (135° F.). Advantageously, 57° C. ambient is higher than would be acceptable in most medical environments. Even in extreme environments (such as a jungle or desert military operation), a limit of 37.7° C. (100° F.) can be assumed.

To further improve the robustness and/or extend life of the device, as well as to increase LED optical emissions, cooling mechanisms can be incorporated into the assembly. One cooling mechanism is a central pad associated with the LED and utilized for heat dissipation. When such a pad is soldered to the printed circuit board it can be placed in thermal communication with a plane of heat conducting material (for example, copper) that acts to increase the area over which heat can be dissipated. In other embodiments of the present invention, it is desirable to effect more vigorous cooling.

Such cooling can be achieved by incorporating an external heat-sink and/or fan sink into the assembly. Fan sinks provide cooling via an external fan, which provides a strong flow of air over a heat sink that is in thermal contact with a component or device to be cooled. A variety of heat sink designs are commercially available including: fin-sinks, pin-sinks, splayed pin fin heat sinks, etc. In further contemplated embodiments, either liquid cooling (e.g., via a cooling block) or heat pipes can be incorporated to conduct heat away from the assembly. In an exemplary embodiment of the present invention, custom pin sinks are utilized to transfer heat away from the LEDs.

Figure 2L:
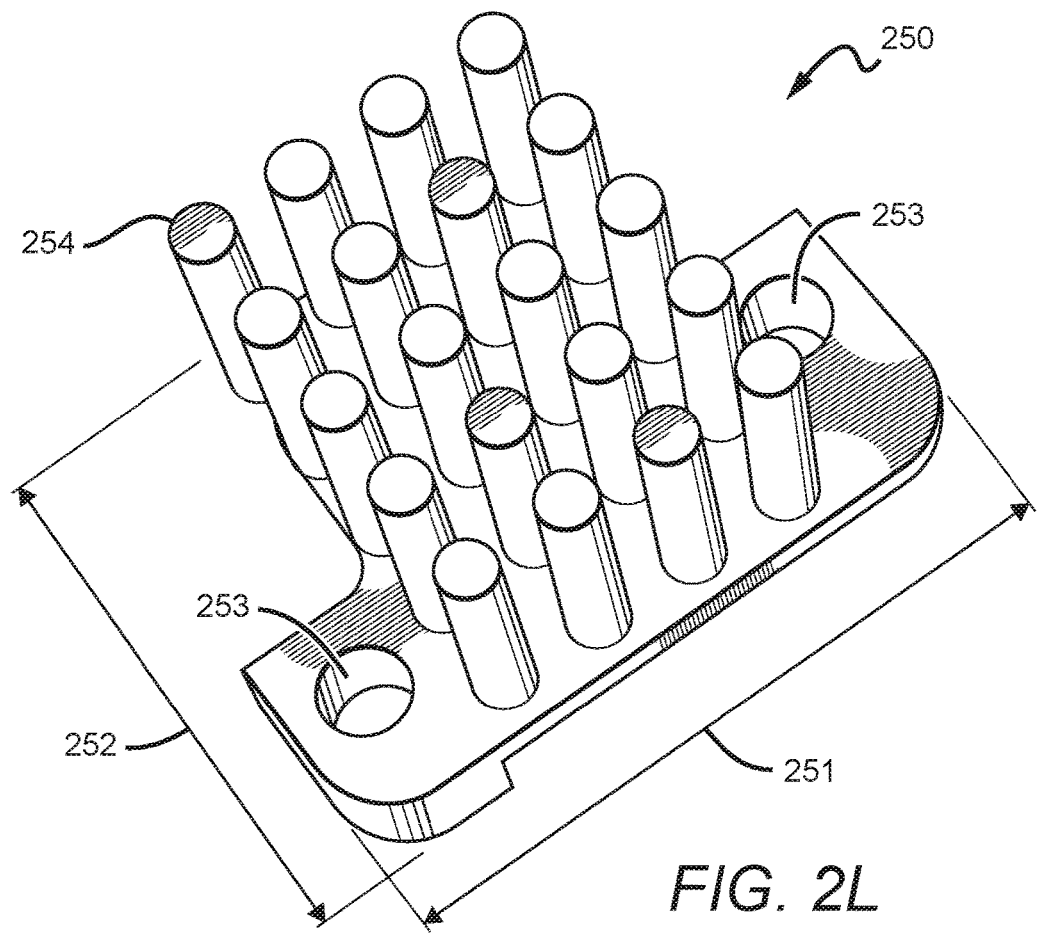
FIGS. 2L and 2M depict different views of a heat sink suitable for use in conjunction with a circuit board in an optical combiner of the inventive concept.

FIG. 2L shows an example of a heat sink/pin sink 250 (the "visible pin sink"). As shown, visible pin sink 250 is about 2.54 cm (1.0 inch) long 251 by 19 mm (0.75 inches) wide 252, although other dimensions are contemplated. Through holes 253 are dimensioned for 4-40 machine screws to secure pin sink 250 to a printed circuit board and a collimating lens assembly. Circular pins 254 extend about 10 mm (0.40 inches) above the pin sink 250, and are about 2.3 mm (0.090 inches) in diameter. In the example shown, twenty circular pins 254 are arrayed in a four by five array. Such pins provide surface area from which excessive heat can be removed. Suitable materials for such pins include aluminum 6061-T6 and copper.

Advantageously, Aluminum 6061-T6 has excellent machinability and thermal conductivity. However, if additional cooling is required, copper has a greater thermal conductivity than aluminum. Visible pin sink 250 utilizes pins on one side to increase the surface area that will radiate heat to the external environment and increase the air flow and turbulence created by an externally mounted fan.

Figure 2M:
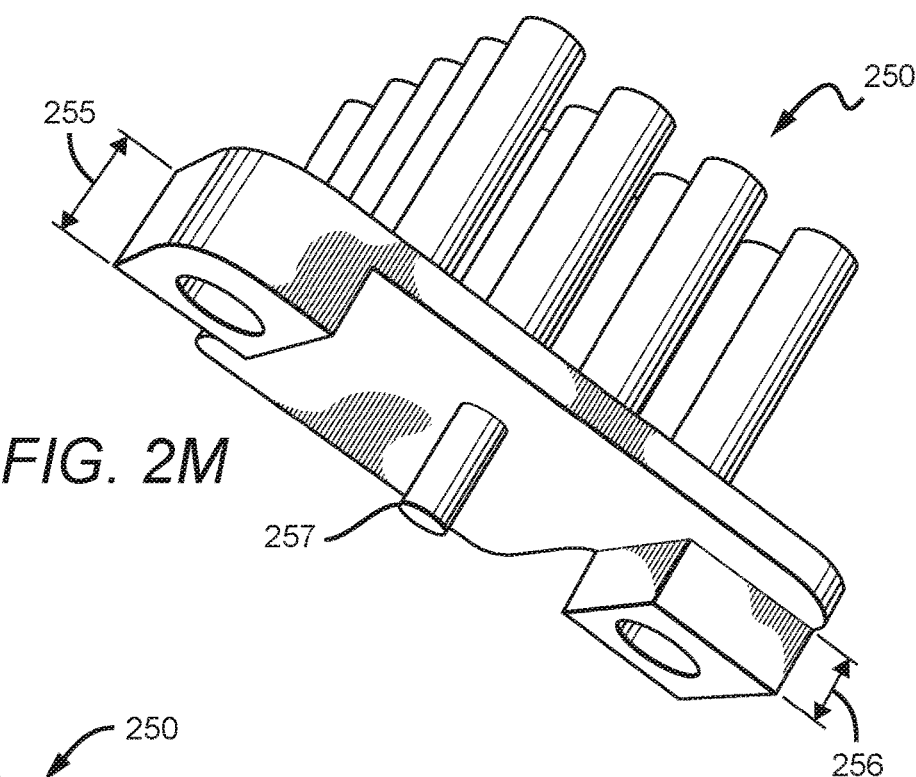

FIG. 2M shows standoffs that provide a gap between the visible pin sink 250 and the printed circuit board, leaving room for the electronics and for air and heat to pass under visible pin sink 250. In one embodiment, the height of the platform upon which the circular pins 254 extend is about 1.3 mm (0.050 inches), the height of the standoffs 256 is about 2.5 mm (0.10 inches) below the platform, and the height of the standoffs and platform 255 is about 3.81 mm (0.150 inches).

As shown in FIG. 2M, the side of visible pin sink 250 opposing circular pins 254 can include a small (1.8 mm (0.070 inch) diameter) pin 257 that extends through the printed circuit board, proximate to the face of the heat dissipating pad on the bottom of the LED mounted to that printed circuit board. Pin 257 conducts the heat from the LED to the pin sink, where the heat is radiated away. In one embodiment of the inventive subject matter, the length of pin 257 is about 4.06±0.05 mm (0.160±0.002 inches). Approximately 1.5 mm (0.060 inches) of pin 257 extends through the printed circuit board and mates proximate to the face of the central heat dissipating pad of the LED on the other side of the printed circuit board. With respect to the machining tolerances of the visible pin sink, it is preferable that the central pin 257 not contact the LED to which it mates with sufficient pressure to move it off of the printed circuit board 230. Therefore, the preferred extension of the central pin 257, within the machining tolerance specified, is about or the thickness of the associated printed circuit board.

Figure 2N:
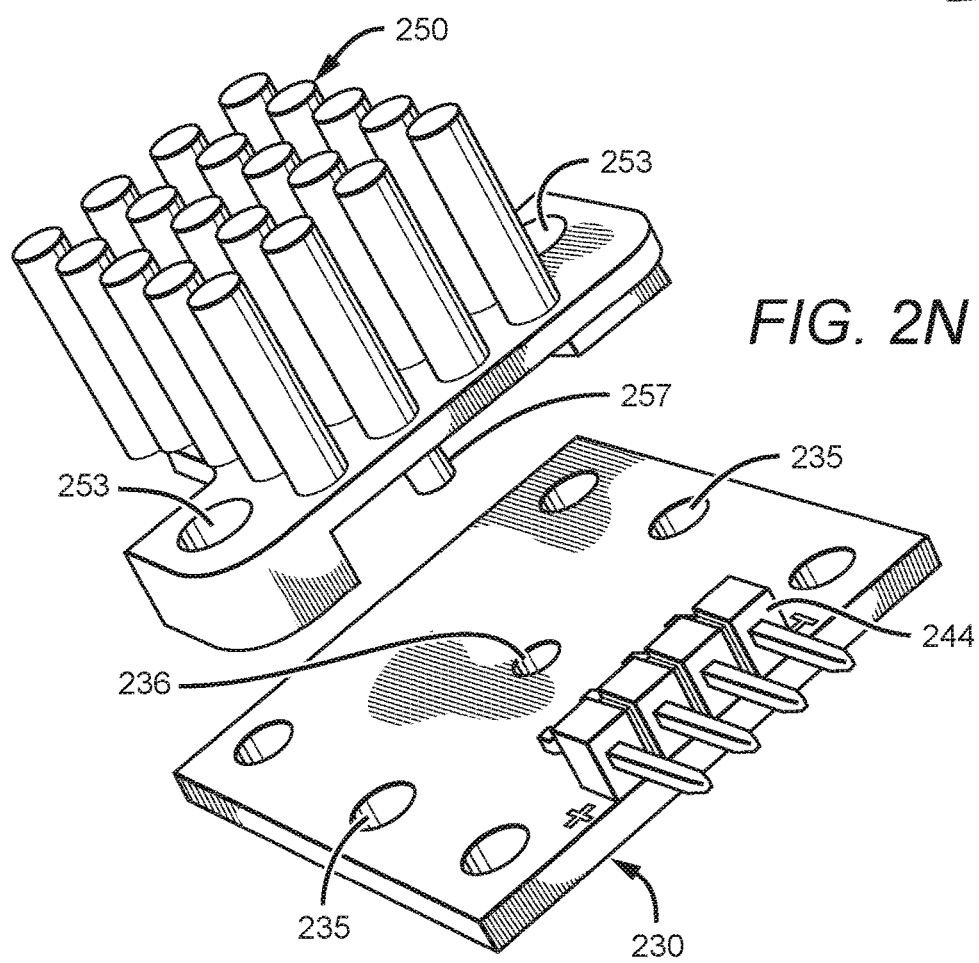

FIG. 2N shows visible pin sink 250 oriented for positioning onto the finished printed circuit board 230. The through holes 253 of visible pin sink 250 are aligned with through holes 235 on the printed circuit board 230. In the depicted embodiment, the holes are staggered so that the visible pin sink 250 is placed onto the printed circuit board 230 in the correct orientation. Pin 257 is aligned over the center of printed circuit board 230, directly over through hole 236. A thermally conductive compound can be deposited between central pin 257 and the mating LED's center heat dissipative pad. Suitable thermally conductive compounds include adhesive tapes, foams, pastes, gels, and adhesives. Preferred thermally conductive compounds have high thermal conductivities and low electrical conductivities. For example, thermal conductivity of suitable thermally conductive compounds can range from 20 to 2000 W per $m^{-1}$ per $H^{-1}$ at 300° K. Similarly, electrical resistance of suitable thermally conductive compounds can be greater than $10^{10}$ Ωcm at 300° K. Where the thermal compound is in close proximity to electronics, it is desirable to select a thermally conductive compound that has little or no electrical conductivity. The thermally conductive compound should operate optimally within the expected operating range of the system to which it is applied (for example −10° C. to 60° C. for a medical device). Where highly polished/very smooth surfaces are to be mated, as in one preferred embodiment of the inventive concept, a low viscosity thermally conductive compound should be utilized. It is known in the art that thermally conductive compounds utilizing elements such as diamond, copper or silver are more thermally conductive than aluminum and other elements. Because thermally conductive compounds vary widely in overall composition, and their performance is dependent on the specific design of the system to which they are applied, a certain amount of experimentation may be necessary to determine the best solution for a specific design. Suitable thermally conductive compounds include Antec Formula 7 Nano Diamond Thermal Compound, a gel type of non-adhesive, non-electrically conductive compound and Arctic Silver 5 Silver Thermal Compound. After visible pin sink 250 is mated to the printed circuit board 230 and a collimating lens assembly with 4-40 machine screws in through holes 253, the connector 244 remains accessible for coupling to a mating connector.

One exemplary configuration of the optics and optical combiner consistently and reproducibly yields a high optical interface. The assembled printed circuit board of FIG. 2O, including a pin sink 250 and a set of connectors 244 mounted on a circuit board 230, can be utilized in embodiments of the present invention for a variety of noncoherent light sources, such as a green LED and/or a red LED assembly(ies), and is representative of a green LED printed circuit board assembly 258 or a red LED printed circuit board assembly 259. A UVA LED printed circuit board assembly can utilize a similar arrangement. Such assemblies can further comprise lensing devices and housings.

With respect to selection of suitable collimating lenses for each LED used in the present invention, consideration should be given to a variety of variables including: wavelength, lens material, relative radiant intensity (also described as "angular content" and "emission pattern"), the length and angles involved in the optical interface of the LEDs reaching the mating fiber optic cable for the single optical interface, focusing lensing, and the diameter of the mating fiber optic cable core, and the material of the core. Mechanical design software can be utilized to provide the designer utilizing the art of the present invention with an illustrative example of the optical model.

Collimation of the light emitted from the red and green LEDs can be achieved using 8 mm half-ball lenses having a diameter of approximately 8 mm (0.3149 inches). In one embodiment of the light combiner contemplated for use in an intravenous light therapy system, the 8 mm half-ball lenses are made from fused silica material having a surface quality of 40/20 scratch and dig, 85% or greater transmission in the 500 nm to 690 nm spectrum, and ±2.5 um sphericity.

In one aspect of the inventive subject matter, a visible base 325 (FIG. 3B) can house a half-ball lens to complete a noncoherent light source assembly (such as a green LED and/or a red LED assembly). As shown, such a base can have a through hole 326 (for example, having a diameter of about 6.35 mm (0.250 inches)) that allows light from either a green LED or a red LED to pass through and into a circular protrusion 327 for collimation. Circular protrusion 327, centered on the bottom of 325, can be about 13 mm (0.50 inches) in diameter and can protrude about 11 mm (0.43 inches) from the bottom face of 325 (dashed line with arrows). A circular recession 328 can be milled down to about 8 mm (0.3 inches) and have a diameter of about 8.03 mm (0.316 inches) with a tolerance of plus or minus 0.03 mm (0.001 inches). The face 329 can be configured to seat a hemispherical lens (such as an 8 mm half-ball lens), also called a "hemisphere" lens, within the circular recession 328. For example (as shown in FIG. 3C), upon insertion of a half-ball lens 330 along the dashed line 331, the 8 mm half-ball lens 330 rests upon face 329. After the 8 mm half-ball lens is positioned, a gap of about 0.03 mm (0.001 inches) remains between it and the perimeter of the circular recession, providing consistent and precise placement therein.

A hemispherical lens can be secured with a spacer and adhesive. For example a spacer 332 is shown (see FIG. 3D), centered over the central axis of an 8 mm half-ball lens 330 as indicated by the dashed line 337. The 8 mm spacer 332 has a height of about 5.72 mm (0.225 inches) and an outer diameter of about 8.00 mm (0.315 inches), and an inner diameter of about 5.94 mm (0.234 inches). The 8 mm spacer 332, when inserted into the circular recession, will contact first the 8 mm half-ball lens 330 along the 8 mm spacer's inner edge. In other contemplated embodiments, to permit light collimated by the 8 mm half-ball lens 330 to pass through the spacer, care should be taken in determining diameter 336. To assemble this component, the visible base 325 can be set on its top face on a clean surface. After inserting both the 8 mm half-ball lens 330 and 8 mm spacer 332, the assembly is secured with a low to non-off gassing adhesive with a viscosity suitable to fill in the narrow space between 8 mm spacer's 332 outer diameter and the inner wall of the circular recession 328. An adhesive that has some element of color, as opposed to a clear adhesive, can advantageously allow assemblers to verify that the assembly is secured by visible inspection. For example, Angstrom-Bond AB 9112 two part epoxy can be employed.

Figure 3A:
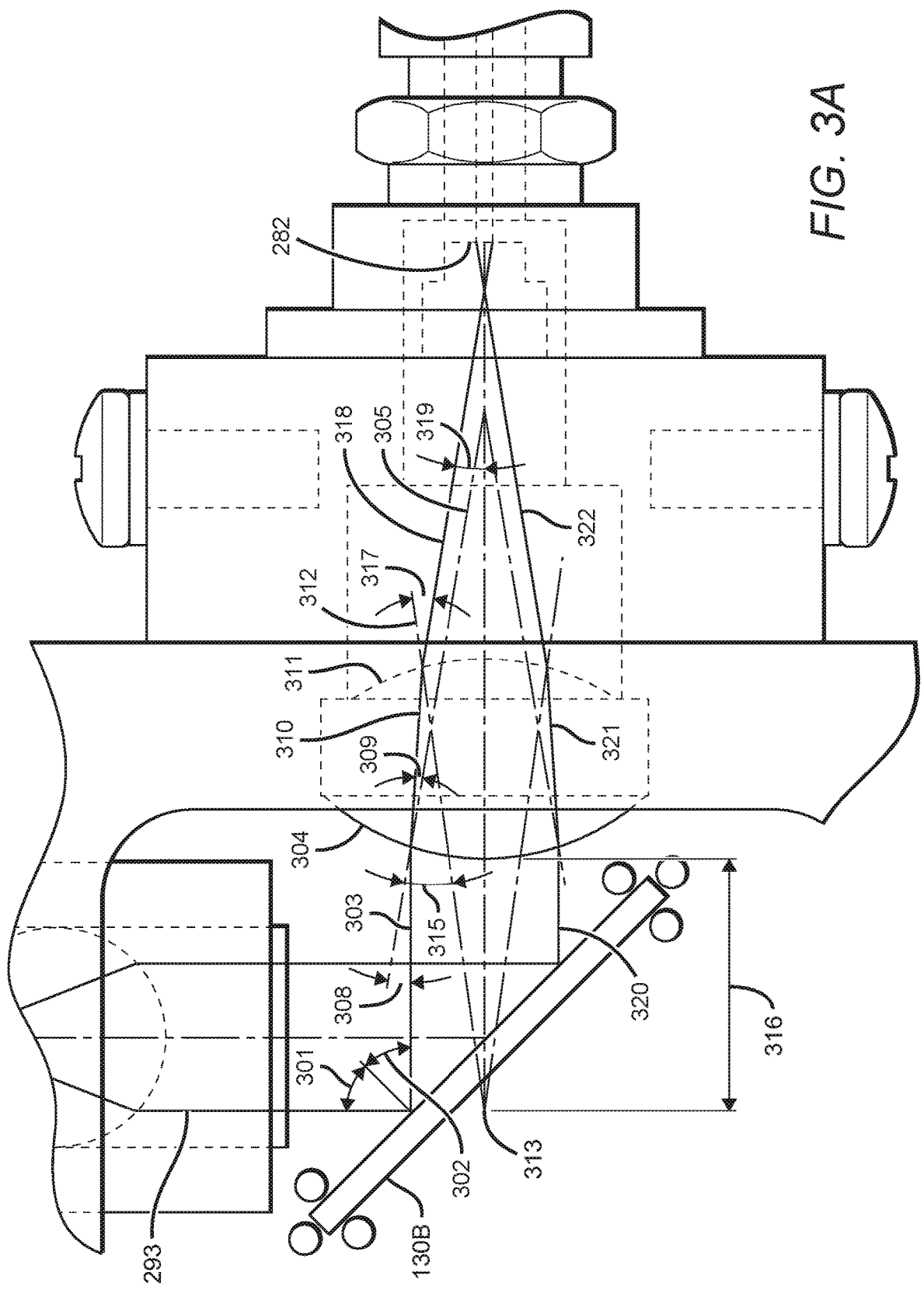
FIG. 3A depicts a path taken by light emitted from a non-coherent light source and subsequently collimated by an associated lens in an optical combiner of the inventive concept.
Figure 3E:
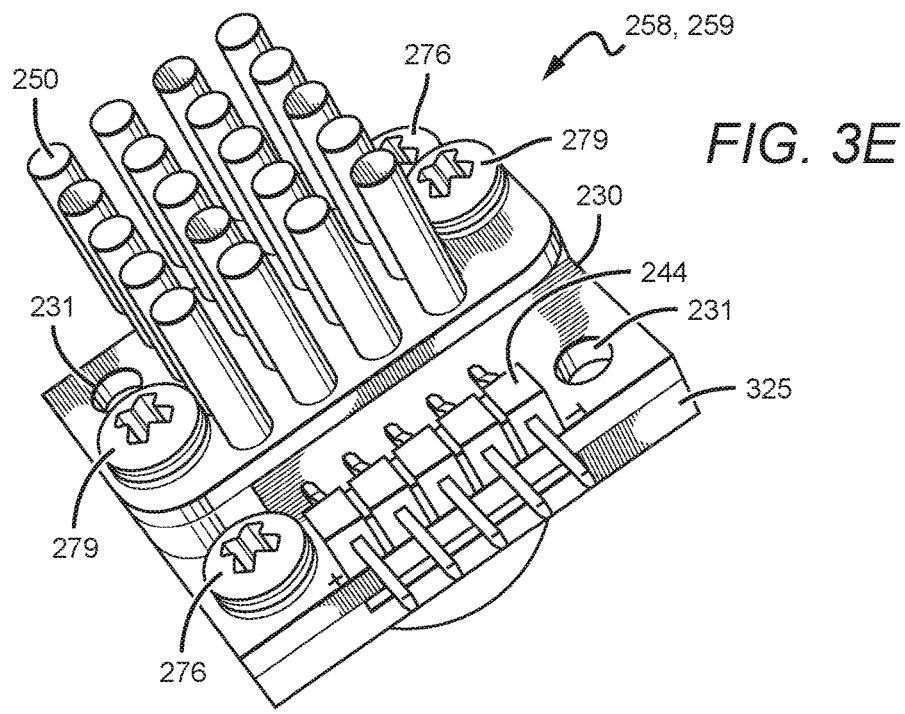
FIGS. 3E and 3F show different views of an LED assembly and associated half ball lens suitable for use in an optical combiner of the inventive concept
Figure 3F:
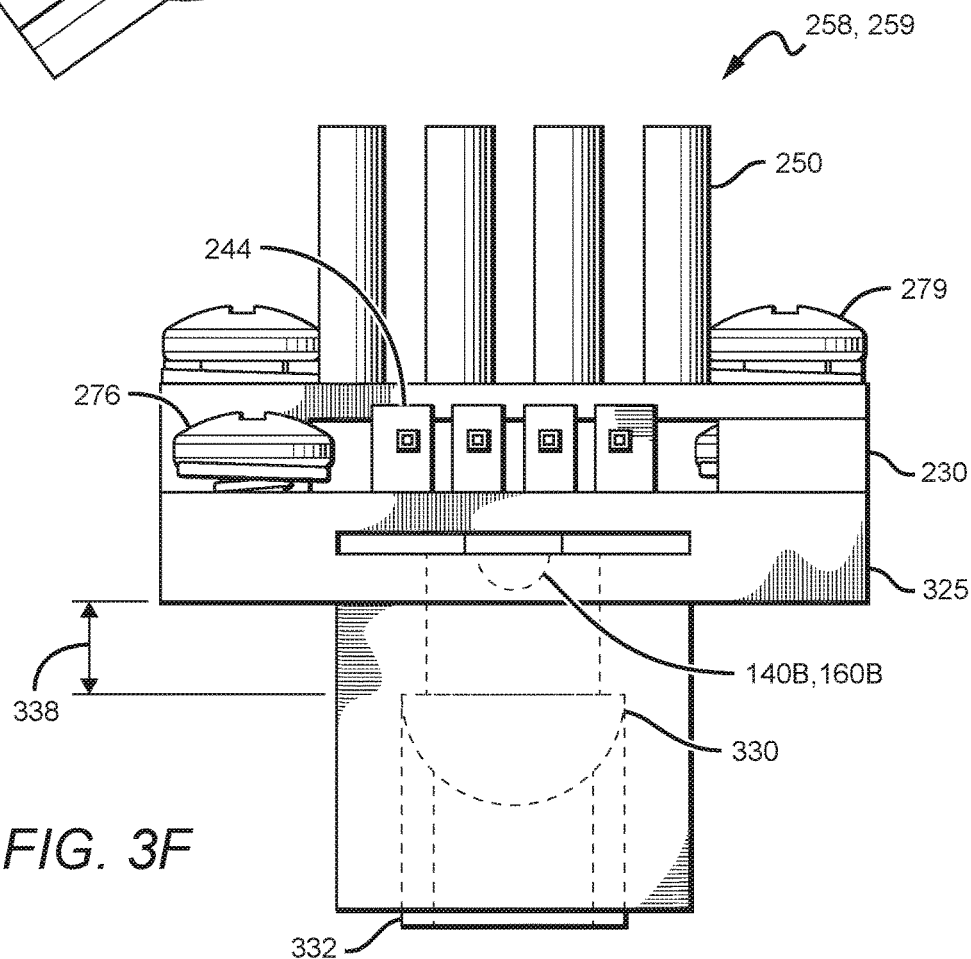

FIGS. 3E and 3F show an example of an assembly for use with visible noncoherent light sources, such as green and red LEDs. The printed circuit board 230, which can include a thermistor (not visible), a connector 244, and a noncoherent light source (such as a green LED or a red LED) soldered into position, is sandwiched between the visible pin sink 250 and the assembled visible base 325 (which can include a hemispherical lens and an associated spacer 332, assembled and adhered). Two 4-40 threaded by approximately 4.763 mm (³⁄₁₆ inch) long screws with captive spring lock washers 276 can be used to secure the printed circuit board 230 to the visible base 325. A gap can be present that allows for air circulation between the base and the printed circuit board. Two 4-40 threaded by approximately 7.94 mm (⁵⁄₁₆") long screws with captive spring lock washers 279 can be used to secure the visible pin sink 250 to the visible base 325, passing through holes 231 in the printed circuit board 230. When assembled the center of a green or red LED 140B, 160B die is about 5.05 mm (0.199 inch) distance 338 from the bottom face of an 8 mm half-ball lens 330 (see FIG. 3F). Through holes 231 remain for securing the green and/or red LED printed circuit board assemblies (258 and 259, respectively) to the optical combiner housing.

The material chosen for collimation of light emitted by the UVA LED must be transparent to UVA light. It should be appreciated that ultraviolet light "A" (UVA, typically described as that light between 320 and 400 nm) is absorbed to a significant extent by many conventional lens materials. Therefore, collimating lenses for the UVA LED are preferably composed of a material that will pass UVA light. Examples of such materials include fused silica (FuSi) and sapphire. Similarly, most optical adhesives transmit visible wavelengths of light (those existing between 400 nm towards infrared, about low 800 nm range) and absorb UVA. Therefore, in embodiments of the inventive subject matter where adhesives are applied, the adhesives are preferably applied so that they are not within the optical path of a UVA LED.

As shown in FIG. 2Q, an exemplary UVA LED printed circuit board assembly 280 includes a UVA printed circuit board 260 (with soldered on thermistor 232, 5-position connector 262, and UVA LED 120), a UVA base 263 (containing 8 mm sapphire ball lens 273), and UV pin sink 277. The distinctions between the UVA LED printed circuit board assembly and the green LED and red LED printed circuit board assemblies can include: substitution of a five-position connector 262 for the four-position connector, a through hole 261 with a larger diameter, and a larger heat dissipative pad. In addition, the UVA LED window can be flat rather than dome shaped. The five-position connector is coupled to two LED electrodes, and two thermistor electrodes; the fifth prong can be helpful in decreasing the chance for error when connecting wire harnesses to the printed circuit board. One example of such a connector is the SAMTEC TSM-105-01-X-SH connector. As with the four-position connector, adhesives securing the wire harness to the connector can be utilized. Through hole 261 serves the same function as through hole 236 and has a larger diameter, 3.18 mm (0.125 inches). The heat dissipative pad 202 of the UVA LED 120 can be larger than that of either the green or red LED, 120/140 in order to conduct heat more effectively. Such a flat circular window of the UVA LED 120 provides protection, but no lensing.

Lensing for the light emitted from a UVA LED can be supplied by a variety of suitable lens means and housing means. In a preferred embodiment of a light combiner for use with an intravenous light therapy system, lensing for a UVA LED is provided by an 8 mm sapphire ball lens and a UVA base. In one embodiment, the 8 mm sapphire ball lens features a surface quality of 40/20 scratch and dig, 85% or greater transmission in the UVA spectrum, and ±2.5 um sphericity.

The UVA base 263 shown in FIG. 2P measures about 2.5 cm (1.0 inches) on both sides, which are the same length and width dimensions of UVA LED printed circuit board. The UVA base 263 further comprises a protrusion having circular cutouts 267, 268, 269, and 270. Circular cutout 267 measures 10.8 mm (0.425 inches) in diameter and is milled down 1.8 mm (0.070 inches). When coupled with printed circuit board 260, the UVA LED extends into circular cutout 267. Circular cutout 268 has a diameter of 8.05±0.03 mm (or 0.317±0.001 inches). Precision milled circular recession 268 centers the 8 mm ball lens over the optical emission axis of the UVA LED. Conical circular cutout 269 can be milled at an angle of about 30°, so that when a 8 mm ball lens is inserted into recession 268, the ball lens rests against a smooth surface that is substantially tangent to the ball lens surface. Advantageously, this configuration avoids scratches that can be produced by sharp edges. The ball lens is positioned proximate to UVA LED die, within about 0.05±0.03 mm (0.002±0.001 inches). Finally, the circular through hole 270 allows the collimated light emission from the UVA LED to exit once it has passed through the 8 mm ball lens.

Advantageously, using such configurations unskilled and untrained assemblers can build the final UVA LED printed circuit board assembly 280 (as shown in FIG. 2Q) using only basic tools. For example, 4-40 threaded holes 265 can be used to secure the UVA LED printed circuit board 260 to UVA base 263 with 4-40×3/16 inch (4.763 mm) long machine screws with captive spring lock washers 276. When the UVA LED side of the printed circuit board 260 mates with the UVA base 263, a thin gap (approximately 0.76 mm (0.030 inches) deep) allows air to flow over the surface of the UVA LED, providing cooling to the LED. UV pin sink 277 is coupled to the UVA printed circuit board and base by screwing 4-40×5/16 inch (7.938 mm) long machine screws with captive spring lock washer 279 into 4-40 threaded holes 266 (see FIG. 2P). These can be staggered to aid in properly orienting the pin sink. UV pin sink 277 is similar to visible pin sinks previously described, however the diameter of the central pin can be greater, for example 2.79 mm (0.110 inches), for greater heat dissipation. As with the green and red LED printed circuit board assemblies, a thermally conductive, non-electrically conductive, paste (such as Antec Formula 7 Nano Diamond compound) couples such a central pin with a heat dissipative pad. The UVA LED printed circuit board assembly 280 is mounted to an optical combiner housing by screwing 4-40 threaded machine screws into through holes 231, which align with through holes 264 (shown in FIG. 2P).

Figure 4A:
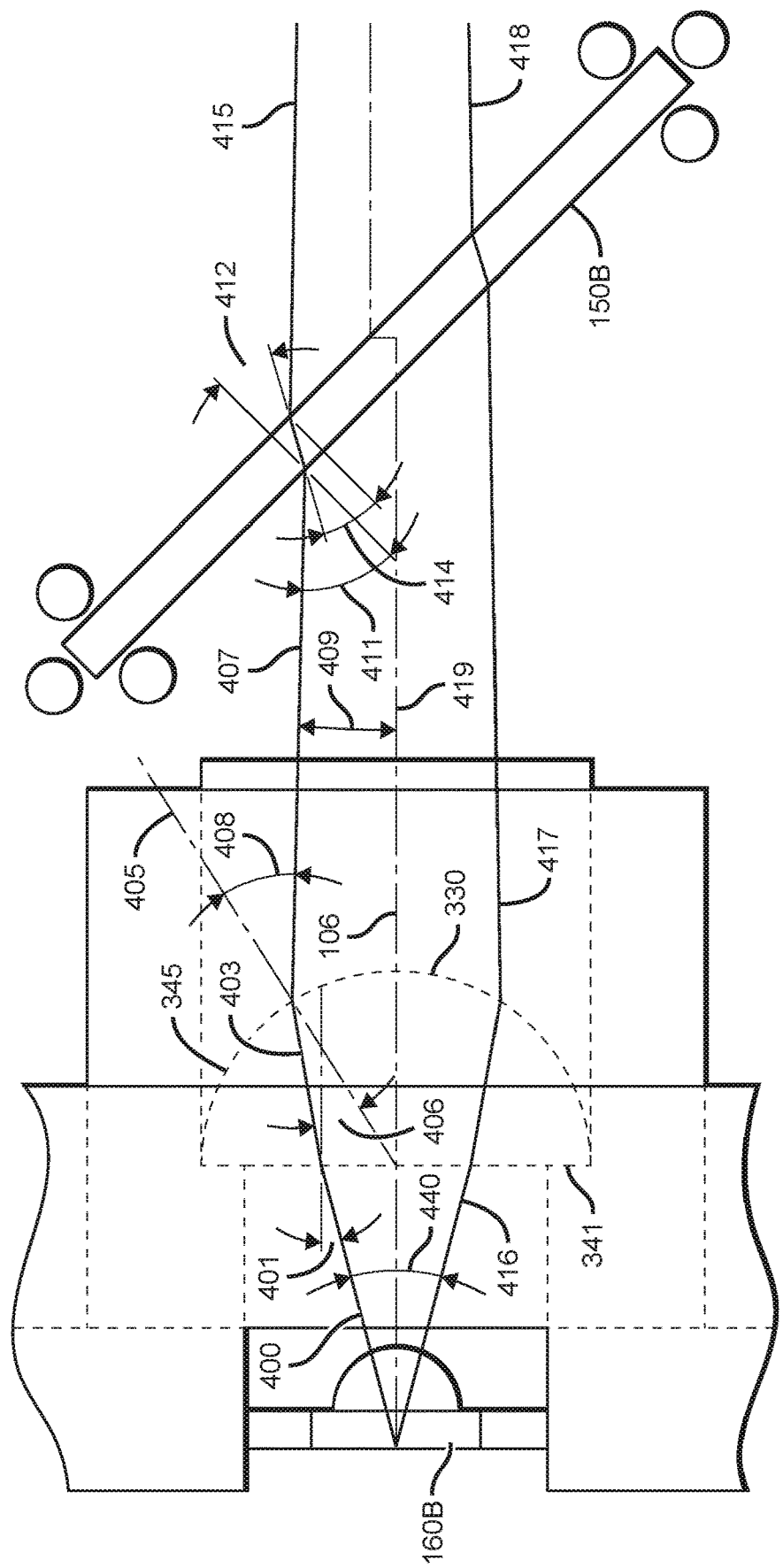
FIG. 4A depicts a portion of a path of light emitted by a tertiary non-coherent light source of an optical combiner of the inventive concept, showing transmission through and refraction by a dichroic mirror associated with a secondary non-coherent light source.
Figure 4B:
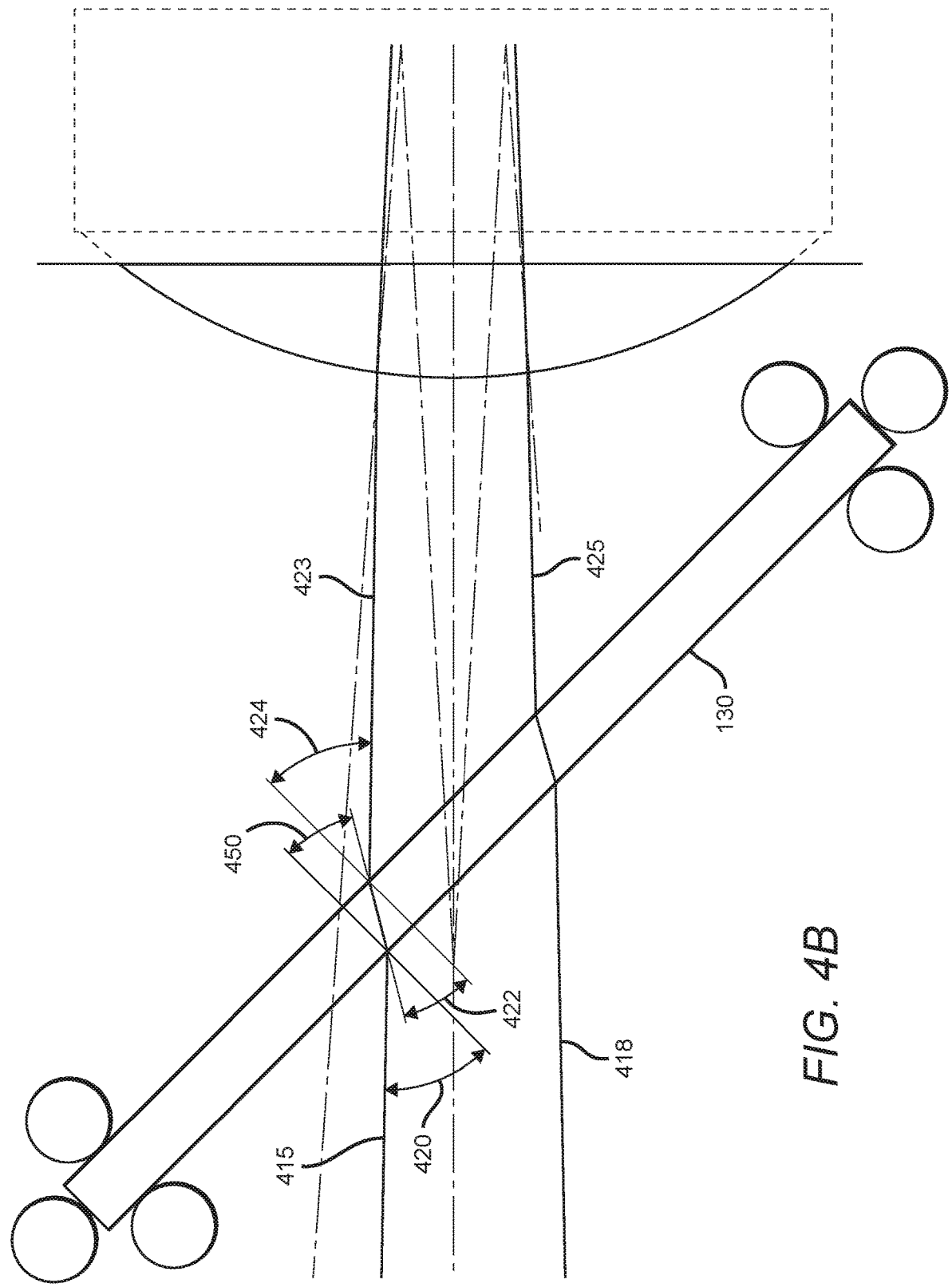
FIG. 4B depicts a continuation of the light path shown in FIG. 4A.
Figure 4C:
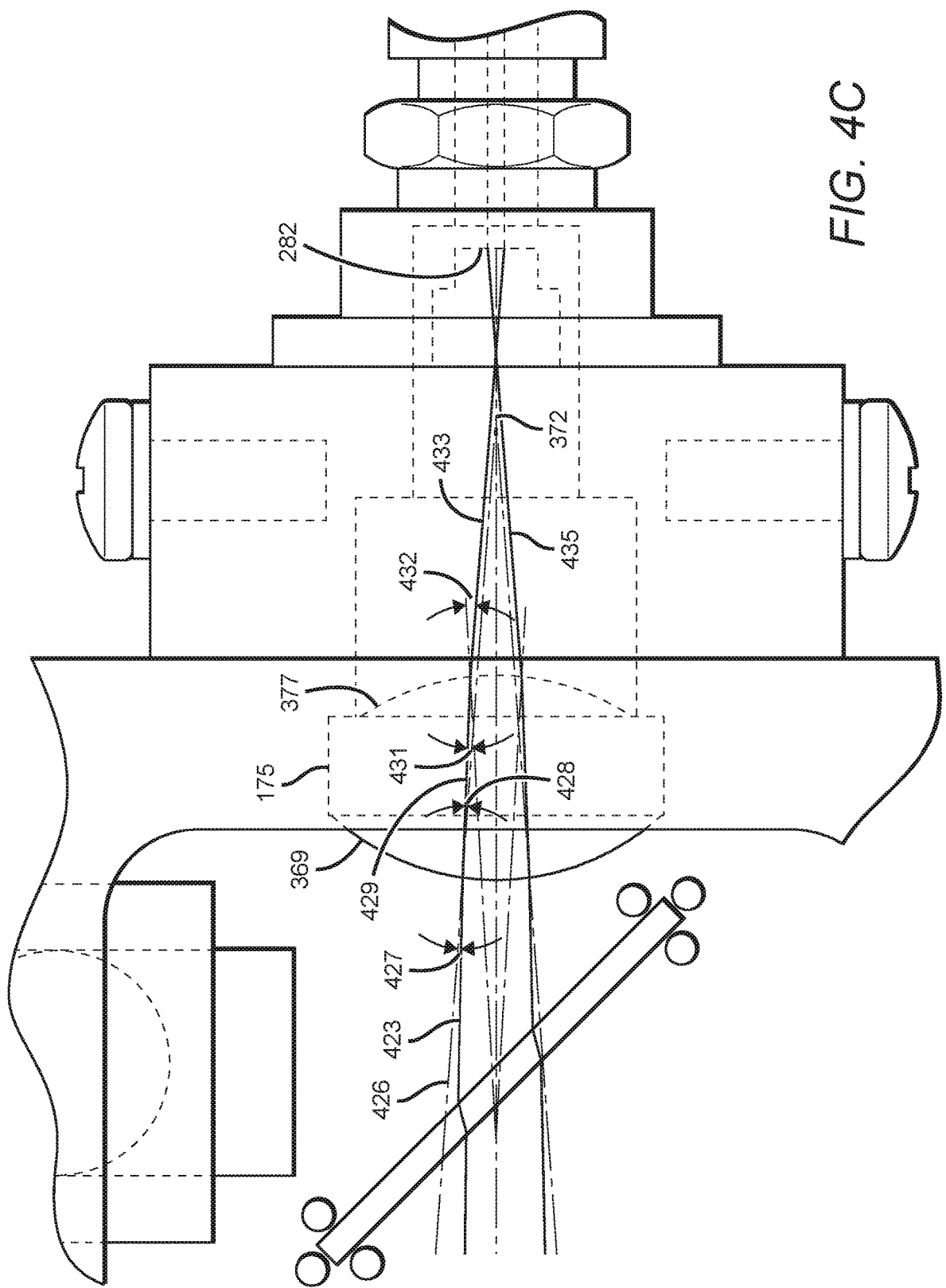
FIG. 4C depicts a continuation of the light path shown in FIG. 4B.
Figure 4D:
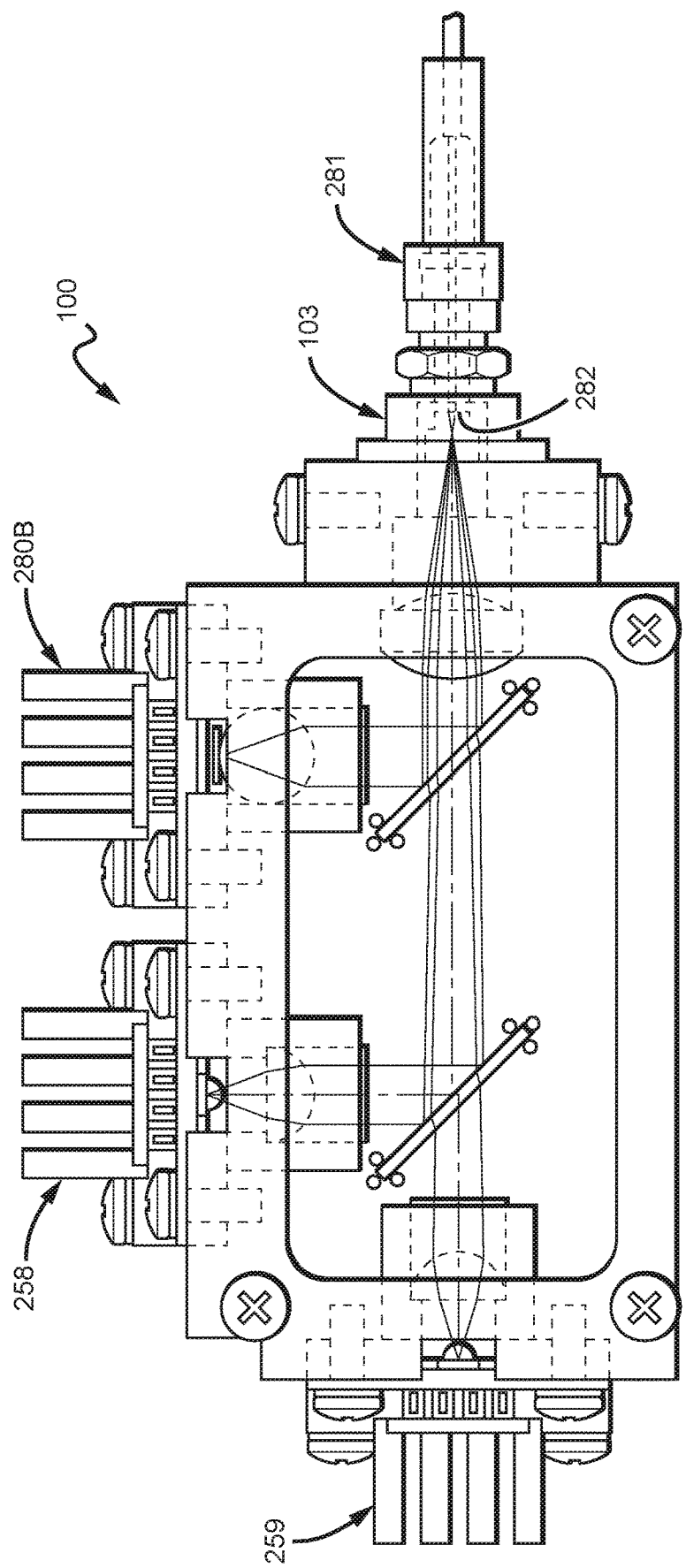
FIG. 4D schematically depicts a cross section of an optical combiner of the inventive concept, showing optical paths for three non-coherent light sources.
Figure 4E:
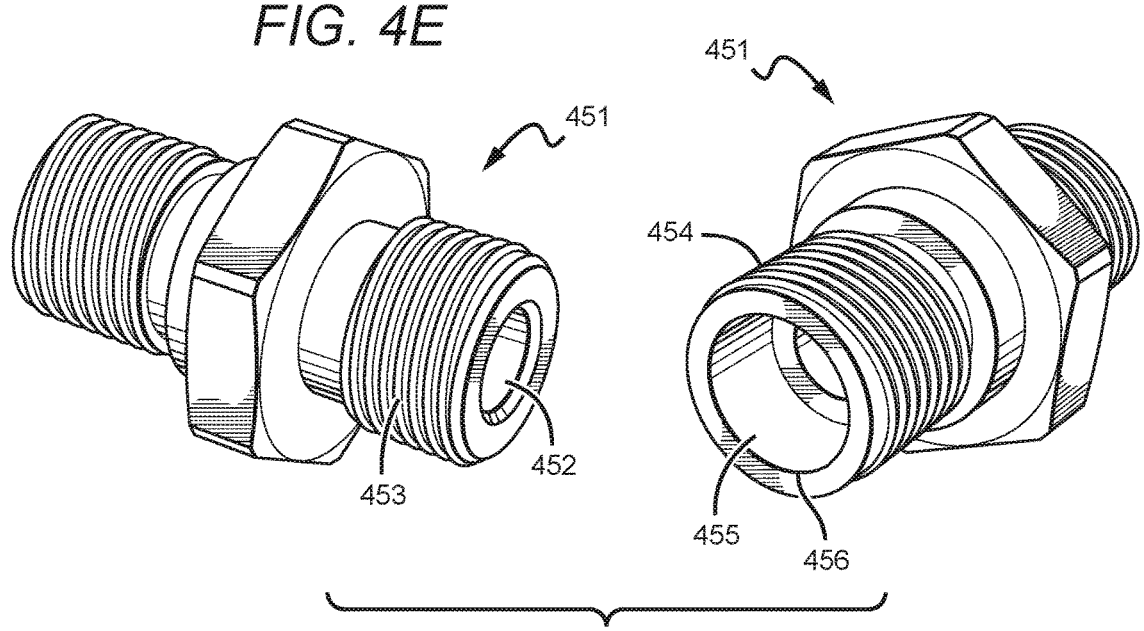
FIG. 4E illustrates suitable adapters for use in an optical interface of an optical combiner of the inventive concept, in this instance an SMA-adapter and an extension having compatible threading.

FIG. 4E shows components of an example of a suitable optical interface. FIG. 4E depicts an SMA-adapter 451 suitable for use with a fiber optic cable having a suitable waveguide (for example, a fiber optic cable 281 of FIG. 2R) that can be utilized in the assembly of an optical combiner of the inventive concept. At left, the standard entry port for the ferrule of the SMA-905 terminated fiber optic cable is shown, having a precisely drilled hole 452 for a ferrule of about 3.18 mm (0.125 inches) diameter. The outer threading 453 shown is an SMA-905 standard ¼-36 threading, and is utilized by a free-spinning, typically knurled nut about the ferrule of a mating SMA-905 terminated fiber optic cable to secure it to the SMA-adapter 451. On the right side, an extension 454, similarly threaded, is shown which is typically used for coupling a second SMA-905 terminated fiber optic cable. In some embodiments such an extension can include two modifications over conventional designs. One side's threaded extension 454 can be reduced by about 4.45 mm (0.175 inches) (standard length is about 8.76 mm (0.345 inches)). In addition the entry port 455 for a second SMA-905 terminated fiber optic cable can be enlarged (for example by drilling to an 8 mm (0.3 inch) diameter 456). This permits more light, refocused from a focusing lens, to strike the fiber optic core face 282. Such components can be machined from steel (typically stainless), or, alternatively, modified from off-the-shelf components. One example of a suitable SMA-adapter is ThorLabs® part # ADASMA.

Figure 4F:
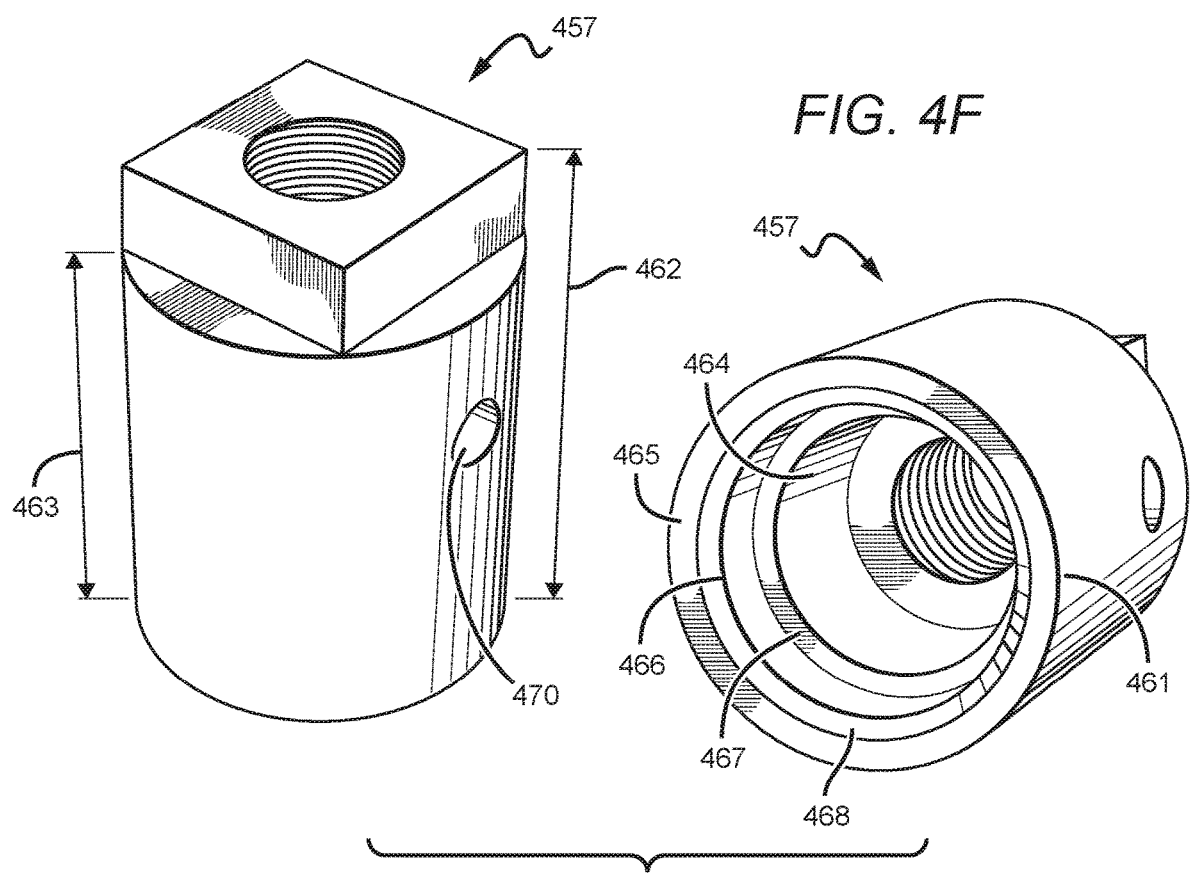
FIG. 4F depicts an output base portion of an optical interface suitable for use in an optical combiner of the inventive concept.

FIG. 4F, depicts an example of a suitable output base 457 of an optical interface 103. In some embodiments the output base 457 material is a heat conductive material, for example Aluminum 6061-T6 (which exhibits excellent machinability and is light weight). In the left view, a ¼-36 threaded hole 458 is shown, which mates to a modified end 454 of an SMA-adapter 451. The squared-off edges 459 can advantageously permit a 7/16" (11.1 mm) wrench to secure the SMA-adapter 451 while engaging it with a threaded hole 458. A small hole 470 is shown, which does not continue to the inner cavity 464. In some embodiments a similar hole (not shown) can be present on the opposite side of the part. Such holes are dimensioned for clearance of a standard 4-40 threaded screw that can be used to secure an optical interface onto an optical combiner housing.

In some embodiments of the inventive concept the outer diameter of the base of a single optical interface is about 15.9±0.03 mm (0.625±0.001 inches) 461, the overall height of the part can be about 22.0 mm (0.866 inches) 462, and the height of the circular portion of a single optical interface base can be 18.2 mm (0.716 inches) 463. The right view shows an opposing side of the single optical interface base 457. At the rear of the circular recess 464 is a view of an internally threaded ¼-36 hole 458 which allows an SMA-adapter to secure to the single optical interface base 457. Upon mating with an SMA-905 terminated fiber optic cable, the fiber optic core face 282 is exposed to the inner circular recession 464. The diameter of the inner circular recession 464 can be about 10 mm (0.4 inches). In some embodiments an inner circular recession is milled down about 12 mm (0.46 inches) from the front face 465 of the single optical interface base 457, and the diameter of the outer circular recession 466 is about 12.0 mm (0.473 inches). This permits insertion of a focusing or focusing lens with a tolerance of plus or minus 0.03 mm (0.001 inches); in the view shown this is milled down about 3.94 mm (0.155 inches) from the front face of the single optical interface base. The face 467 transitions from inner circular recession 464 to outer circular recession 466, and provides a platform upon which can rest a focusing lens. The use of a close tolerance between the focusing lens and the outer circular recession 466 advantageously provides robust and consistent alignment of the focusing lens, which can have a central side wall height (i.e. edge thickness) of about 2.97 mm (0.117 inches) and can form a concentric mate with the perimeter wall formed of the outer circular recession 466. A small bevel 468 can be formed around the inner edge of the outer circular recession 466, which simplifies insertion of a focusing lens during assembly. In such a system a suitable focusing lens can be, for example, a 12 mm effective focal length double convex lens with a diameter of about 12 mm.

Figure 4G:
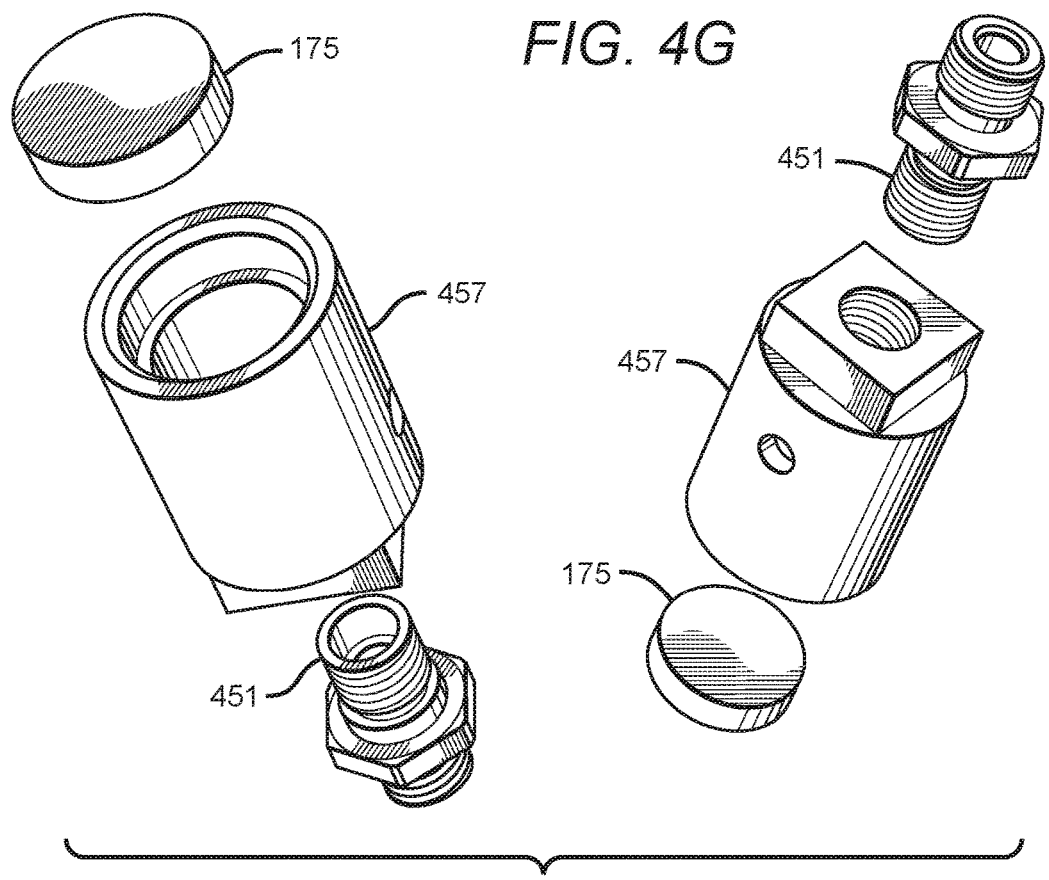
FIG. 4G depicts two different views of an example of an embodiment of the inventive concept where a focusing or focusing lens, an SMA-adapter, and an optical interface base are shown in alignment and ready for assembly.

FIG. 4G depicts two different views of an example of an embodiment of the inventive concept where a focusing or focusing lens 175, an SMA-adapter 451, and an optical interface base 457 are shown in alignment and ready for assembly. It should be appreciated that such a design does not require sophisticated tooling and/or complex fixturing. A variety of methods can be employed to correctly position an SMA-adapter regardless of the number of cycles through which a mating SMA-905 fiber optic cable is joined to it. In some embodiments, an SMA-adapter 451 is secured into an optical interface base 457 using a fixative or adhesive, for example Loctite brand Blue Threadlocker®. After adhering an SMA-adapter 451 to an optical interface base 457, sufficient time can be allowed for the adhesive to off-gas before inserting a focusing or focusing lens 175 to avoid "frosting" the surface of the focusing or focusing lens 175. In some embodiments a small (for example a 25 or 27 gauge dispenser tip) can be used to apply a thin bead of adhesive to secure the output or focusing lens. One suitable adhesive is Angstrom-Bond 9112® two-part epoxy.

Figure 4H:
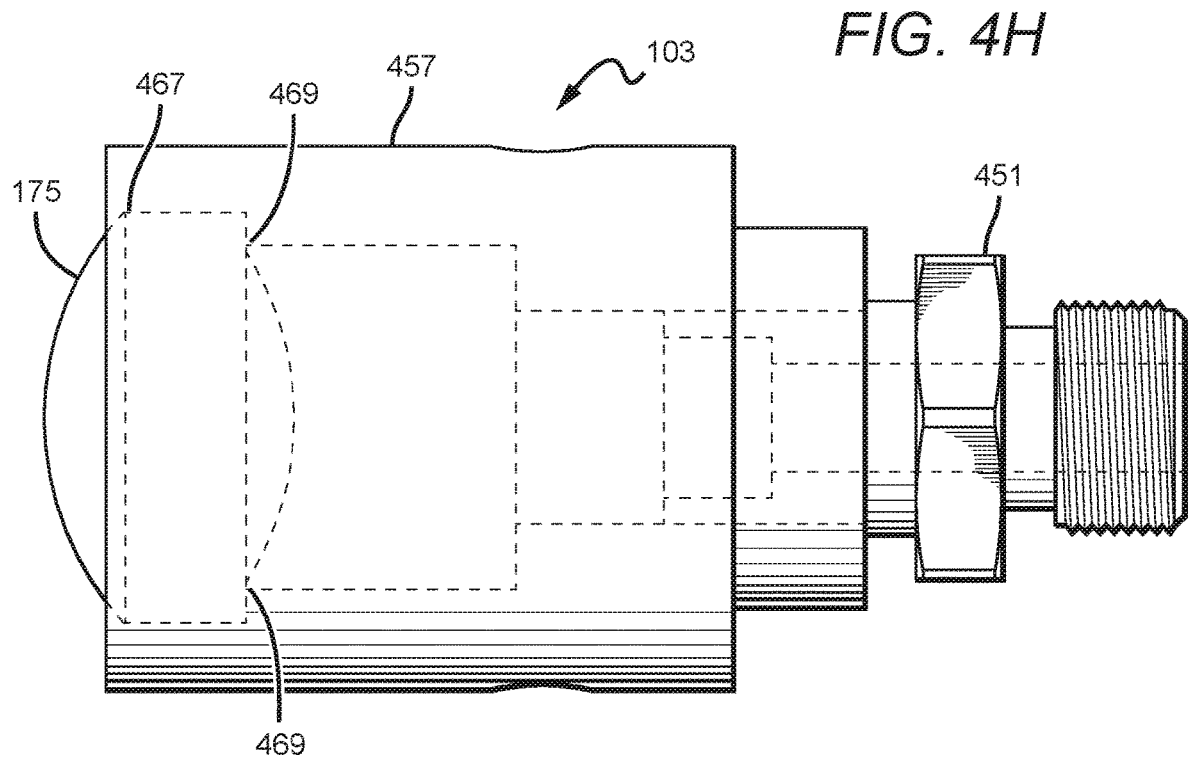
FIG. 4H shows a cross section of an assembled optical interface.

An example of an assembled single optical interface 103 is shown in FIG. 4H, with the structures within the optical interface base 457 represented by dashed lines. The circular shape of the optical interface base 457 can be utilized to precisely and accurately secure the optical interface 103 into the optical combiner housing. In the example shown the boundary seating output or focusing lens 175 is substantially tangent to an inner edge 469 of face 467.

To provide improved manufacturing consistency and to facilitate for testing of components prior to insertion into an optical combiner housing, non-coherent light source assemblies (such as UVA, green, and red printed circuit board assemblies) can be provided or pre-assembled as sub-assemblies. As noted above, features of an optical combiner housing can be used to align a printed circuit board for a visible light source and/or a UVA light source during assembly. For example, configurations shown in FIGS. 1F to 1V, FIGS. 2A to 2S, FIGS. 3A to 3I, and FIGS. 4A to 4H permits an assembly method in which an assembler first inserts a UVA base 263 into the square recession 139 of an optical combiner housing 100 intended to house a final UVA LED printed circuit board assembly 280 and then inserts a ball lens 273. Next, an assembler can insert a completed UVA printed circuit board 260 into the fixture. The wall height of the square recession 139 can be sufficiently tall to contain, at least partially, both the vertical walls of the UVA base 263 and the UVA printed circuit board 260. Screws 276 can be screwed in next, securing the UVA printed circuit board 260 to the UVA base 263. Next, a thermal paste can be applied into the hole 261, and then a UV pin sink 250 can be secured to the assembly using screws 279. A completed final UVA LED printed circuit board assembly 280 can then be removed from the optical combiner housing 100 square recession 139, and reserved for quality inspection and testing. In a similar manner, the green and red LED printed circuit board assemblies 258 and 259 may be assembled in their associated square recessions, 131 and 142 respectively, in the optical combiner housing 100.

Figure 5A:
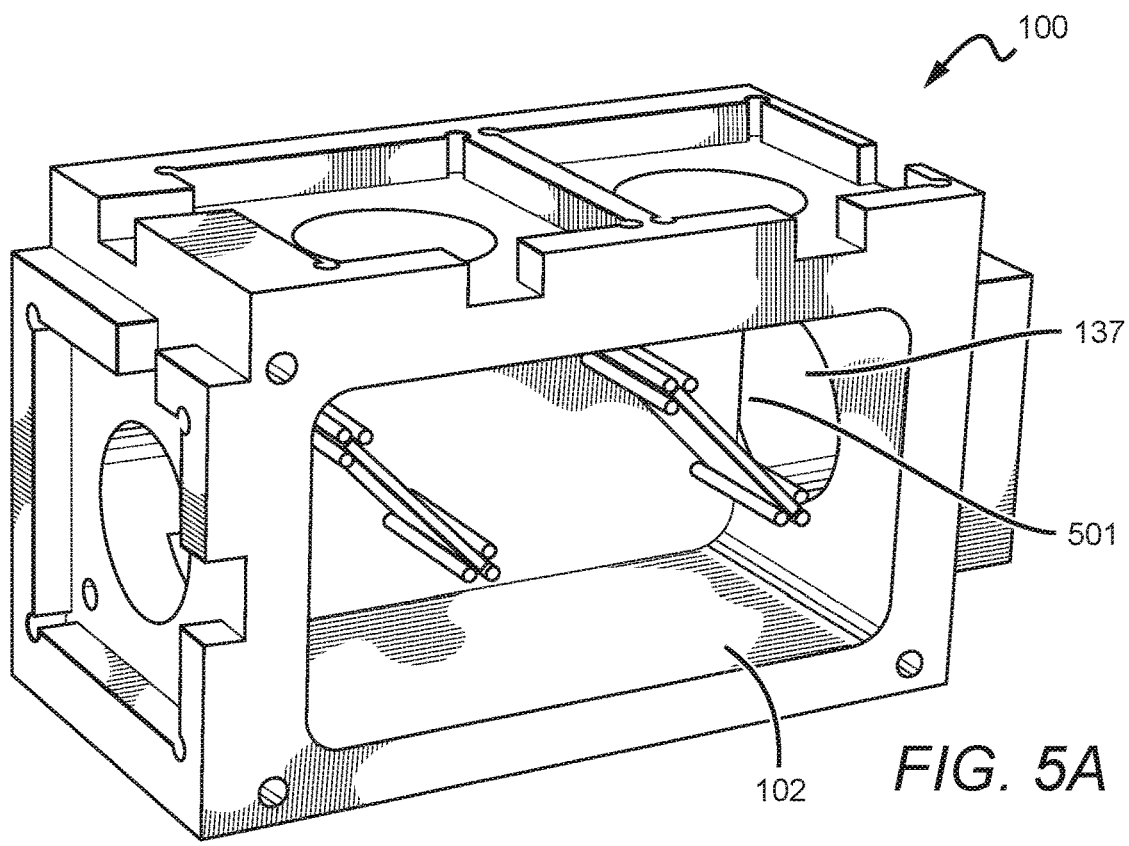
FIG. 5A shows an interior view of an optical combiner of the inventive concept, showing the position of an interior wall that aids in positioning of the optical interface.

An example of an additional feature of the optical combiner housing 100 is depicted in FIG. 5A. As shown, a circular hole or aperture 137 is provided in the optical combiner housing (for example, by drilling), and terminates at the opening of the inner cavity 102, leaving a slight wall 501. This slight wall can, for example, intersect the front face 465 of the optical interface base 457 shown in FIG. 4F and can act as a stop beyond which an optical interface 103 cannot proceed, but which does not intersect or interfere with a focusing lens or with light entering such a focusing lens.

Figure 5B:
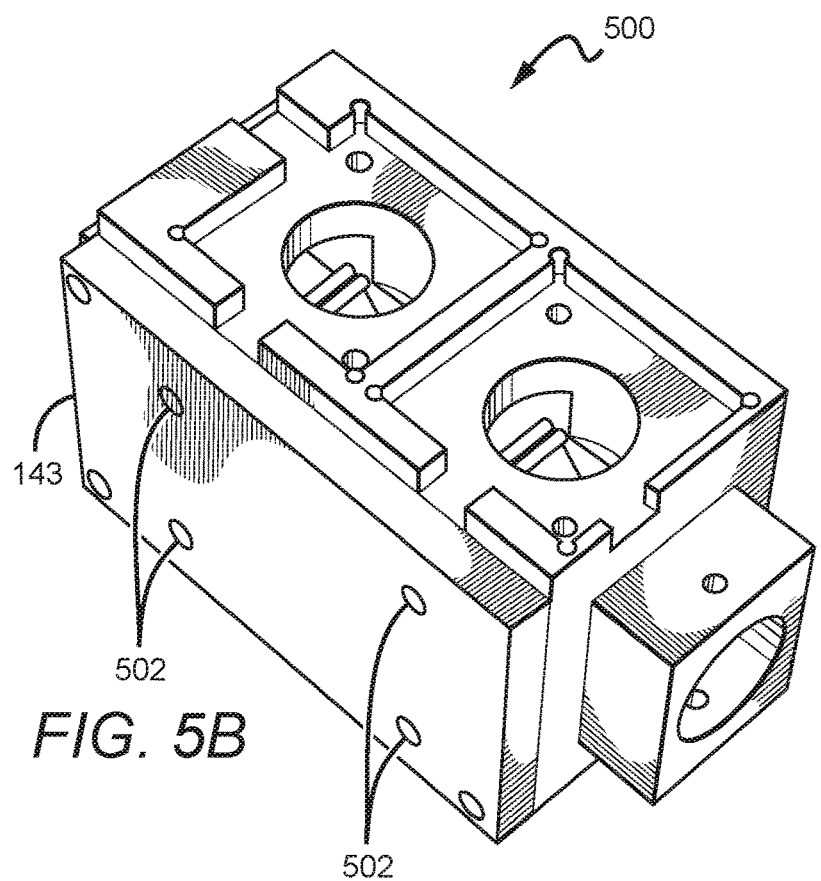
FIG. 5B shows an optical combiner base, with a cover having mounting holes for attachment of an assembled optical combiner.

FIG. 5B depicts an example of the inventive concept that provides four threaded holes 502 tapped into the optical combiner cover 143 of an assembled optical combiner base 500, which can be utilized for mounting such an optical combiner within another device, for example an OEM device that utilizes combined light from multiple sources. In some embodiments vibration dampening mounts can be utilized at such points to prolong the life of the optical combiner and to reduce impact of shocks. It should be appreciated that the use of foam blocks mounted on the side of the optical combiner cover 143 can provide further shock absorption and additional protection for dichroic mirrors mounted within the optical combiner.

Figure 5C:
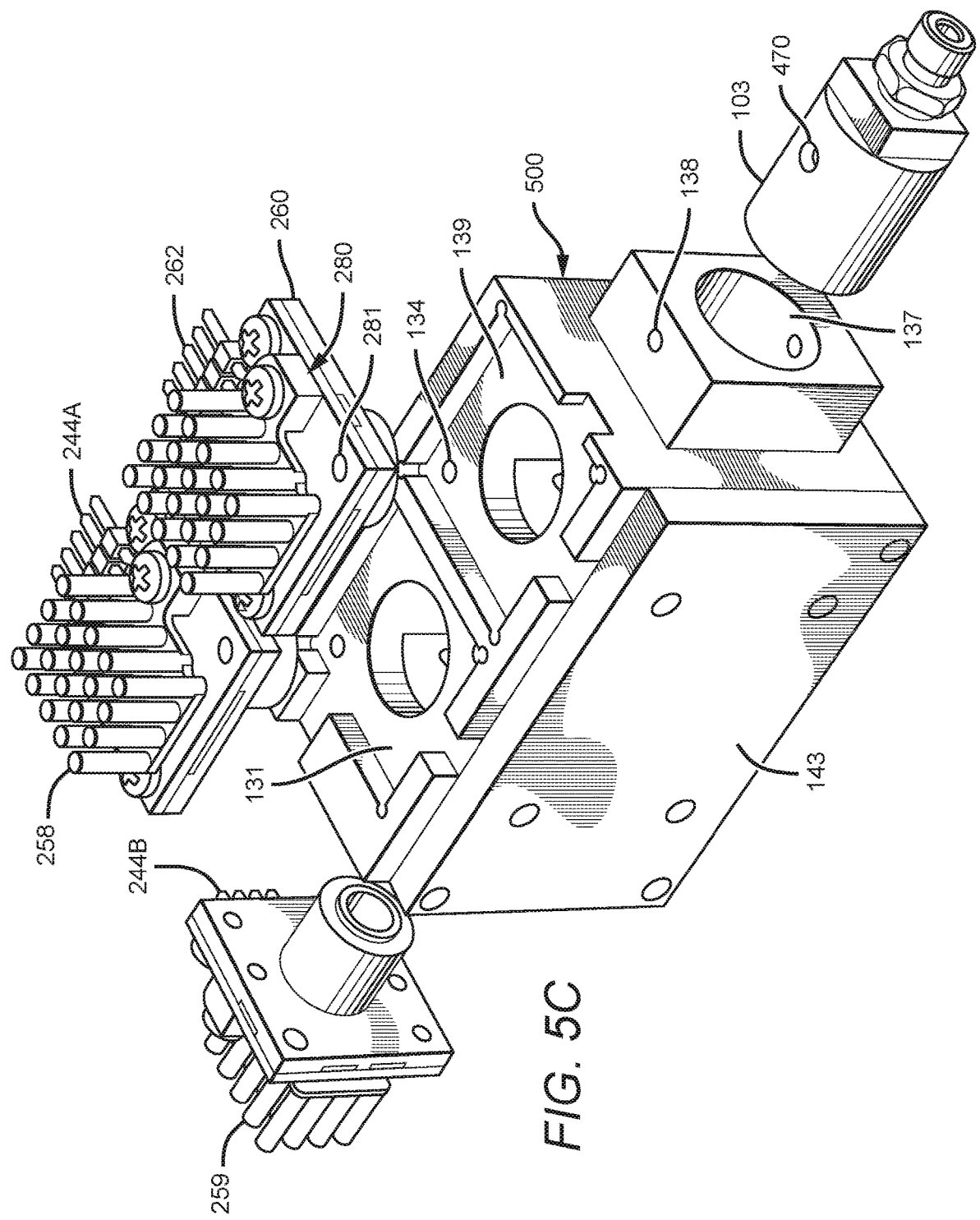
FIG. 5C depicts an optical combiner base, non-coherent light source assemblies, and optical interface oriented for assembly.

FIG. 5C shows an example of an optical combiner base 500, with a UVA LED printed circuit board assembly 280 oriented over the optical combiner housing's square recession 139 with a connector 262 facing in the opposite direction of the optical combiner cover 143. A green LED printed circuit board assembly 258 is shown oriented over the optical combiner housing 100 square recession 131 with a connector 244A facing in the opposite direction of the optical combiner cover 143. A red LED printed circuit board assembly 259 is shown oriented behind the optical combiner housing 100, facing a square recession (not visible) with a connector 244B facing in the opposite direction of the optical combiner cover 143. The optical interface 103 assembly is shown oriented as described above with respect to the circular cutout 137, and holes 470 are oriented to form a concentric mate with the two threaded holes 138 (above and below). Appropriately sized through holes of the non-coherent light source printed circuit boards and bases of a secondary light source (for example, a green LED circuit board assembly 258) and a primary light source (for example, a UVA printed circuit board assembly 280), are shown aligned with the threaded holes 134 of the optical combiner housing.

Figure 5D:
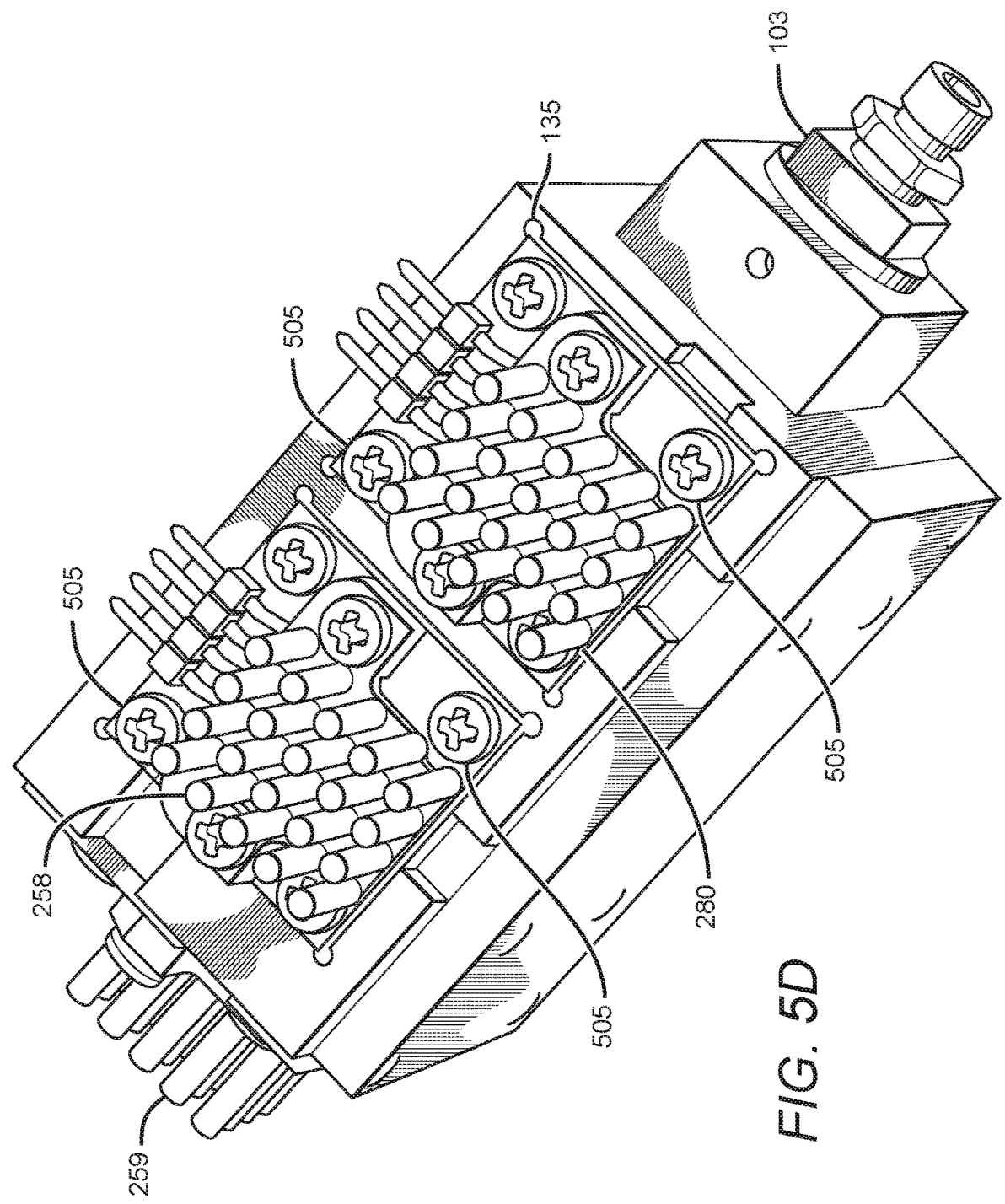
FIGS. 5D and 5E show different external views of an assembled optical combiner of the inventive concept.
Figure 5E:
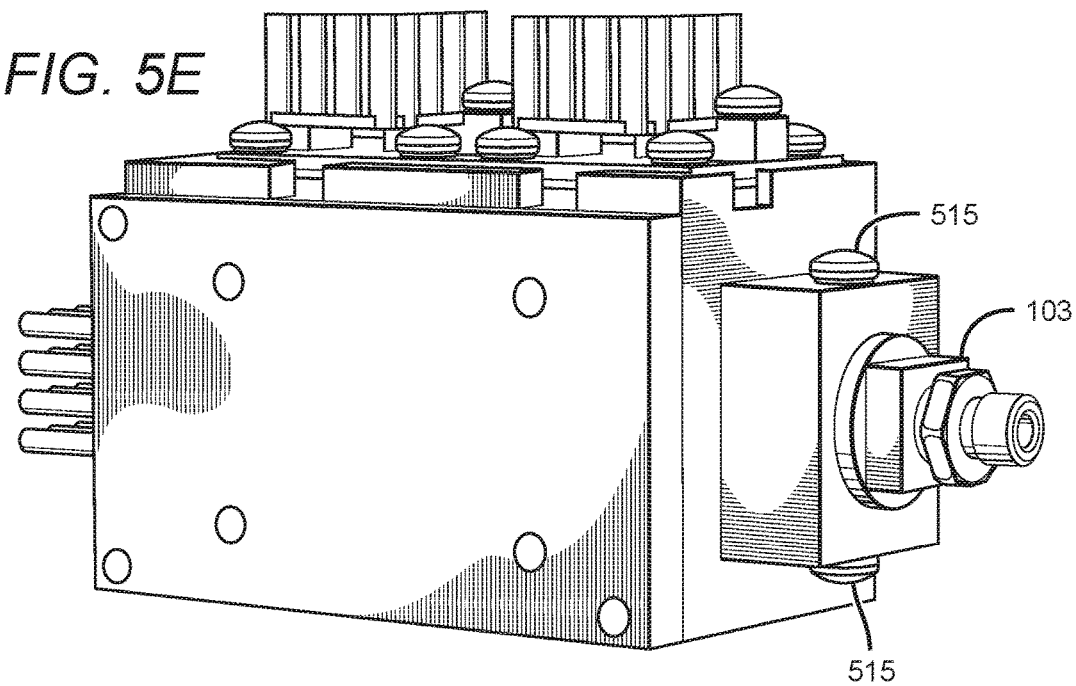

An example of an optical combiner housing in which LED printed circuit board assemblies 280, 258, and 259 are all inserted into their corresponding square recessions is shown in FIGS. 5D and 5E. As shown, the three LED printed circuit board assemblies are secured to an optical combiner housing using bolts or screws 505 (for example, 4-40 threaded 12.7 mm (½ inch) long screws). An optical interface 103 assembly is inserted into a circular recession that has a slight wall which blocks further insertion (as described above). As described above, the squared corners of the printed circuit boards 2 lie within small drilled holes 135 in the corners of the square recessions. As shown in FIG. 5E, an optical interface 103 assembly can be secured within an optical combiner housing using one or more screws (for example, 4-40 threaded, 6.4 mm (¼ inch) machine screws 515.

Figure 5F:
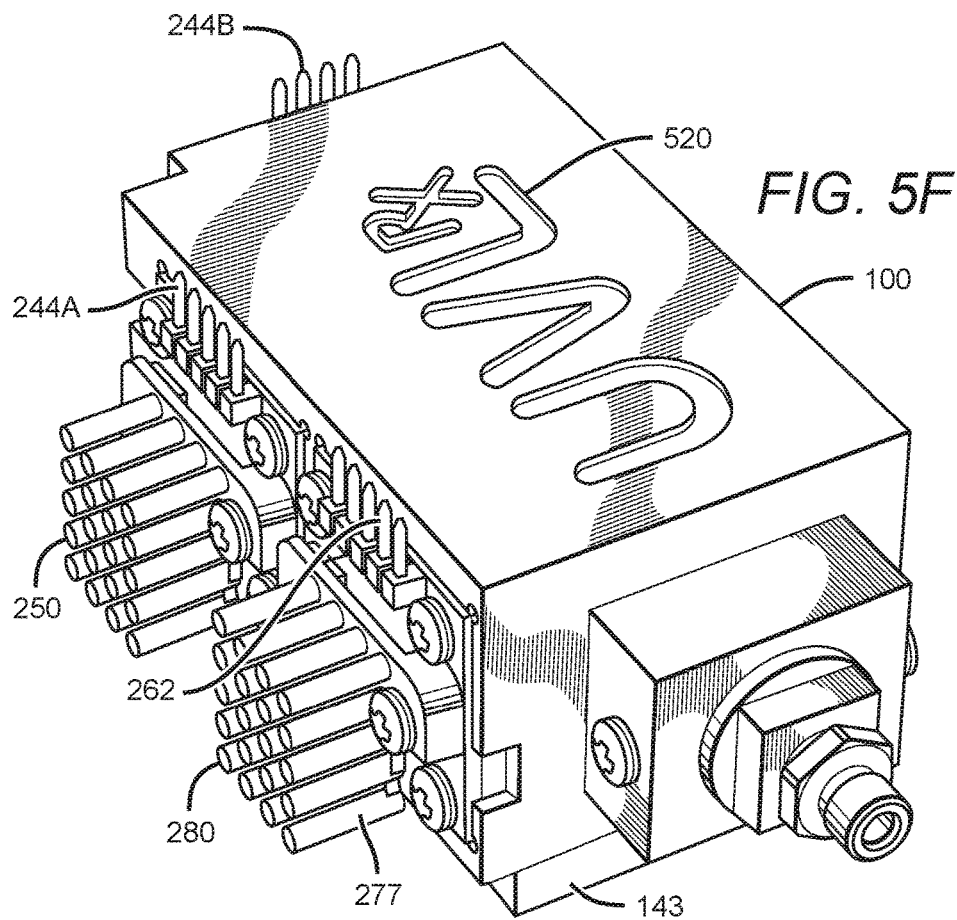
FIG. 5F shows an external view of an optical combiner of the inventive concept, where the cover supports indicia.

FIG. 5F shows a preferred embodiment of a completed optical combiner positioned within a device with the optical combiner cover 143 facing downward, either parallel to the floor or at an angle. In the example shown, the use of right-angle connectors 244A, 244B, and 262 facing upwards facilitates access for an assembler to assemble requisite wire harnessing. A form of labeling, such as serialization and/or branding, can be provided by suitable indicia 520. In the example shown in FIG. 5F, the text "UVLrx" has been milled into the upward facing portion of the optical combiner housing 100.

As noted above, temperature control is important for optimal performance and longevity of the optical combiner. In preferred embodiments, an external fan can be mounted within an OEM device that integrates an embodiment of an optical combiner of the present invention. Such a fan can be positioned so as to force air over and/or through the visible LED pin sinks 250 and/or UV pin sink 277. Alternately, other cooling means such as an integrated forced air system, wherein an individual fan is mounted to each of the pin sinks 277 and 250, or one or more integrated Peltier devices in thermal contact with pin sinks 277 and 250 can be used.

FIG. 2R illustrates the path of the light emitted from a UVA LED 120B once it passes through the 8 mm ball lens 273 in one embodiment of the intravenous light therapy system. The central emission axis 109B of the UVA LED 120B travels the distance from the LED die of the UVA LED 120B to the center of the 45 degree angled face of the UV dichroic mirror 130B, about 20 mm (0.77 inches). As described above, the UV dichroic mirror 130B is oriented within the optical combiner housing 100. Focusing lens 175 is positioned within the single optical interface 103 housing and substantially coupled to face 282 of fiber optic cable 281. The front face of the focusing lens 175 is positioned about 6.6 mm (0.26 inches) distance 297 from the center of the reflective face of the UV dichroic mirror 130B, and the rear face of the focusing lens is located about 15 mm (0.61 inches) distance 298 from the face of the fiber optic core 282.

As described above, collimated light from LED light sources can be directed within the optical combiner housing using dichroic mirrors. FIG. 2S shows an example of such a light path within an embodiment of the inventive concept. The optical path of collimated light from a UVA LED 120B as it passes through a sapphire ball lens 291 employed is shown for an exemplary embodiment of the present invention. The UVA LED 120B is depicted with its central emission axis 109B oriented over the center of a ball lens 291, and over the center of the UV dichroic mirror 130B. Using Snell's law $$\left(\frac{\sin(\theta_1)}{\sin(\theta_2)} = \frac{n_2}{n_1}\right),$$

the angles of refraction ($\theta_2$) at the air/sapphire interfaces can be calculated from the angles of incidence from the normal of the air/sapphire boundaries ($\theta_1$) and the refractive indices of 365 nm light in air ($n_{air}$=1.000285) and sapphire ($n_{sapphire}$=1.7936). Within the 0.75 range of relative radiant intensity of the UVA LED 120, or at 40 degrees 283 of either side of the central emission axis 109 of the UVA LED 120B, the angle of incidence of light contained is 41.84 degrees ($\theta_1^{in}$=41.84°) in this example. Therefore, the angle of refraction of light from normal within the ball lens is 21.84 degrees ($\eta_2^{in}$=21.84°).

The angle of refraction of the light as it exits the ball lens is calculated in the same way. Where the angle of incidence is 21.84 degrees ($\theta_1^{out}$=21.84°), the angle of refraction is 41.71 degrees ($\theta_2^{out}$=41.71°) in this example. In such embodiments of the inventive subject matter, a path length of about 20 mm (0.77 inches) from the LED die of the UVA LED 120B to the center of the 45 degree angled face of the UV dichroic mirror 130B can be used. The light emitted within 40 degrees 283 from the central emission axis 109 of the UVA LED 120B is substantially collimated, because the angle of the incident light is reduced from about 40 degrees 283 to about 0.13 degrees 295. It should be appreciated, however, that other degrees of collimation are also suitable. For example, the angle of the incident light from a UVA LED can be reduced from about 40 degrees to less than about 20 degrees, less than about 10 degrees, less than about 5 degrees, less than about 2 degrees, and/or less than about 1 degree. It should also be appreciated that the extent of collimation must be balanced against the requirement for tolerance of imprecision and resistance to shock damage. After the light is substantially collimated, it reflects off of dichroic mirror 130 and passes through a focusing lens.

One contemplated embodiment of a device that integrates an optical combiner of the inventive concept is an intravenous light therapy system. In such a system the focusing or focusing lens 175 can be, for example, a 12 mm effective focal length double convex lens with a diameter of about 12 mm. Such a focusing or focusing lens 175 can be made of any suitable material. An example of a suitable focusing or focusing lens is BK7 glass lens with a radius of 9.74 mm, surface quality of 40/20 scratch and dig, back focal length of 9.25 mm, clear aperture of 11 mm, and center thickness of 2.96 mm. An antireflective coating can be applied to one or both faces of such a lens.

FIG. 3A shows an example of a final path traveled by collimated light from a UVA LED in one embodiment of the inventive concept. As shown, light ray strikes the reflective face of a UV dichroic mirror 130B. In the exemplary embodiment of the inventive subject matter, the angle of incidence 301 is about 44.87 degrees, and equals the angle of reflection 302 of light ray 303. Light ray 303 intersects with the first face 304 of a focusing lens. In the example shown the angle of incidence 308 is about 9.78 degrees. The angle of refraction 309 of the light ray 310 as it passes through the focusing lens 175 is calculated using Snell's law and the indices of refraction of 365 nm light in air and BK7 glass (1.000285 and 1.5363, respectively). These values give an angle of refraction 309 of about 6.35 degrees from line 305.

Light ray 310 is drawn to intersect with the rear face 311 of focusing or focusing lens 175. A dash-dot line 312 is drawn from the rear focal length point 313, located 9.25 mm 316 from the center of the front face 304 of a focusing lens of this example, through to coincidence with the ray 310 and the rear face 311 of the focusing lens. The angle of incidence 315 is about 11.60 degrees, and the corresponding angle of refraction 317 is about 17.99 degrees from line 312.

The focused light ray 318 is drawn to intersect with the 600 μm face 282 of a mating SMA-905 terminated fiber optic cable in this example. As shown, the maximum angle of incidence 319 of the light from a UVA LED with the fiber core face 282 is less than 10 degrees. Lower angular content improves entrance of light into the fiber optic core, and improves transmission. Analogously, light at decreasing angles from the central emission axis will strike the fiber core face 282 between where light rays 318 and 322 strike the face. Light rays 320, 321, and 322 follow similar paths to those of 303, 310, and 318, respectively.

Figure 3G:
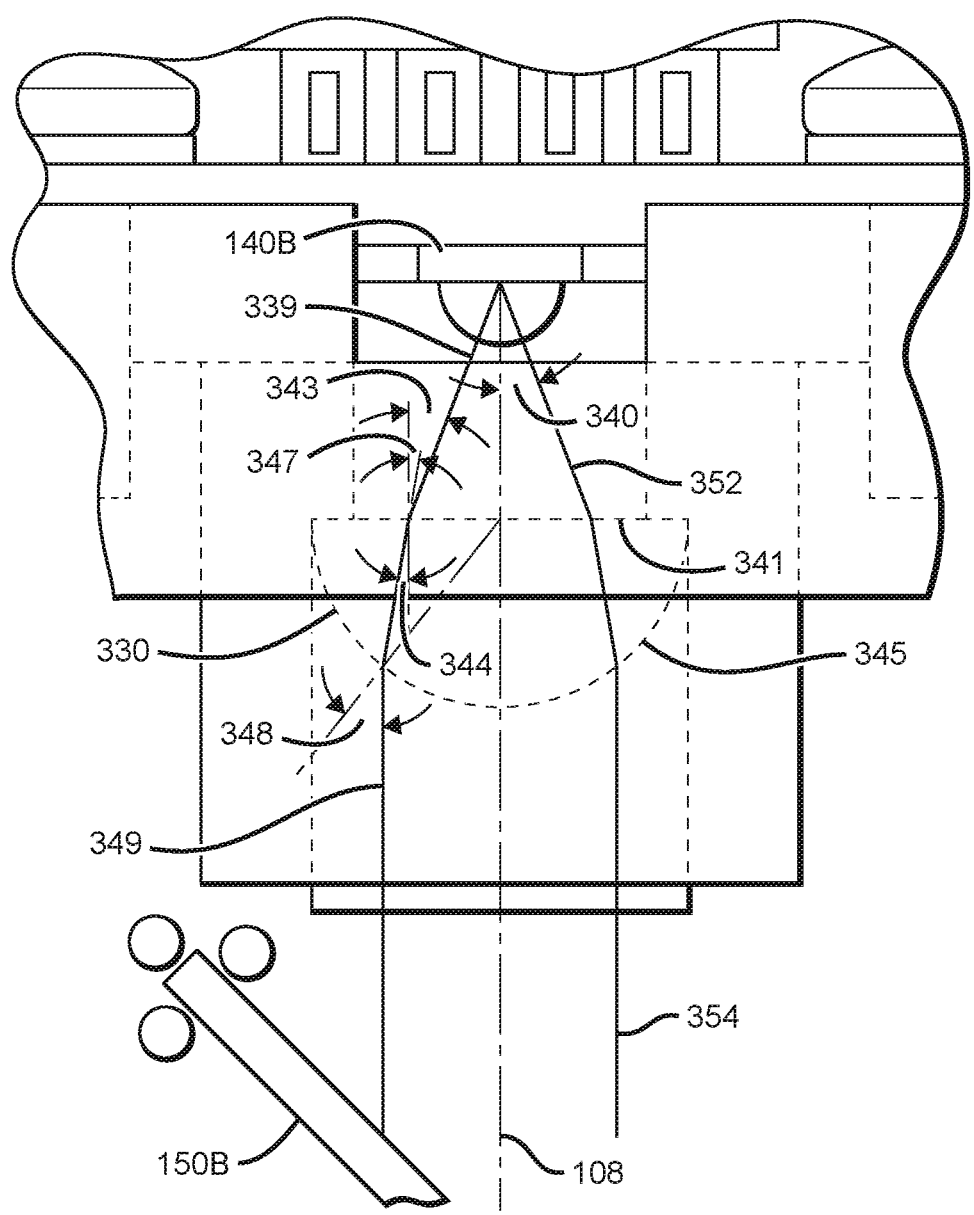
FIG. 3G depicts a portion of a path taken by light emitted from a non-coherent light source and subsequently collimated by an associated lens in an optical combiner of the inventive concept.

FIG. 3G similarly illustrates an exemplary optical path of collimated light from a visible wavelength noncoherent light source (for example a green LED 140B) optical emission through to the focusing of that optical emission down to the face of a mating fiber optic cable core. Structures within the assembly are illustrated by dashed lines. In this example a green LED 140B is shown with its central emission axis 108 oriented directly over center of the central axis of a half-ball lens 330, and over a visible dichroic mirror 150B. Light rays 339 and 352 form the boundaries of a relative radiant intensity angle 340 of about 20 degrees on either side of a central emission axis 108 in this example. The light ray 339 is drawn to incidence on the flat face 341 of the half-ball lens. The normal boundary angle for the light ray 339 upon the flat face 341 of the half-ball lens 330, is calculated from the angle of incidence 343 (20.0 degrees) the refractive index 525 nm light through air (1.0002784), and the refractive index 525 nm light through an exemplary fused silica lens (1.46104) using Snell's law. These values give an angle of refraction 344 of about 13.54 degrees. The transmitted light ray travels through the 8 mm half-ball lens 330 to the curved side 345.

The angle of refraction 348 at the boundary of the curved side 345 of the half-ball lens 330 is about 40.78 degrees when the angle of incidence is about 26.56 degrees. Light ray 349 intersects with the reflective face of the visible dichroic mirror 150B. The distance from the LED die of the green LED 140B to the center of the 45 degree angled face of the visible dichroic mirror 150B is about 21 mm (0.83 inches). Due to the symmetry of the design of one embodiment of the present invention, light rays 352 and 354 are symmetric with those of 339 and 349 respectively. Of special note is the final level of collimation of the original light contained within the designed relative radiant intensity angle 340 of 20 degrees on either side of the central emission axis 108 of the green LED 140B. The light (on either side of the central emission axis 108) is reduced from about 20 degrees 340 to about 0.67 degrees 350 (inward angle), which is substantially collimated. It should be appreciated, however, that other degrees of collimation are also suitable. For example, the angle of the incident light from a green LED can be reduced from about 40 degrees to less than about 10 degrees, less than about 5 degrees, less than about 2 degrees, and/or less than about 1 degree.

Figure 3H:
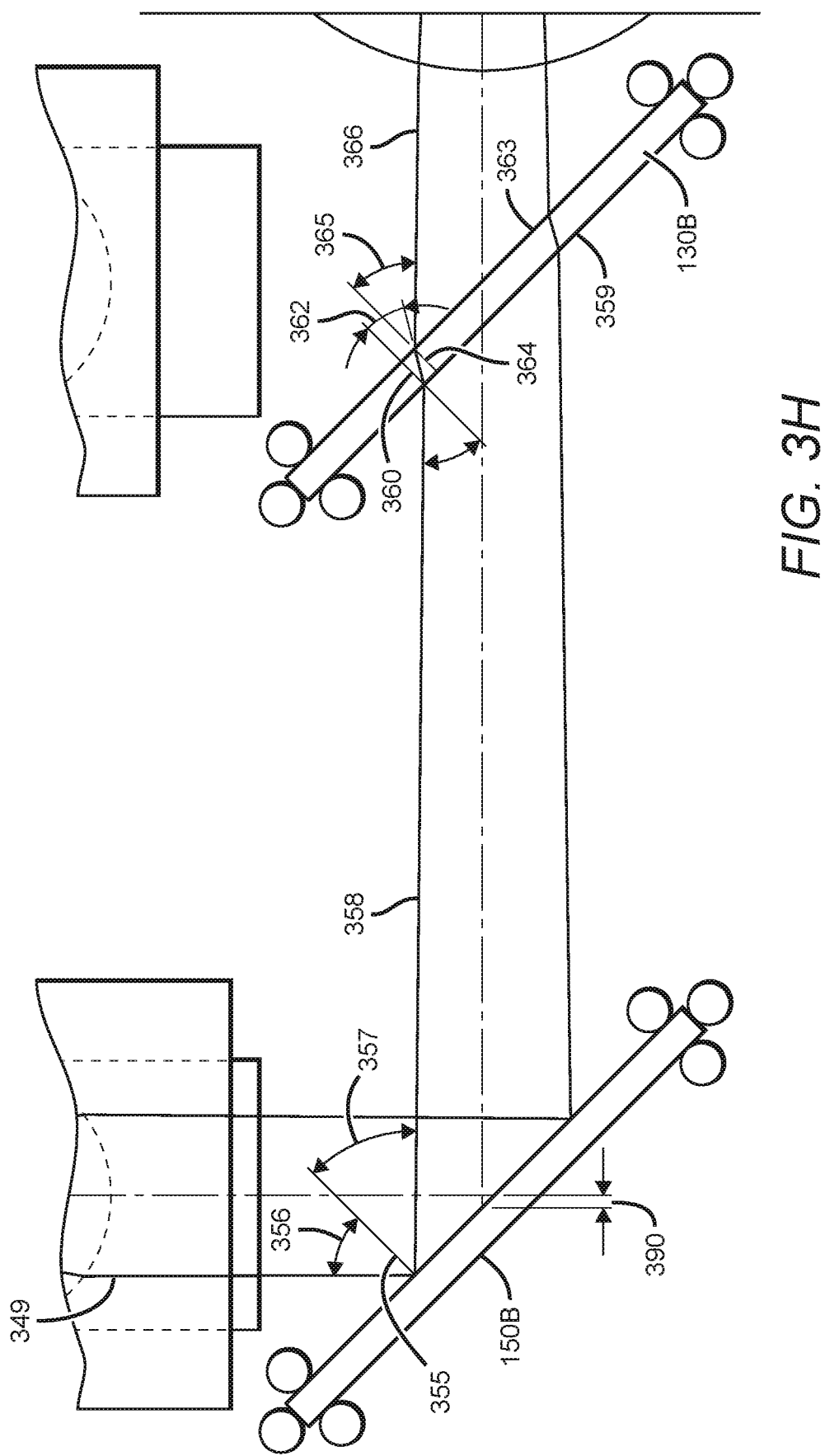
FIG. 3H depicts additional portions of the path of the non-coherent light source of FIG. 3G, showing reflection from one dichroic mirror and transmission through a different dichroic mirror of the optical combiner.
Figure 31:
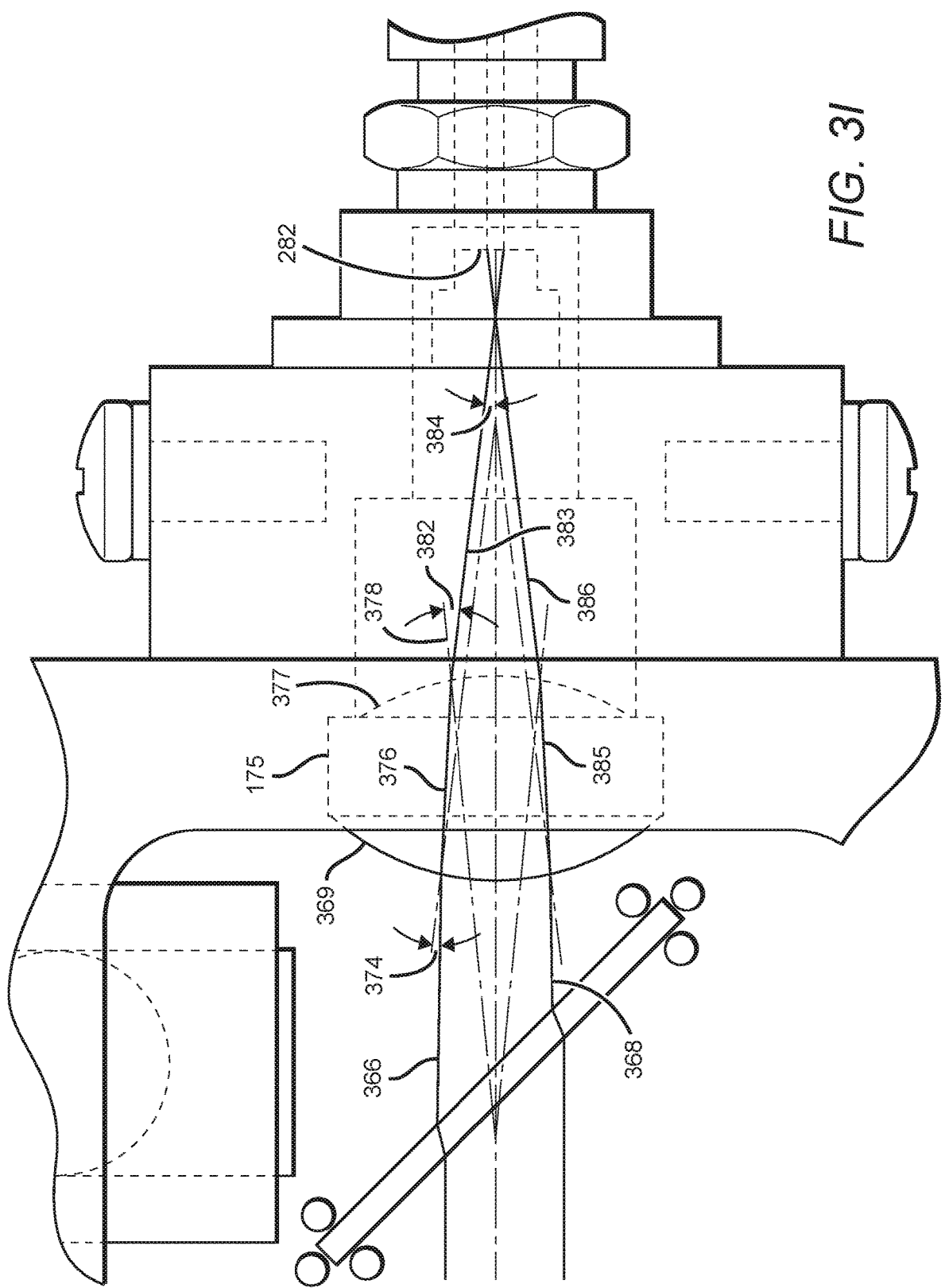

FIG. 3H depicts an example of a device of the inventive concept that utilizes a UVA light source and a green LED light source. As shown, light ray 349 from such a green LED light source strikes the reflective face of visible dichroic mirror 150B. A dashed line 355 is drawn coincident with light ray 349 where it contacts visible dichroic mirror 150B at an angle of about 45.67 degrees 356, and perpendicular (normal) to reflective face of the visible dichroic mirror 150B. The angle of reflection 357 of the light ray 358 equals that of incoming light ray 349 relative to the normal line 355, about 45.67 degrees. This light ray is drawn to incidence on the rear face 359 of a UV dichroic mirror 130B. A dashed-line 360 is drawn perpendicular to the rear face 359, and coincident to where the light ray 358 intersects the rear face 359. The light ray is shifted upwards as it passes through the UV dichroic mirror. In a preferred embodiment of the inventive concept the position of the visible dichroic mirror and/or the position of the incident collimated light from the associated light source can be positioned along a secondary optical axis, parallel to but offset from a primary optical axis defined by the spatial relationship between the focusing or focusing lens and the optical interface. This secondary optical axis can be offset to an extent such that light centered along the secondary optical axis that passes through the UV dichroic mirror 130B is aligned with the primary optical axis by refraction as it passes through the UV dichroic mirror. In this example, using Snell's equation, the angle of incidence 361 of about 45.67 degrees gives an angle of refraction 362 of 29.33 degrees.

As shown, the refracted light ray intersects the reflective face 363 of the UV dichroic mirror 130B. A dashed line 364 is drawn coincident with initial resultant light ray where it contacts the reflective face 363 of the UV dichroic mirror 130B, and normal to face 363. An angle of incidence of about 29.41 degrees gives an angle of refraction 365 of about 45.67 degrees. The distance 390, between the center of the reflective face of the visible dichroic mirror 150B and the actual point of incidence of the central emission axis 108 of a green LED accounts for the vertical shift of the resultant light ray 366 as it passes through UV dichroic mirror 130B, which as will be shown then aligns the final re-focused light emission from a green LED to a fiber optic core face. In the example shown this distance 390 is about 0.35 mm (0.0138 inches).

As shown in FIG. 3I, light ray 366 intersects with the first or rear face 369 of a focusing lens. The angle of incidence 374, is about 6.32 degrees. The angle of refraction is about 4.16 degrees (i.e. the refractive index of 525 nm light through air=1.0002784; refractive index 525 nm through typical BK7 lens material=1.5199). The light ray 376 is drawn to coincidence with the rear face 377 of a focusing lens 175. In this example the angle of incidence of ray 376 with the rear face 377 of a focusing lens 175 is about 8.64 degrees, and the angle of refraction 382 is about 13.2 degrees.

As shown, the resulting light ray 383 proceeds to coincidence with the 600 μm face 282 of a mating fiber optic cable. The maximum angle of incidence 384 of the light of, for example, a green LED, once it strikes the fiber core face 282, is less than 10 degrees. Lower angular content improves acceptance of light into the fiber optic core, and improves transmission in further stages of optical path connections to the final end user terminus. Advantageously, light at decreasing angles from the central emission axis will strike the fiber core face 282 between where light rays 383 and 386 strike the face. Light rays 368, 385, and 386 behave similarly, due to symmetry within the design, to those of 366, 376, and 383 respectively.

FIG. 4A depicts an example of the optical path of collimated light of a tertiary noncoherent light source (for example, a red LED 160B). It should be appreciated that, in other embodiments, such a tertiary noncoherent light source could also be a UVA LED. In this example, a red LED 160B is shown with its central emission axis 106 oriented perpendicular to the emission axis of the green LED 140B of FIG. 3I and directed to the visible dichroic mirror 150B without the use of an intervening mirror, and intersecting the dichroic mirror associated with a secondary noncoherent light source (such as a green LED) at a 45 degree angle. The central emission axis 106 of the red LED 160B is coincident with a tertiary optical axis 419 that is parallel to but offset from the central acceptance axis of a fiber optic cable core that receives the final mixed light output of the device. In a fashion similar to that of the reflected light of the green LED described above, this corrects for the refraction of the red LED 160B light rays as they pass through the dichroic mirrors associated with the primary and secondary light sources. In the example shown, where the tertiary and secondary light sources are represented by a red LED and a green LED (respectively) this offset can be about 0.64 mm (0.025 inches). This correction allows the light rays from red LED 160B to be centered onto the fiber optic core face.

For the red LED of the example, light rays 400 and 416 form the boundaries of a relative radiant intensity angle 401 of about 15 degrees on either side of the central emission axis 106 in this example. The light ray 400 is drawn to incidence on the flat face 341 of an 8 mm half-ball lens 330. The angle of incidence 440 on the flat side 341 of the half-ball lens 330 is about 15.0 degrees. In this example, using Snell's law, the refractive index of 630 nm light through air (1.0002766), and the refractive index of 630 nm light through an exemplary fused silica lens (1.457021), the angle of refraction 404 comes is about 10.23 degrees. The transmitted light ray 403 travels to the opposite side 345 of the 8 mm half-ball lens 330.

To determine the normal boundary angle for the initial resultant light ray 403 at the boundary of the opposite side 345 of the half-ball lens 330 in this example, the angle of incidence 406 of light ray 403 with the opposite side of the half-ball lens is about 22.55 degrees and the indices of refraction of 630 nm light through fused silica are substituted into Snell's law. Solving for the index of refraction gives an angle 408 of about 33.95 degrees relative to line 405. The light ray 407 proceeds to the rear face of the visible dichroic mirror 150B. In one embodiment of the present invention, the distance from the LED die of a red LED 160B to the center of the rear of the 45 degree angled face of a visible dichroic mirror 150B is about 22.3 mm (0.867 inches). Due to the symmetry of the design of one embodiment of the present invention, light rays 416 and 417 are symmetric with those of 400 and 407 respectively. Of special note is the final level of collimation of the original light contained within the designed relative radiant intensity angle of about 15 degrees 401 on either side of the central emission axis 106 of the red LED 160B. The light (on either side of the central emission axis 106) is reduced from about an angle 401 of about 15 degrees to an angle 409 of about 1.17 degrees (inward angle, as opposed to an expanding angle), which is substantially collimated.

As shown, light ray 407 strikes the rear face of visible dichroic mirror 150B. The angle of incidence 411 is about 46.17 degrees giving an angle of refraction 412 of approximately 29.69 degrees. Light ray 412 is transmitted to a reflective face of the visible dichroic mirror 150B. The angle of incidence 414 of light ray 412 with the reflective face of the visible dichroic mirror is about 29.69 degrees, and the angle of refraction 416 is about 46.17 degrees. Light rays 417 and 418 behave similarly to those of 407 and 415 as they pass through the visible dichroic mirror.

FIG. 4B depicts a continuation of the light path shown in FIG. 4A. As shown in the example shown in FIG. 4B, light ray 415 strikes the rear face of a dichroic mirror associated with a secondary noncoherent light source, in this example a UV dichroic mirror 130B. The angle of incidence 420 (about 46.17 degrees in this example) yields an angle of refraction 450 of about 29.69 degrees. The refracted light ray is transmitted to the reflective face of the UV dichroic mirror 130B. Where the angle of incidence 422 with the reflective face in this example is about 29.69 degrees, the angle of refraction 424 is about 46.17 degrees. Light rays 418 and 425 behave similarly to those of 415 and 423 as they pass through the UV dichroic mirror 130B.

FIG. 4C depicts a continuation of the light path shown in FIGS. 4A and 4B. In the example shown in FIG. 4C, light ray 423 is shown to intersect with the first face 369 of the focusing lens 175. The angle of incidence 427 is about 2.99 degrees. The refractive index of 630 nm light through air is 1.0002766 and the refractive index 630 nm through the material of an exemplary lens (for example, a BK7 lens) is 1.5125. In this exemplary embodiment, the angle of refraction 428 is about 1.98 degrees. Light ray 429 is transmitted to the rear face 377 of focusing lens 175. At the rear face of the focusing lens, the angle of incidence 431 is about 5.41 degrees, and the angle of refraction 432 is 8.2 degrees.

The light ray 433 travels to coincidence with the fiber optic core face 282 of the mating fiber optic cable. The maximum angle of incidence of light from the tertiary noncoherent light source, once it strikes the fiber core face 282, is about ten degrees or less. Lower angular content improves acceptance of light into the fiber optic core, and improves transmission in further stages of optical path connections to the final end user terminus. Also of note, light at decreasing angles from the central emission axis of the tertiary noncoherent light source will strike the fiber core face 282 between where light rays 433 and 435 strike the face. Light rays 425 and 435 behave similarly, due to symmetry within the design, to those of 426 and 433 respectively.

A cross sectional view showing the light paths depicted above through an assembled optical combiner is shown in FIG. 4D. In the example shown in FIG. 4D, an optical combiner housing 100 is shown with final UVA LED printed circuit board assembly 280B, final green LED printed circuit board assembly 258, and final red LED printed circuit board assembly 259 secured. A single optical interface assembly 103 is also coupled to optical combiner housing 100, and a fiber optic cable 281 with a fiber optic core (for example, a 600 μm core) is attached to the optical interface assembly 103. The optical emissions from a UVA LED (representing a primary light source), a green LED (representing a secondary light source), and red LED (representing a tertiary light source) are shown as ray traces, the rays representing the boundaries of the design relative radiant intensity angles for each LED, as they pass through the various stages collimation, reflection and transmission, and re-focusing onto the fiber optic core face 282. It should be appreciated, however, that in some embodiments of the inventive concept a UVA LED can be used as a tertiary light source and a red LED utilized as a primary light source, with appropriate changes made to the associated dichroic mirrors. FIG. 4D demonstrates the simultaneous combination of three wavelengths of light from three LEDs into a single optical interface 103 and into a joining fiber optic cable 281 (for example, a SMA-905 terminated fiber optic cable). In a preferred embodiment, the present invention can be utilized in intravenous light therapy.

The light rays from each of the LEDs converge at a point a small distance from the face 282 of the fiber optic core. For example, UVA light rays converge at about 1.99 mm (0.0782 inches) from face 282; green light rays converge at the example shown at about 2.82 mm (0.111 inches) from face 282; and red light rays converge at about 4.90 mm (0.193 inches) from face 282. In contemplated embodiments of the inventive subject matter, it may be desirable to position the face 282 of the fiber optic core nearer to the area of convergence. It should be appreciated that locating the face 282 of the fiber optic core at a center of convergence may increase the likelihood that small misalignments, additively combined throughout the optical combiner through manufacturing tolerances, variation produced in the assembly process, and shocks encountered through use, can alter in one direction or another the location of convergence, and may increase power attenuation at the output.

Embodiments of the inventive process, an example of which is illustrated in FIG. 4D, are robust to additive misalignments, and a high percentage of the optical interface of the source LEDs (as compared to the theoretical radiant intensity optical content from each LED) will pass into the mating fiber optic cable 281. In embodiments of the inventive concept at least 10%, 20%, 30%, 40%, 50%, 60%, 70%, 80%, 90%, or more than 90% of the theoretical radiant intensity optical content from each of the noncoherent light sources passes into the mating fiber optic cable 281.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A device for combining light from multiple light sources, comprising:

a housing comprising a cavity face, a first tooling and a second tooling;

an optical output having a primary optical axis, secured to the housing in such manner that the primary optical axis of the optical output is substantially parallel to the cavity face of the housing;

a first mirror comprising a first planar surface on a first side facing a focusing lens and a second planar surface opposite but parallel to the first side, secured to the first tooling in such manner that the first planar surface of the first mirror lies at approximately 45 degrees to the primary optical axis of the optical output;

a second mirror comprising a first planar surface on a first side and a second planar surface opposite but parallel to the first side, secured to the second tooling in such manner that the first planar surface of the second mirror lies at approximately 45 degrees to the primary optical axis of the optical output;

a first light source configured to emit a first light emission on the first mirror; and a second light source configured to emit a second light emission on the second mirror;

wherein at least one of the first tooling and second tooling comprises first and second dowel pins disposed in first and second cylindrical holes in the cavity face of the housing, the first and second cylindrical holes having central axes that lie in a first orientation plane approximately 45 degrees to the primary optical axis of the optical output and generally orthogonal to the cavity face of the housing; and wherein the first and second dowel pins are directly secured to one of the first or second mirror.

2. The device of claim 1, wherein the first mirror is a dichroic mirror, and wherein light passing into the second planar surface of the first mirror is aligned to a secondary optical axis that is parallel to but offset from the primary optical axis of the optical output, in order to accommodate refraction through the first mirror.

3. The device of claim 2, wherein the second mirror is a dichroic mirror, and wherein the third light emission passing into the second planar surface of the second dichroic mirror is aligned to a tertiary optical axis that is parallel to but offset from the secondary optical axis, in order to accommodate refraction through the second mirror.

4. The device of claim 1, further comprising a first collimating lens positioned between the first light source and the first mirror and a second collimating lens positioned between the second light source and the second mirror.

5. The device of claim 1, wherein the first light source and second light source are non-coherent light sources.

6. The device of claim 1, wherein the optical output comprises a focusing lens having a focal point.

7. The device of claim 6, further comprising a waveguide having an inlet facet positioned at or near the focal point of the focusing lens.

8. A device for combining light from multiple light sources, comprising:

a housing comprising a cavity having a generally-planar cavity face, a first tooling and a second tooling;

an optical output having a primary optical axis, secured to the housing in such manner that the primary optical axis of the optical output is substantially parallel to the generally-planar cavity face of the housing;

the first tooling comprising first and second dowel pins disposed in first and second cylindrical holes in the generally-planar cavity face of the housing, wherein the first and second cylindrical holes have central axes that lie in a first orientation plane approximately 45 degrees to the primary optical axis of the optical output and generally orthogonal to the generally-planar cavity face of the housing;

the second tooling comprising third and fourth dowel pins disposed in third and fourth cylindrical holes in the generally-planar cavity face of the housing, wherein the third and fourth cylindrical holes have central axes that are disposed in a second orientation plane approximately 45 degrees to the primary optical axis of the optical output and generally orthogonal to the generally-planar cavity face of the housing;

a first dichroic mirror comprising a first planar surface on a first side facing the optical output and a second planar surface opposite but parallel to the first side, directly secured to the first and second dowel pins in such manner that the first planar surface lies at approximately 45 degrees to the primary optical axis of the optical output;

a second dichroic mirror comprising a first planar surface on a first side facing the first dichroic mirror and a second planar surface opposite but parallel to the first side, directly secured to the third and fourth dowel pins in such manner that the first planar surface lies at approximately 45 degrees to the primary optical axis of the optical output;

a first light source configured to emit a first light emission on the first planar surface of the first dichroic mirror;

a second light source configured to emit a second light emission on the first planar surface of the second dichroic mirror; and a third light source configured to emit a third light emission on the second planar surface of the second dichroic mirror.

9. The device of claim 8, wherein light passing into the second planar surface of the first dichroic mirror is aligned to a secondary optical axis that is parallel to but offset from the primary optical axis of the optical output, in order to accommodate refraction through the first dichroic mirror.

10. The device of claim 9, wherein the third light emission passing into the second planar surface of the second dichroic mirror is aligned to a tertiary optical axis that is parallel to but offset from the secondary optical axis, in order to accommodate refraction through the second dichroic mirror.

11. The device of claim 8, further comprising a first collimating lens positioned between the first light source and the first dichroic mirror, a second collimating lens positioned between the second light source and the second dichroic mirror, and a third collimating lens positioned between the third light source and the second dichroic mirror.

12. The device of claim 8, wherein the first light source, second light source and third light source are non-coherent light sources.

13. The device of claim 8, wherein the optical output comprises a focusing lens having a focal point.

14. The device of claim 13, further comprising a waveguide having an inlet facet positioned at or near the focal point of the focusing lens.

15. A device for combining light from multiple light sources, comprising:

a housing comprising a cavity having a generally-planar cavity face, a first tooling and a second tooling;

an optical output having a primary optical axis, secured to the housing in such manner that the primary optical axis of the optical output is substantially parallel to the generally-planar cavity face of the housing;

the first tooling comprising first and second dowel pins disposed in first and second cylindrical holes in the generally-planar cavity face of the housing, wherein the first and second cylindrical holes have central axes that lie in a first orientation plane approximately 45 degrees to the primary optical axis of the optical output and generally orthogonal to the generally-planar cavity face of the housing;

the second tooling comprising third and fourth dowel pins disposed in third and fourth cylindrical holes in the generally-planar cavity face of the housing, wherein the third and fourth cylindrical holes have central axes that are disposed in a second orientation plane approximately 45 degrees to the primary optical axis of the optical output and generally orthogonal to the generally-planar cavity face of the housing;

a first dichroic mirror comprising a first planar surface on a first side facing a focusing lens and a second planar surface opposite but parallel to the first side, secured directly to the first and second dowel pins, such that the first planar surface of the first dichroic mirror lies at approximately 45 degrees to the primary optical axis of the optical output;

a second dichroic mirror comprising a first planar surface on a first side facing the first dichroic mirror and a second planar surface opposite but parallel to the first side, secured directly to the second and third dowel pins in such manner that the first planar surface of the second dichroic mirror lies at approximately 45 degrees to the primary optical axis of the optical output;

a first non-coherent light source configured to emit a first light emission on the first planar surface of the first dichroic mirror;

a first collimating lens positioned between the first light source and the first dichroic mirror;

a second non-coherent light source configured to emit a second light emission on the first planar surface of the second dichroic mirror;

a second collimating lens positioned between the second light source and the second dichroic mirror;

a third non-coherent light source configured to emit a third light emission on the second planar surface of the second dichroic mirror; and a third collimating lens positioned between the third light source and the second dichroic mirror;

wherein light passing into the second planar surface of the first dichroic mirror is aligned to a secondary optical axis that is parallel to but offset from the primary optical axis of the optical output, in order to accommodate refraction through the first dichroic mirror; and the third light emission passing into the second planar surface of the second dichroic mirror is aligned to a tertiary optical axis that is parallel to but offset from the secondary optical axis, in order to accommodate refraction through the second dichroic mirror.

16. The device of claim 15, wherein the optical output comprises the focusing lens having a focal point lying on the primary optical axis.

17. The device of claim 16, further comprising a waveguide having an inlet facet positioned at or near the focal point of the focusing lens.

18. The device of claim 15, wherein the first wavelength is an ultraviolet wavelength.

19. The device of claim 15, wherein the first wavelength is a red or infrared wavelength.

20. The device of claim 15, wherein the first collimating lens comprises sapphire.

* * * * *